(12) United States Patent
Nishino et al.

(10) Patent No.: US 6,366,877 B1
(45) Date of Patent: Apr. 2, 2002

(54) METHOD AND DEVICE FOR EMULATION OF PERIPHERAL INPUT/OUTPUT (I/O) CONTROLLER OF A COMPUTER SYSTEM

(75) Inventors: Minoru Nishino; Tomio Kamihata, both of Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/194,298

(22) PCT Filed: Mar. 24, 1998

(86) PCT No.: PCT/JP98/01263

§ 371 Date: May 11, 1999

§ 102(e) Date: May 11, 1999

(87) PCT Pub. No.: WO98/43173

PCT Pub. Date: Oct. 1, 1998

(30) Foreign Application Priority Data

Mar. 24, 1997 (JP) .............................. 9-088816

(51) Int. Cl.[7] .............................................. G06F 9/455
(52) U.S. Cl. .......................................... 703/25; 703/26
(58) Field of Search .............................. 703/24, 25, 27, 703/26; 710/12, 62, 71, 73

(56) References Cited

U.S. PATENT DOCUMENTS

| | | | | |
|---|---|---|---|---|
| 5,408,624 A | * | 4/1995 | Raasch et al. ................. | 703/25 |
| 5,590,315 A | * | 12/1996 | Hess et al. ..................... | 703/25 |
| 5,642,110 A | * | 6/1997 | Raasch et al. ............... | 708/142 |
| 5,748,888 A | * | 5/1998 | Angelo et al. ............... | 713/200 |
| 5,796,984 A | * | 8/1998 | Pearce et al. .................. | 703/24 |
| 6,061,746 A | * | 5/2000 | Stanley et al. .................. | 710/2 |
| 6,094,700 A | * | 7/2000 | Deschepper et al. ......... | 710/129 |
| 6,128,669 A | * | 10/2000 | Moriarty et al. ................ | 710/1 |

FOREIGN PATENT DOCUMENTS

JP          A-7-248927          9/1995

OTHER PUBLICATIONS

Miastkowski, S., "Coming PC Technologies Technoparadise or Mere Puffery?", PC World, vol. 15, Issue 10, p. 74–75, Oct. 1997.*
Severence, C. "FireWire Finally Comes Home", Computer, vol. 31, Issue 11, pp. 117–118, Nov. 1998.*

* cited by examiner

Primary Examiner—Russell W. Frejd
(74) Attorney, Agent, or Firm—Oliff & Berridge, PLC

(57) ABSTRACT

A reception/transmission circuit 20 receives and transmits data from and to a keyboard 16 and mouse 18. An output buffer 42 temporarily stores data from the keyboard 16 and mouse 18 while an input buffer 44 temporarily stores data from BIOS 100 and an interrupt handler 110. A status register 46 stores status data, and port registers 48 and 50 transmit a given data to an external means. An interrupt generating circuit 60 generates SMI# for CPU 10. An emulation handler 120 is activated by SMI# for executing a given emulation. Instead of the reception/transmission circuit 20, a USB controller or IEEE1394 controller may be provided. It is desirable that the system emulates processing of a processor in the 8042 or keyboard.

32 Claims, 42 Drawing Sheets

TRANSMISSION / RECEPTION

FIG. 5A

KEYBOARD DATA TRANSMISSION REGISTER

| bit | function | description |
|---|---|---|
| 7~0 | KBDW7~0 | DATA TO BE TRANSMITTED TO KEYBOARD. |

FIG. 5B

KEYBOARD DATA RECEPTION REGISTER

| bit | function | description |
|---|---|---|
| 7~0 | KBDR7~0 | DATA FROM KEYBOARD. AFTER THIS REGISTER IS READ, NEXT DATA CAN BE RECEIVED |

FIG. 5C

MOUSE DATA TRANSMISSION REGISTER

| bit | function | description |
|---|---|---|
| 7~0 | MSDW7~0 | DATA TO BE TRANSMITTED TO MOUSE. |

FIG. 5D

MOUSE DATA RECEPTION REGISTER

| bit | function | description |
|---|---|---|
| 7~0 | MSDR7~0 | DATA FROM MOUSE. AFTER THIS REGISTER IS READ, NEXT DATA CAN BE RECEIVED. |

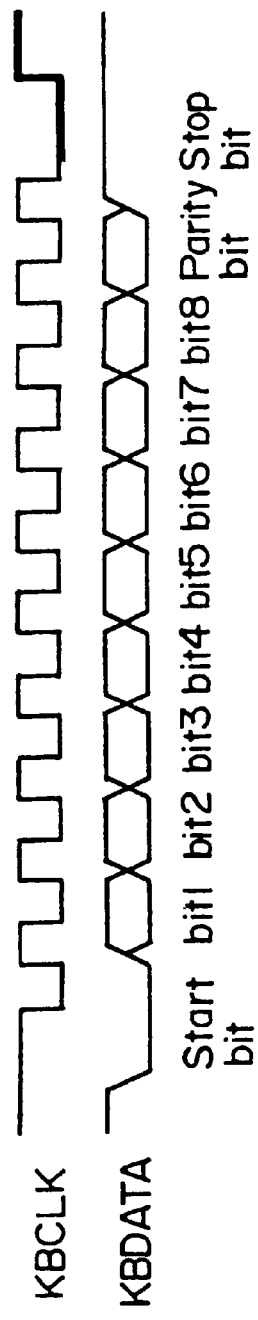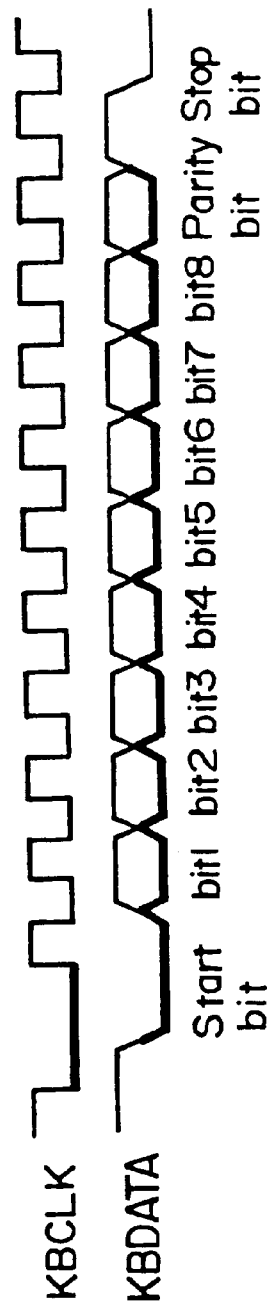
FIG. 6A
FIG. 6B

FIG. 7A

KEYBOARD/MOUSE CONTROL REGISTER

| bit | function | description |
|---|---|---|
| 0 | Keyboard Interface Reset # | 0: KEYBOARD INTERFACE IS RESET.<br>1: KEYBOARD INTERFACE IS SET ENABLE.<br>WHEN "0", INTERFACE WITH KEYBOARD IS RESET. ALL FLAGS AND OTHERS ARE RESET. RECEPTION OR TRANSMISSION BEING DONE IS DISCONTINUED. |
| 1 | KBCLK forced LOW # | 0: KBCLK BECOMES LOW.<br>1: KBCLK IS SET FLOATING.<br>WHEN "0", KBCLK BECOMES "LOW". THIS CAN INHIBIT TRANSMISSION OF DATA FROM KEYBOARD. |
| 2 | Keyboard Parity Error | 0: NO KEYBOARD PARITY ERROR.<br>1: KEYBOARD PARITY ERROR.<br>TRANSMISSION/RECEPTION OF DATA FROM AND TO KEYBOARD IS CARRIED OUT WITH ODD PARITY. IF THE RECEIVED DATA IS AT EVEN PARITY, THIS BIT IS SET TO "1". THIS BIT IS VALID ONLY WHEN Keyboard Data Receiving Completed (KEYBOARD/MOUSE STATUS REGISTER BIT 2) IS "1". |
| 3 | | |

FIG. 7B

| 4 | Mouse Interface Reset # | 0: MOUSE INTERFACE IS RESET.<br>1: MOUSE INTERFACE IS SET ENABLE.<br>WHEN "0", INTERFACE WITH MOUSE IS RESET. ALL FLAGS AND OTHERS ARE RESET. RECEPTION OR TRANSMISSION BEING DONE IS DISCONTINUED. |
|---|---|---|
| 5 | MSCLK forced LOW# | 0: MSCLK BECOMES LOW.<br>1: MSCLK IS SET FLOATING.<br>WHEN "0", MSCLK BECOMES "LOW". THIS CAN INHIBIT TRANSMISSION OF DATA FROM MOUSE. |
| 6 | Mouse Parity Error | 0: NO MOUSE PARITY ERROR.<br>1: MOUSE PARITY ERROR.<br>TRANSMISSON/RECEPTION OF DATA FROM AND TO MOUSE IS CARRIED OUT WITH ODD PARITY. IF THE RECEIVED DATA IS AT EVEN PARITY, THIS BIT IS SET TO "1". THIS BIT IS VALID ONLY WHEN Mouse Data Receiving Completed (KEYBOARD/MOUSE STATUS REGISTER BIT 6) IS "1". |
| 7 |  |  |

FIG. 8

| FIG. 8(A) |
| --- |
| FIG. 8(B) |

FIG. 8A

KEYBOARD/MOUSE STATUS REGISTER

| bit | function | description |
| --- | --- | --- |
| 0 | Keyboard Data Receiving | 0: NOT RECEIVING KEYBOARD DATA.<br>1: RECEIVING KEYBOARD DATA.<br>DATA FROM KEYBOARD IS BEING RECEIVED. |
| 1 | Keyboard Data Transmitting | 0: NOT TRANSMITTING KEYBOARD DATA.<br>1: TRANSMITTING KEYBOARD DATA<br>DATA IS BEING TRANSMITTED TO KEYBOARD. WHEN KEYBOARD DATA TRANSMISSION REGISTER IS WRITTEN, THIS BIT IS SET TO (1). ON COMPLETION OF TRANSMISSION, IT IS RESET TO (0). |
| 2 | Keyboard Data Receiving Completed | 0: NOT COMPLETION OF RECEIVING KEYBOARD DATA<br>1: COMPLETION OF RECEIVING KEYBOARD DATA<br>THIS REPRESENTS COMPLETION OF RECEIVING KEYBOARD DATA AND THAT THE VALUE OF Keyboard Receive Data Register IS VALID. THIS BIT IS RESET WHEN KEYBOARD DATA RECEPTION REGISTER IS READ, THEREBY ENABLING THE NEXT DATA TO BE RECEIVED. |
| 3 | | |

*FIG. 8B*

| 4 | Mouse Data Receiving | 0: NOT RECEIVING MOUSE DATA.<br>1: RECEIVING MOUSE DATA.<br>DATA FROM MOUSE IS BEING RECEIVED. |
|---|---|---|
| 5 | Mouse Data Transmitting | 0: NOT TRANSMITTING MOUSE DATA.<br>1: TRANSMITTING MOUSE DATA.<br>DATA IS BEING TRANSMITTED TO MOUSE. WHEN MOUSE DATA TRANSMISSION REGISTER IS WRITTEN, THIS BIT IS SET TO (1). ON COMPLETION OF TRANSMISSION, IT IS RESET TO (0). |
| 6 | Mouse Data Receiving Completed | 0: NOT COMPLETION OF RECEIVING MOUSE DATA.<br>1: COMPLETION OF RECEIVING MOUSE DATA<br>THIS REPRESENTS COMPLETION OF RECEIVING MOUSE DATA AND THAT THE VALUE OF Mouse Receive Data Register IS VALID. THIS BIT IS RESET WHEN MOUSE DATA RECEPTION REGISTER IS READ, THEREBY ENABLING THE NEXT DATA TO BE RECEIVED. |
| 7 | | |

I/O REGISTER

FIG. 11A

STATUS REGISTER (THE INVENTION)

FIG. 11

| FIG. 11(A) |
| --- |
| FIG. 11(B) |

| bit | function | description |
| --- | --- | --- |
| 0 | Output Buffer Full | 0: NO DATA IN OUTPUT BUFFER.<br>1: EMULATION HANDLER WROTE DATA INTO OUTPUT BUFFER, BUT BIOS DOES NOT STILL READ THAT DATA.<br>THIS BIT IS SET TO (1) BY EMULATION HANDLER. THIS BIT IS RESET TO (0) BY READING PORT 60h. |
| 1 | Input Buffer Full | 0: NO DATA (DATA, COMMAND) IN INPUT BUFFER.<br>1: BIOS WROTE DATA INTO INPUT BUFFER (PORTS 60h AND 64h), BUT EMULATION HANDLER DOES NOT STILL READ THAT DATA.<br>THIS BIT IS SET TO (1) BY WRITING PORT 60h OR 64h AND RESET TO (0) BY EMULATION HANDLER. |
| 2 | System Flag | BIT 2 OF Keyboard Controller's Command Byte IS DIRECTLY THE VALUE OF THIS BIT. SETTING AND RESETTING OF THIS BIT IS CARRIED OUT BY EMULATION HANDLER. |
| 3 | Command Data | 0: BIOS WROTE DATA INTO INPUT BUFFER (PORT 60h).<br>1: BIOS WROTE COMMAND INTO INPUT BUFFER (PORT 64h).<br>THIS BIT IS RESET BY WRITING PORT 60h AND SET BY WRITING PORT 64h. |

FIG. 11B

| 4 | Keyboard Password Unlock | 0: THIS BECOMES "0" WHEN BIOS ISSUES "A6h" COMMAND.<br>1: THIS IS SET TO "1" WHEN A PROPER "PASSWORD" IS IN-PUTTED THROUGH KEYBOARD.<br><br>THIS BIT IS SET OR RESET BY EMULATION HANDLER. |
|---|---|---|
| 5 | Aux. Data Flag | 0: DATA IN OUTPUT BUFFER (PORT 60h) RELATES TO KEYBOARD.<br>1: DATA IN OUTPUT BUFFER (PORT 60h) RELATES TO MOUSE.<br><br>THIS BIT IS SET OR RESET BY EMULATION HANDLER. |
| 6 | General Time Out | 0: IN TRANSMISSION OR RECEPTION AT KEYBOARD OR MOUSE, NO TIME-OUT ERROR OCCURS.<br>1: IN TRANSMISSION OR RECEPTION AT KEYBOARD OR MOUSE, TIME-OUT ERROR OCCURS.<br><br>THIS BIT IS SET OR RESET BY EMULATION HANDLER. |
| 7 | Parity Error | 0: IN RECEPTION OF DATA FROM KEYBOARD OR MOUSE, NO PARITY ERROR OCCURS.<br>1: IN RECEPTION OF DATA FROM KEYBOARD OR MOUSE, PARITY ERROR OCCURS.<br><br>THIS BIT IS SET OR RESET BY EMULATION HANDLER. |

| FIG. 12(A) |
|---|
| FIG. 12(B) |

STATUS REGISTER (8042)

| bit | function | description |
|---|---|---|
| 0 | Output Buffer Full | 0: NO DATA IN OUTPUT BUFFER.<br>1: 8042 WROTE DATA INTO OUTPUT BUFFER, BUT BIOS DOES NOT STILL READ THAT DATA.<br>THIS BIT IS RESET TO "0" WHEN BIOS READS OUTPUT BUFFER (PORT 60h). |
| 1 | Input Buffer Full | 0: NO DATA (DATA, COMMAND) IN INPUT BUFFER.<br>1: BIOS WROTE DATA INTO INPUT BUFFER (PORTS 60h AND 64h), BUT 8042 DOES NOT STILL READS THAT DATA. WHEN BIOS WRITES INPUT BUFFER (PORTS 60h AND 64h), THIS BIT IS SET TO "1". WHEN 8042 READS INPUT BUFFER, THIS BIT IS RESET TO "0". |
| 2 | System Flag | BIT 2 OF Keyboard Controller's Command Byte IS DIRECTLY THE VALUE OF THIS BIT. |
| 3 | Command Data | 0: BIOS WROTE DATA INTO INPUT BUFFER (PORT 60h).<br>1: BIOS WROTE COMMAND INTO INPUT BUFFER (PORT 64h).<br>THIS BIT IS RESET TO "0" ON WRITING THE PORT 60h AND SET TO "1" ON WRITING THE PORT 64h. |

*FIG.12B*

| 4 | Keyboard Password Unlock | 0: THIS BECOMES "0" WHEN BIOS ISSUES "A6h" COMMAND.<br>1: THIS IS SET TO "1" WHEN A PROPER "PASSWORD" IS INPUTTED THROUGH KEYBOARD. |
|---|---|---|
| 5 | Aux. Data Flag | 0: DATA IN OUTPUT BUFFER (PORT 60h) RELATES TO KEYBOARD.<br>1: DATA IN OUTPUT BUFFER (PORT 60h) RELATES TO MOUSE. |
| 6 | General Time Out | 0: IN TRANSMISSION OR RECEPTION AT KEYBOARD OR MOUSE, NO TIME-OUT ERROR OCCURS.<br>1: IN TRANSMISSION OR RECEPTION AT KEYBOARD OR MOUSE, TIME-OUT ERROR OCCURS. |
| 7 | Parity Error | 0: IN RECEPTION OF DATA FROM KEYBOARD OR MOUSE, NO PARITY ERROR OCCURS.<br>1: IN RECEPTION OF DATA FROM KEYBOARD OR MOUSE, PARITY ERROR OCCURS. |

FIG.13A

PORT REGISTER 48 (THE INVENTION)

| bit | function | description |
|---|---|---|
| 0 | IRQ1 Active | 0 : IRQ1 IS INACTIVE<br>1 : IRQ1 IS ACTIVE<br>THIS BIT BECOMES IRQ1 INPUT OF INTERRUPT CONTROLLER. THE SET (1) OF THIS BIT IS CARRIED OUT BY EMULATION HANDLER. THE RESET (0) IS PERFORMED BY READING OUTPUT BUFFER (PORT 60h). |
| 1 | IRQ12 Active | 0 : IRQ12 IS INACTIVE<br>1 : IRQ12 IS ACTIVE<br>THIS BIT BECOMES IRQ12 INPUT OF INTERRUPT CONTROLLER. THE SET (1) OF THIS BIT IS CARRIED OUT BY EMULATION HANDLER. THE RESET (0) IS PERFORMED BY READING OUTPUT BUFFER (PORT 60h). |
| 2 | GATEA20# | 0 : GATEA20# BECOMES "LOW"<br>1 : GATEA20# BECOMES "HIGH" |
| 7~3 | | |

FIG.13B

PORT REGISTER 50 (THE INVENTION)

| bit | function | description |
|---|---|---|
| 0 | RC# | WHEN I/O WRITE IS PERFORMED TO THIS REGISTER, PULSE "0" OCCURS AT RC#.<br>WHEN PULSE "0" OCCURS AT RC# CPU IS RESET. |
| 7~1 | | |

FIG.14A

PORT REGISTER 928 (8042)

| bit | function | description |
|---|---|---|
| 0 | KBDATA (input) | THIS SHOWS THE STATE KBDATA |
| 1 | MSDATA (input) | THIS SHOWS THE STATE MSDATA |
| 7~2 | | |

FIG.14B

PORT REGISTER 930 (8042)

| bit | function | description |
|---|---|---|
| 0 | RC # | WHEN RC# BECOMES Low, RESETTING OF CPU BECOMS ACTIVE. |
| 1 | GATEA20 # | WHEN GATEA20# BECOMS Low, ADDRESS BIT 20 OF CPU IS MASKED. |
| 2 | MSDATA # (output) | THIS IS OUTPUT PORT OF DATA SIGNAL WHEN DATA IS TRANSMITTED TO MOUSE. |
| 3 | MSCLK # (output) | THIS IS OUTPUT PORT TO CLOCK SIGNAL OF MOUSE INTERFACE. |
| 4 | IRQ1 | WHEN HIGH-LEVEL PULSE IS OUTPUTTED TOWARD IRQ1, IRQ1 OCCURS. |
| 5 | IRQ12 | WHEN HIGH-LEVEL PULSE IS OUTPUTTING TOWARD IRQ12, IRQ12 OCCURS. |
| 6 | KBCLK# (output) | THIS IS OUTPUT PORT OF DATA SIGNAL WHEN DATA IS TRANSMITTED TOWARD KEYBOARD. |
| 7 | KBDATA# (output) | THIS IS OUTPUT PORT TO CLOCK SIGNAL OF KEYBOARD INTERFACE. |

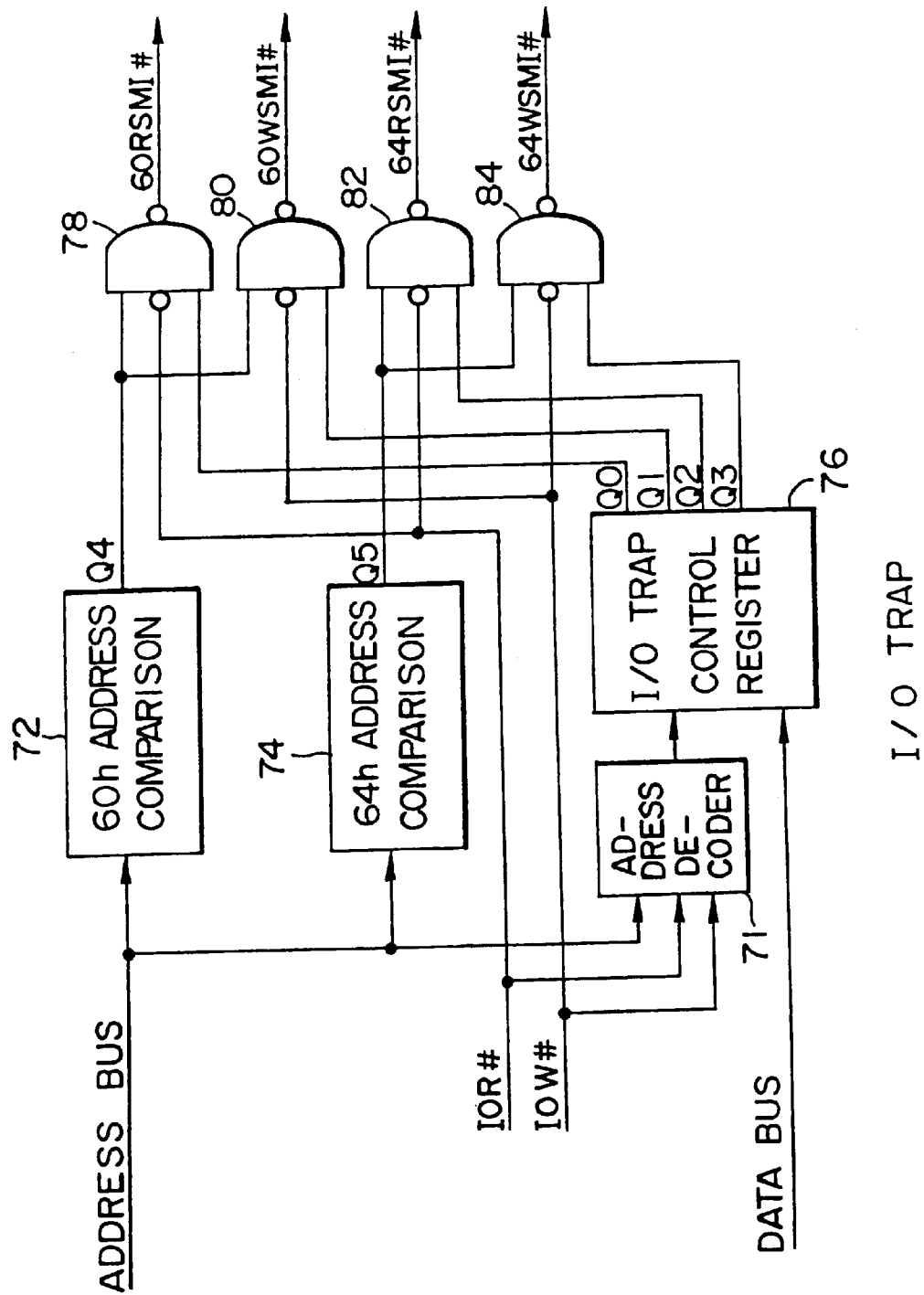

FIG. 16

I/O TRAP CONTROL REGISTER

| bit | function | description |
|---|---|---|
| 0 | I/O Trap Port 60h Read Enable | 0: TRAP TO I/O READ OF PORT 60h IS DISABLED.<br>1: TRAP TO I/O READ OF PORT 60h IS ENABLED. |
| 1 | I/O Trap Port 60h Write Enable | 0: TRAP TO I/O WRITE OF PORT 60h IS DISABLED.<br>1: TRAP TO I/O WRITE OF PORT 60h IS ENABLED. |
| 2 | I/O Trap Port 64h Read Enable | 0: TRAP TO I/O READ OF PORT 64h IS DISABLED.<br>1: TRAP TO I/O READ OF PORT 64h IS ENABLED. |
| 3 | I/O Trap Port 64h Write Enable | 0: TRAP TO I/O WRITE OF PORT 64h IS DISABLED.<br>1: TRAP TO I/O WRITE OF PORT 64h IS ENABLED. |
| 7~4 | | |

FIG. 18

SMI STATUS REGISTER

| bit | function | description |
|---|---|---|
| 0 | I/O Trap Port 60h Read SMI Request | THIS SHOWS SMI DUE TO TRAP OF I/O READ AT PORT 60h. THIS BIT IS RESET WHEN THIS REGISTER (SMI STATUS REGISTER) IS READ. |
| 1 | I/O Trap Port 60h Write SMI Request | THIS SHOWS SMI DUE TO TRAP OF I/O WRITE AT PORT 60h. THIS BIT IS RESET WHEN THIS REGISTER (SMI STATUS REGISTER) IS READ. |
| 2 | I/O Trap Port 64h Read SMI Request | THIS SHOWS SMI DUE TO TRAP OF I/O READ AT PORT 64h. THIS BIT IS RESET WHEN THIS REGISTER (SMI STATUS REGISTER) IS READ. |
| 3 | I/O Trap Port 64h Write SMI Request | THIS SHOWS SMI DUE TO TRAP OF I/O WRITE AT PORT 64h. THIS BIT IS RESET WHEN THIS REGISTER (SMI STATUS REGISTER) IS READ. |
| 4 | Keyboard Data Reception SMI Request | THIS SHOWS SMI DUE TO DATA RECEPTION FROM KEYBOARD. THIS BIT IS RESET WHEN THIS REGISTER (SMI STATUS REGISTER) IS READ. |
| 5 | Mouse Data Reception SMI Request | THIS SHOWS SMI DUE TO DATA RECEPTION FROM MOUSE. THIS BIT IS RESET WHEN THIS REGISTER (SMI STATUS REGISTER) IS READ. |
| 7, 6 | | |

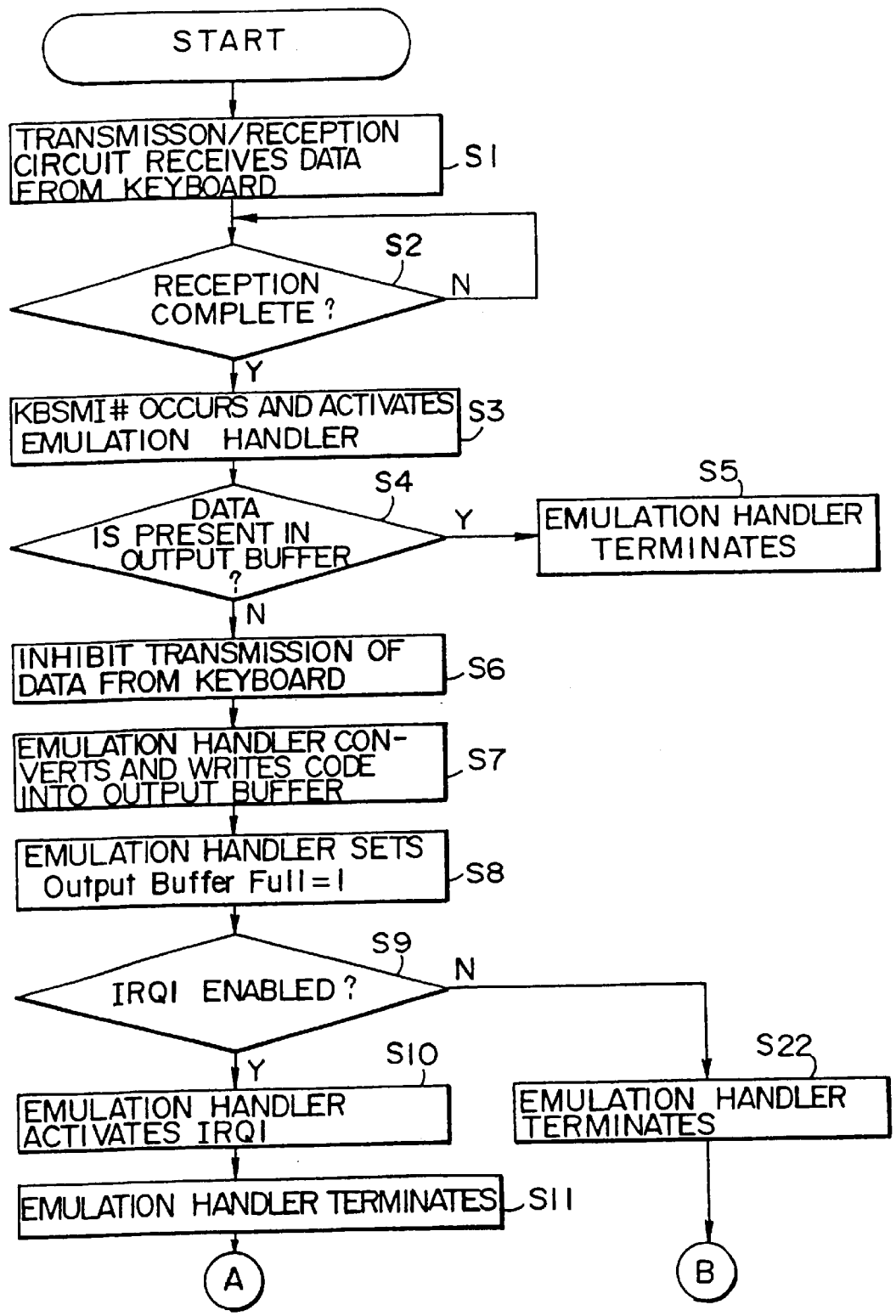
FIG. 19 TRANSMISSION OF DATA FROM KEYBOARD TO BIOS (EMBODIMENT OF THE INVENTION)

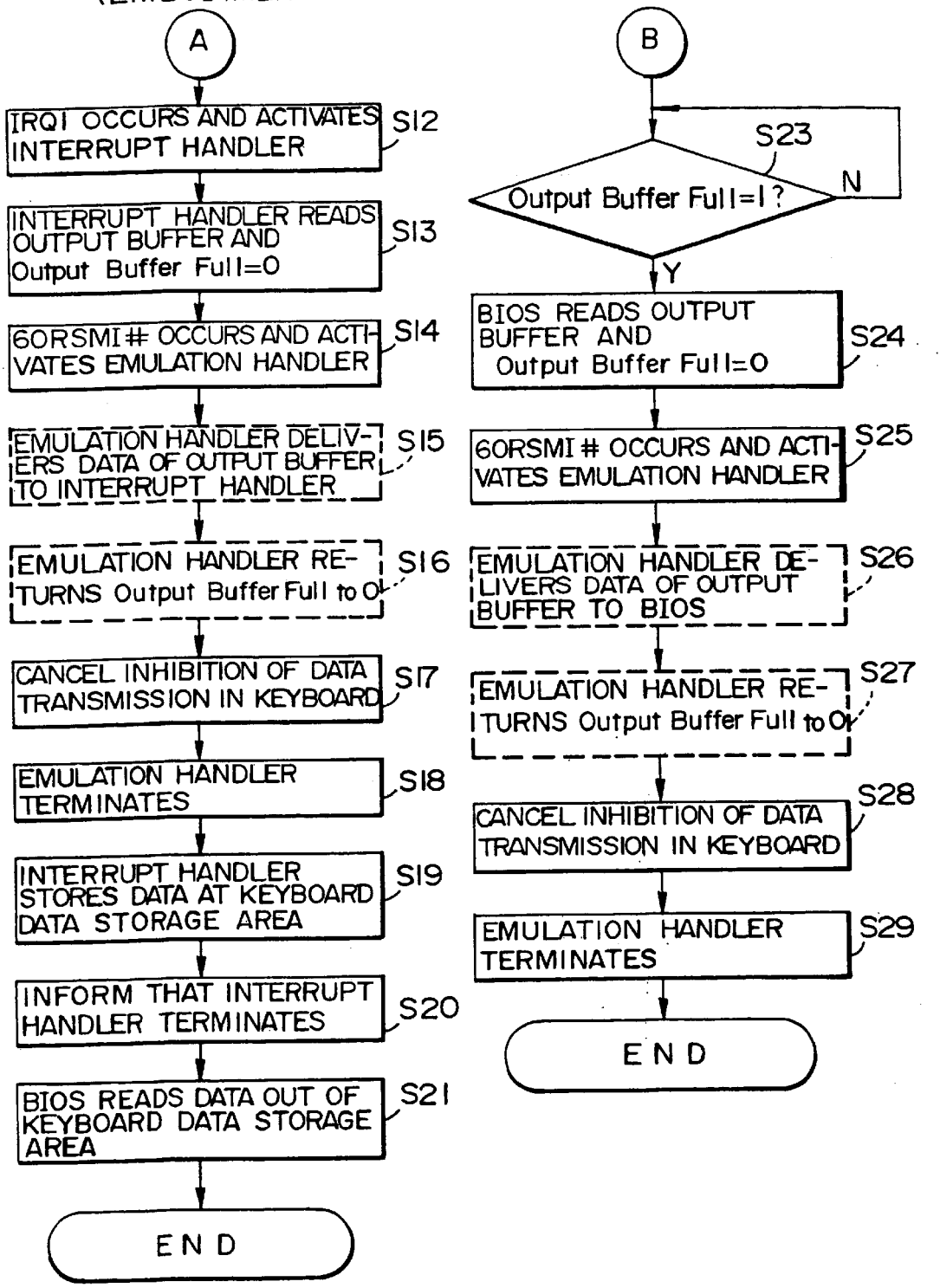

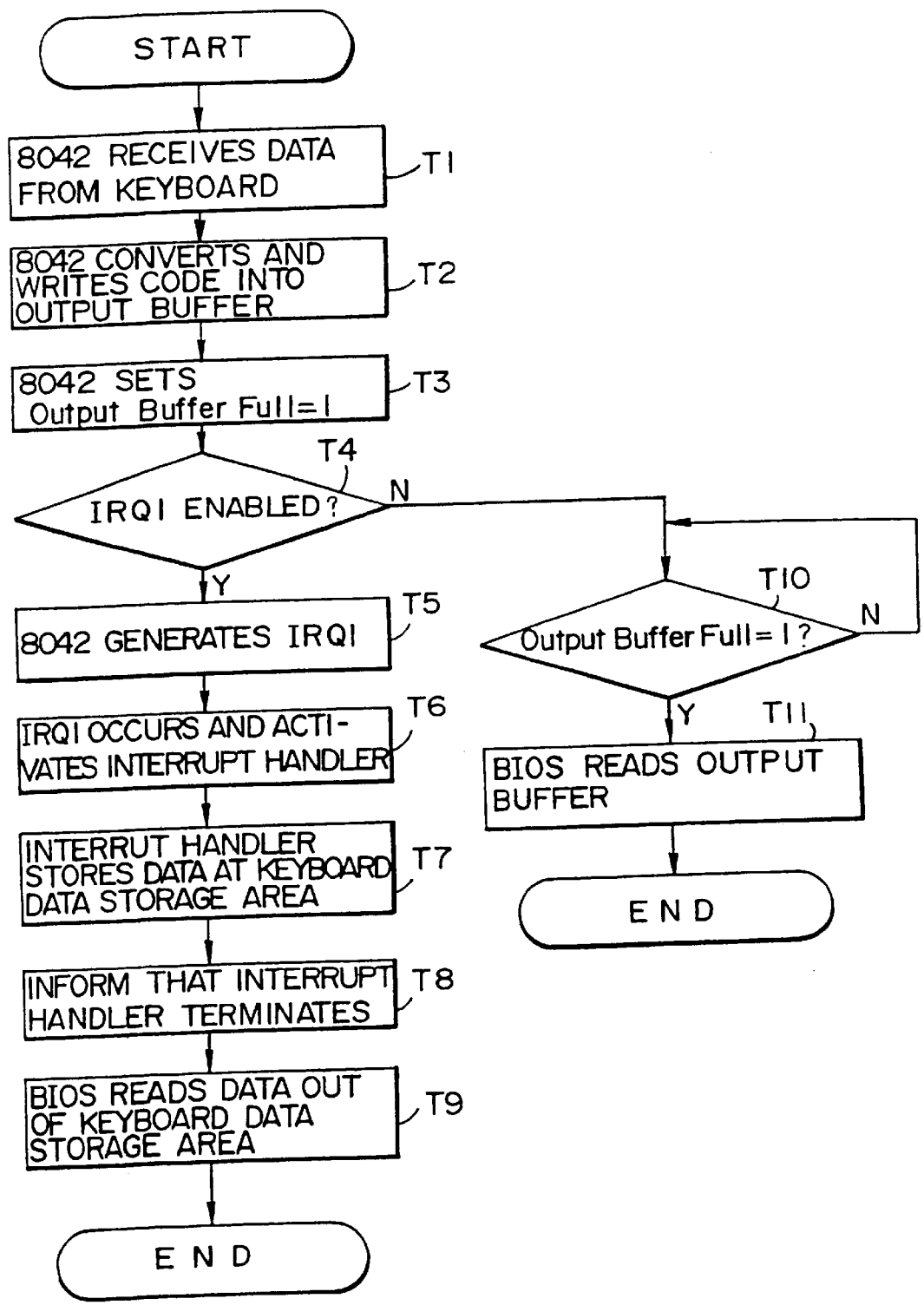
FIG. 21 TRANSMISSION OF DATA FROM KEYBOARD TO BIOS (8042)

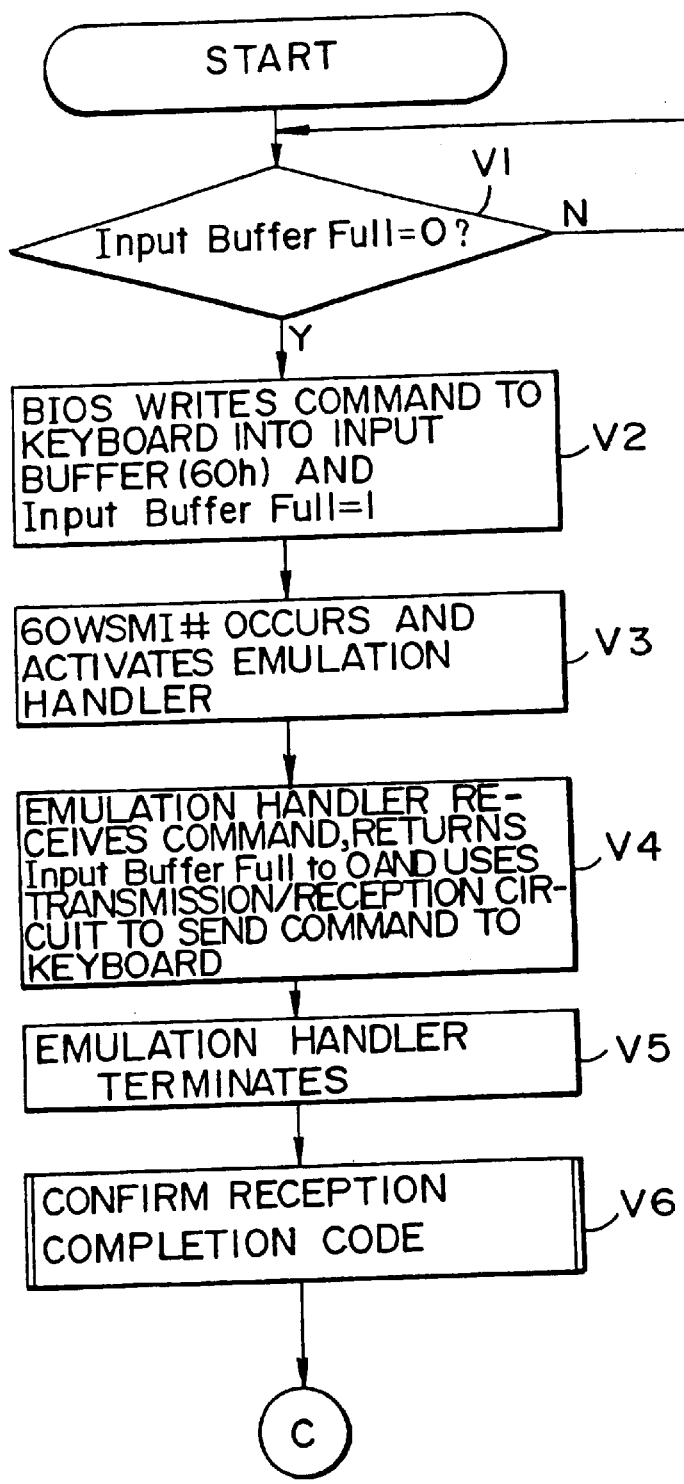
FIG. 22 TRANSMISSION OF COMMAND FROM BIOS TO KEYBOARD (EMBODIMENT OF THE INVENTION)

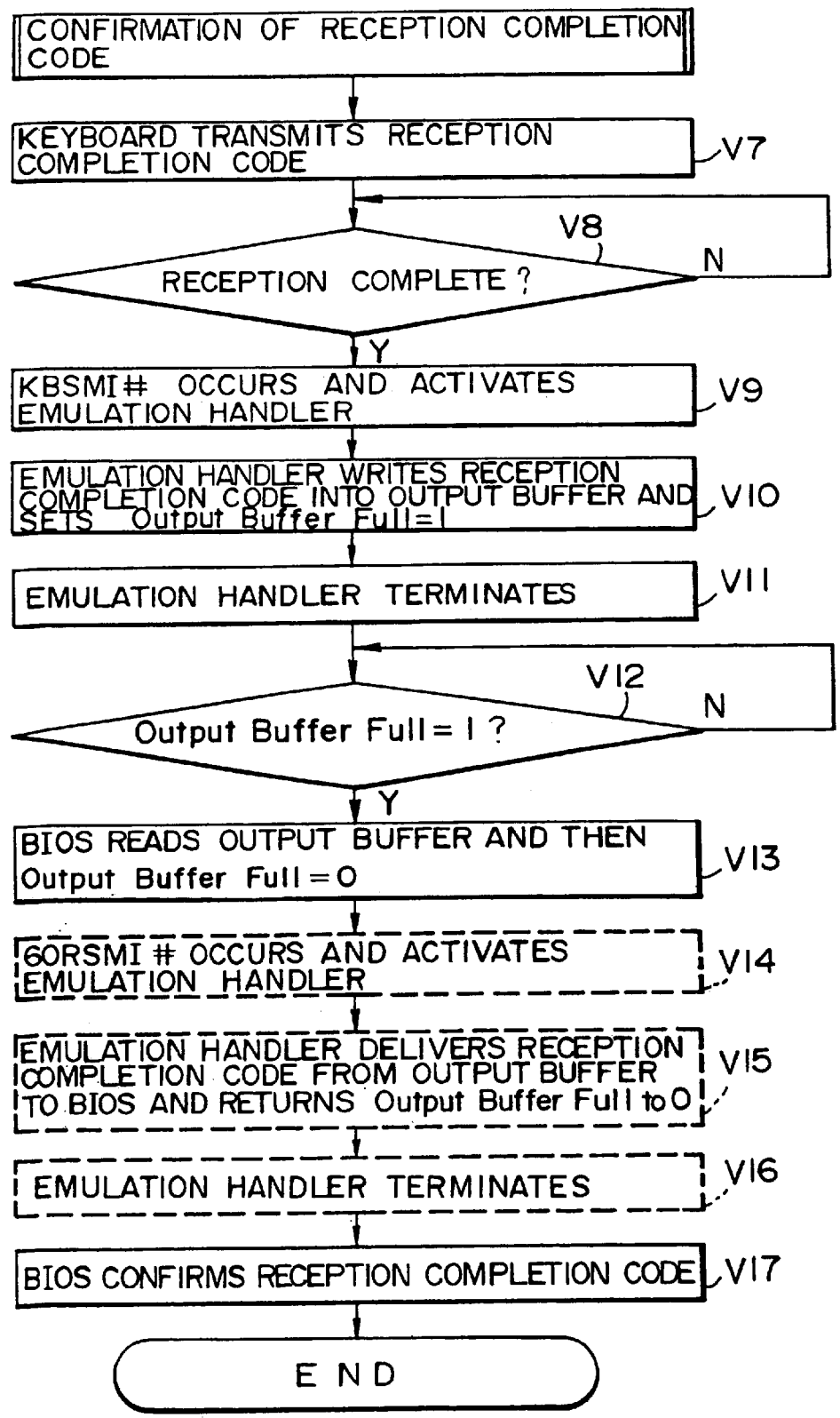
FIG.23 CONFIRMATION OF RECEPTION COMPLETION CODE (EMBODIMENT OF THE INVENTION)

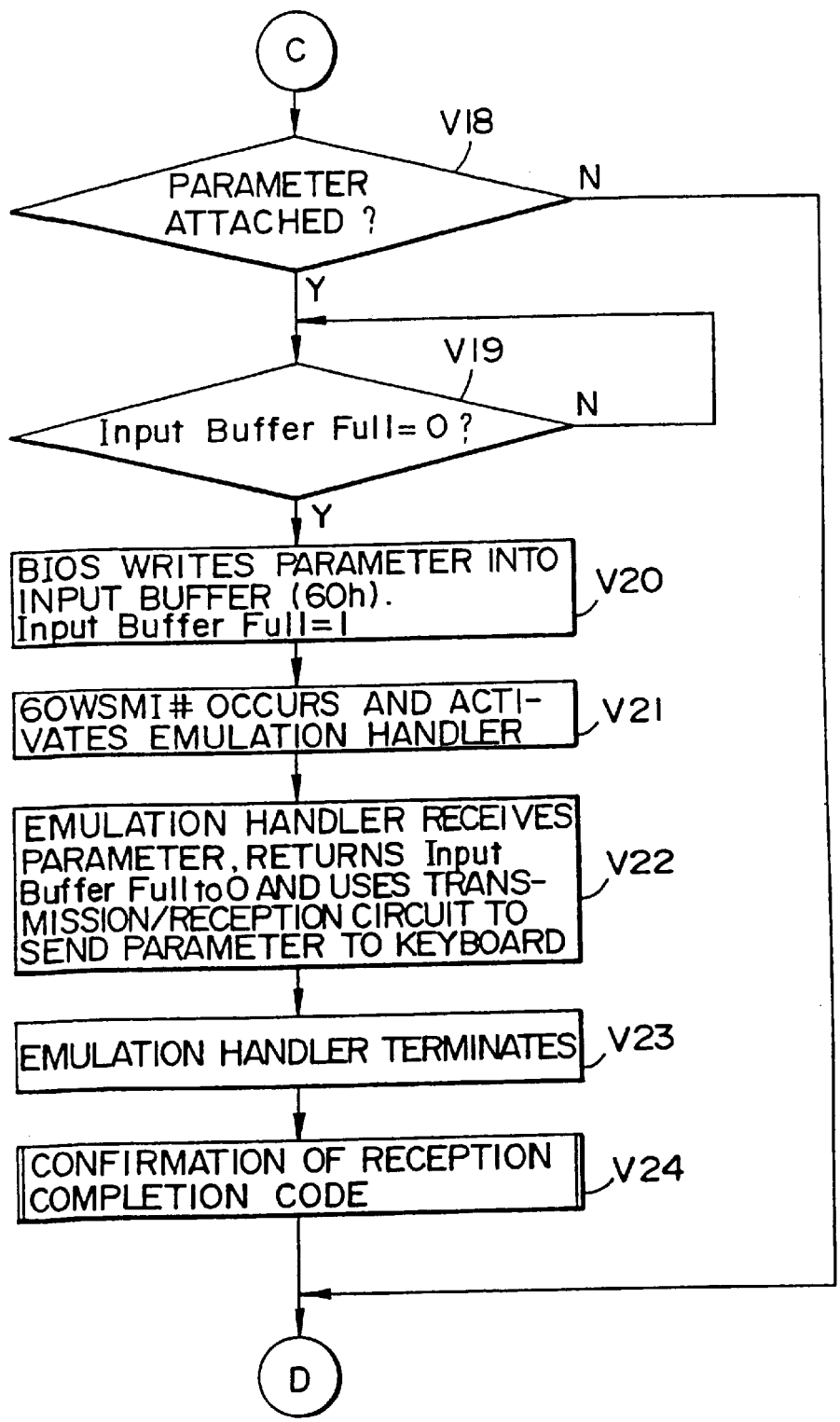

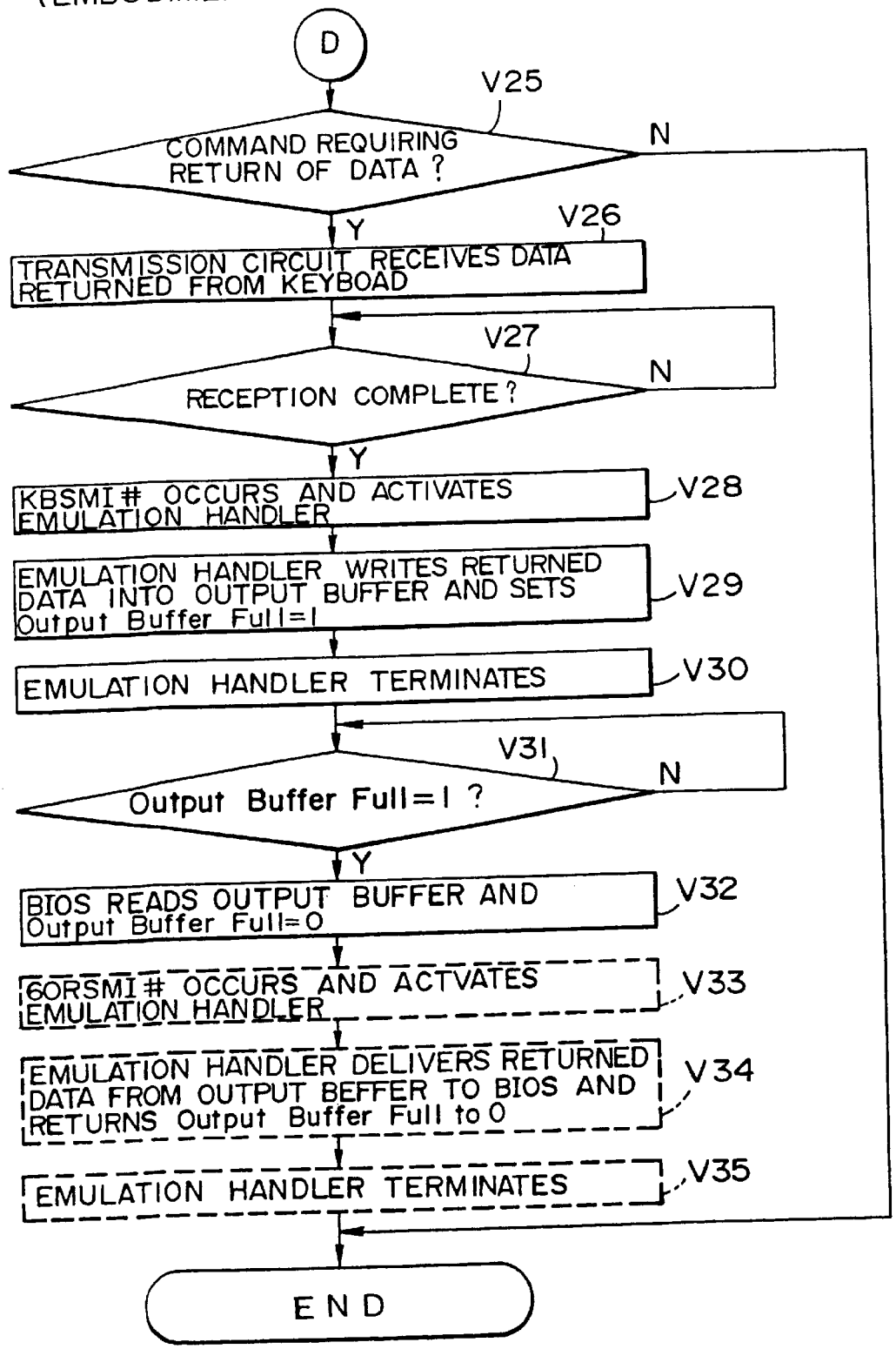
FIG.25 TRANSMISSION OF COMMAND FROM BIOS TO KEYBOARD (EMBODIMENT OF THE INVENTION)(RETURN OF DATA)

FIG. 26 TRANSMISSION OF COMMAND FROM BIOS TO KEYBOARD (8042)
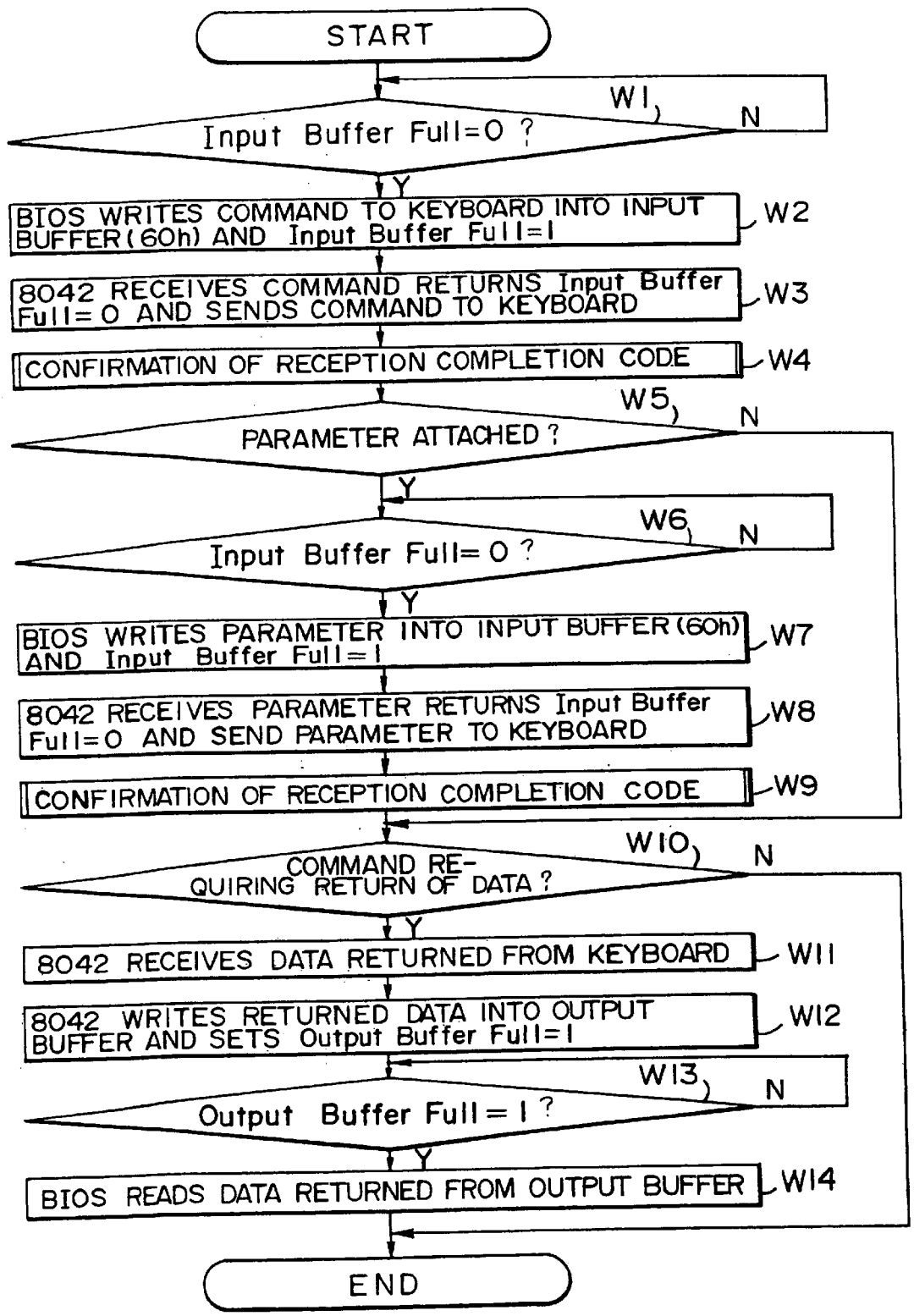

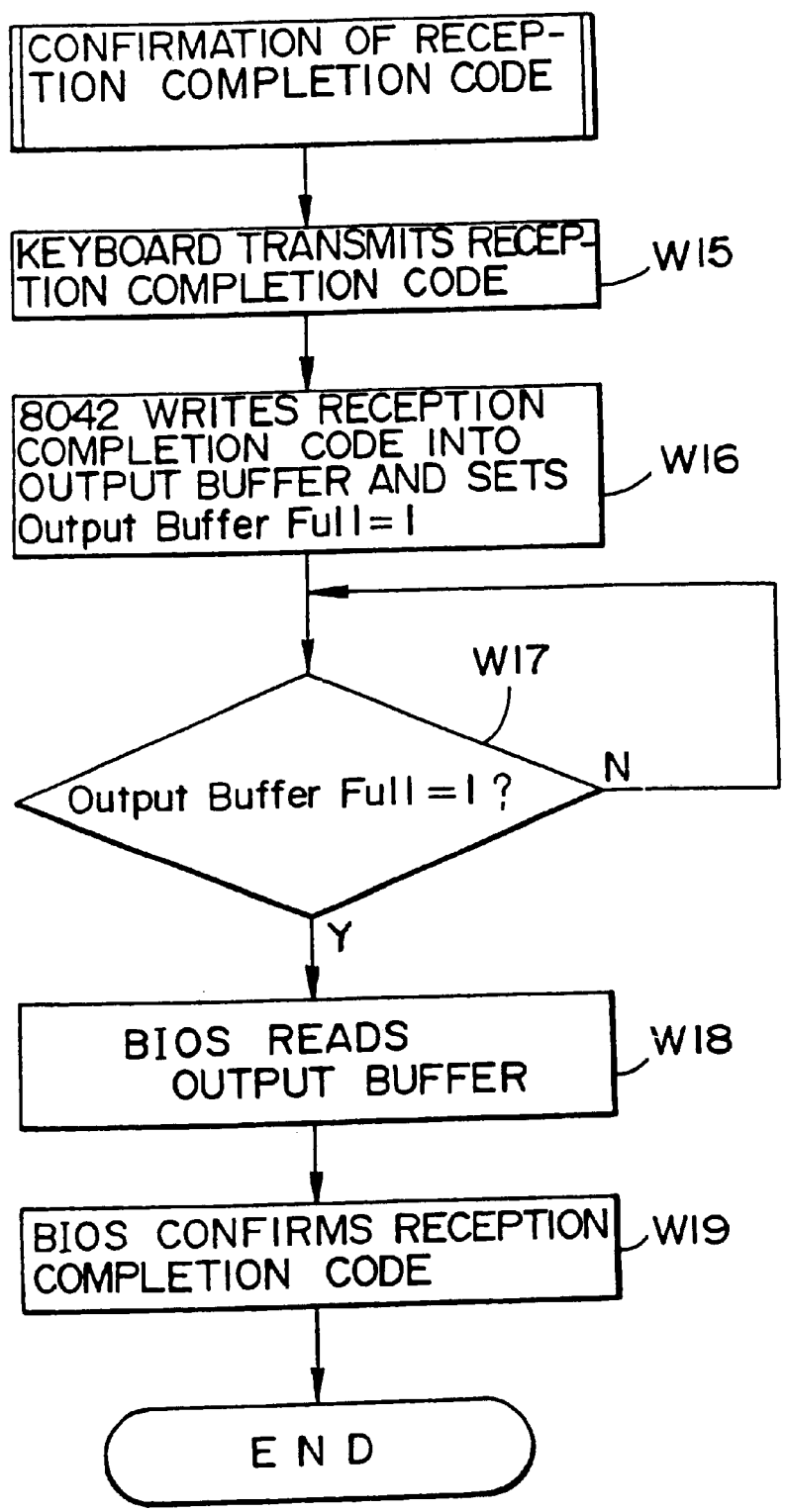
FIG. 27 CONFIRMATION OF RECEPTION COMPLETION CODE (8042)

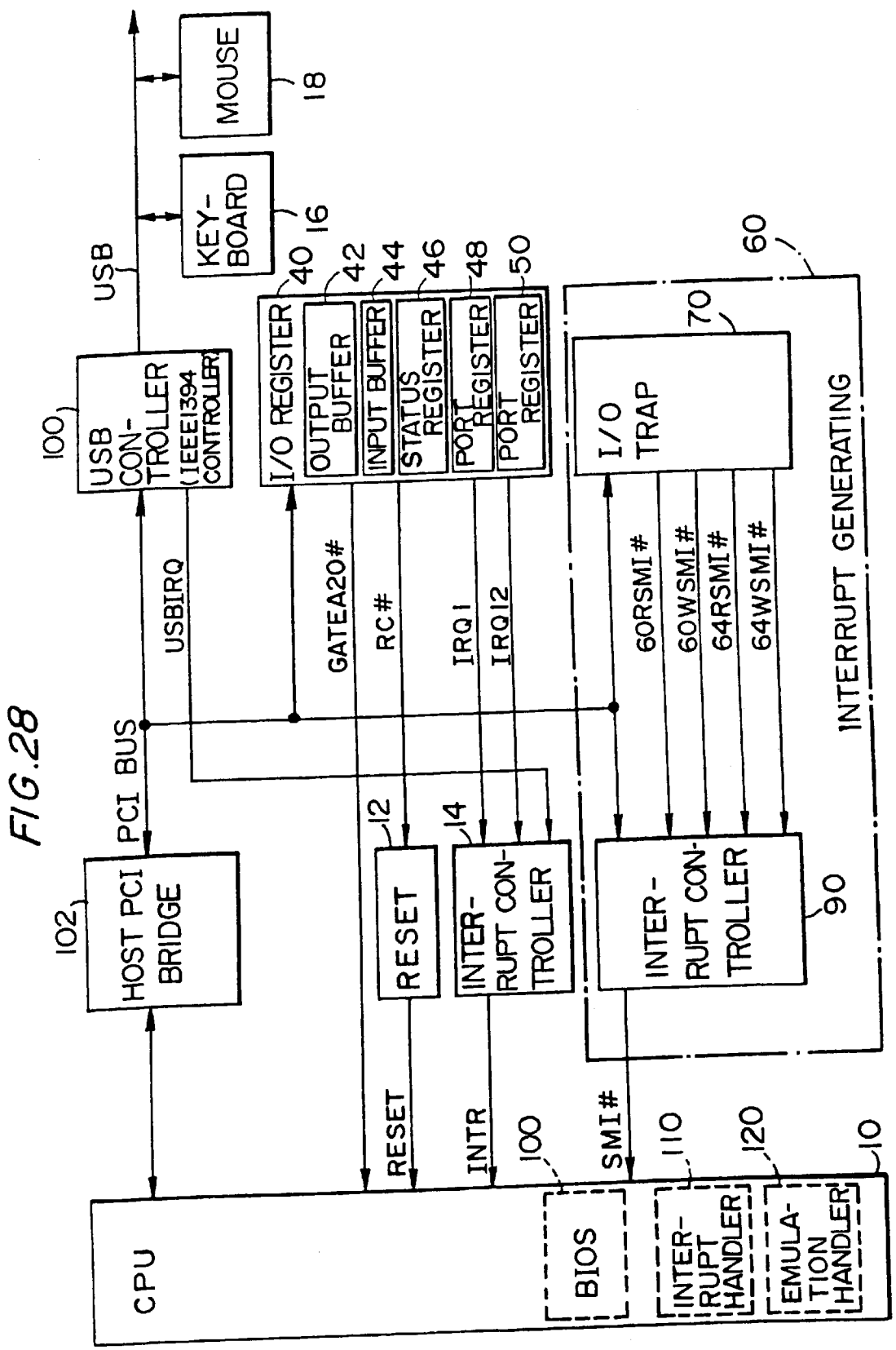

PORT REGISTER 48

PORT REGISTER 50

METHOD AND DEVICE FOR EMULATION OF PERIPHERAL INPUT/OUTPUT (I/O) CONTROLLER OF A COMPUTER SYSTEM

TECHNICAL FIELD

The present invention relates to an emulation system and an information processing device.

BACKGROUND ART

An interface between CPU 900 and input devices including keyboard 950 and mouse 960 in a conventional personal computer (PC) which is an information processing device is shown in FIG. 1. Between the CPU 900 and the keyboard and mouse (950, 960), there exists an input/output controller which comprises a chip (e.g., the Intel 8042) or compatible chip of 8042 and its peripheral circuits. In such PC, data will not be transmitted directly between the CPU 900 and the keyboard and mouse (950, 960). Instead, the 8042 (or firmware operating on the 8042) performs the control of the keyboard and mouse (950, 960) and the reception/transmission of data. The firmware has been stored in ROM within the 8042. In FIG. 1, other reference numerals 910, 912 and 914 denote an address decoder, interrupt controller and reset circuit, respectively.

FIG. 2 is an internal block diagram showing the details of the input/output controller. The 8042 comprises a processor 920, an output buffer 922, an input buffer 924, a status register 926, port registers (I/O ports) 928, 930 and others.

The reception/transmission of data in this arrangement of the prior art will now be described in brief.

1. When data is transmitted from BIOS (which is an input/output handler) to the 8042:
    (1) BIOS waits until "Input Buffer Full", that is a flag held by the status register 926, becomes 0; and
    (2) BIOS writes data on the input buffer (port 60*h* or 64*h*) if "Input Buffer Full" becomes 0.
2. When BIOS receives data from the 8042 without interrupt:
    (1) BIOS waits until a flag "Output Buffer Full" of the status register 926 becomes 1; and
    (2) BIOS reads data from the output buffer 922 (port 60*h*) if "Output Buffer Full" becomes 1.
3. When BIOS receives data from the 8042 with interrupt:
    (1) If IRQ1 or IRQ12 occurs, the control is shifted to its interrupt handler (which is one of input/output handlers);
    (2) The interrupt handler reads data from the output buffer 922 (port 60*h*);
    (3) The interrupt handler executes a predetermined process such as storing the read data in a given memory area; and
    (4) The control is returned from the interrupt handler.

However, the prior art raised problems as follows.

(A) The necessity of the 8042 leads to an increased cost.
(B) The 8042 requires an additional area on which it is to be mounted.
(C) The 8042 requires an executable firmware. In other words, the system requires two types of programming languages for both CPU and the 8042.
(D) Since a firmware is normally stored in the mask ROM within the 8042, time and cost are required to change the firmware for correcting any trouble or for adding any additional function.

One emulation technique relating to an input/output controller such as the 8042 is known, for example, from Japanese Patent Application Laid-Open No. 7-334373. PC9821 produced by NEC (which uses a second architecture) or PC 486 produced by Seiko Epson Co. uses the Intel 8251A as an input-output controller for keyboard or others. An object of this prior art is to use the 8042 used in PC/AT computer (which uses a first architecture) produced by IBM as an input-output controller for PC9821 or the like, instead of the 8251A.

The 8042 suiting to the PC/AT machines of the first architecture that dominates large shares of the hardware and software markets can relatively early be developed for advanced machines and more easily be available, than the 8251A suiting to the PC9821 machines of the second architecture. If the 8042 is used in the PC9821 machines, therefore, the developing and manufacturing costs thereof can be reduced. Thus, the aforementioned prior art realized various emulation techniques for properly actuating the 8042 in the PC9821 machines in which the software for the 8251A operates.

However, this prior art cannot still overcome the above problems (A)–(D). More particularly, this prior art utilizes the hardware resource of the 8042 to perform an emulation. Thus, it still requires the 8042, resulting in increase of the manufacturing cost. Furthermore, the prior art also requires an additional area on which the 8042 is to be mounted and two types of programming languages for CPU and the 8042. In addition, time and cost are required to modify the firmware.

In view of the above problems of the prior art, an object of the present invention is to provide an emulation system and information processing device which can realize an emulation for the input/output controller without utilization of the hardware resource of the input/output controller

DISCLOSURE OF THE INVENTION

To this end, the present invention provides an emulation system for emulating an input/output controller which controls an input/output device without the hardware resource of the input/output controller. This emulation system comprises: a reception/transmission circuit for receiving data from and transmitting data to the input/output device; at least one of an output buffer for temporarily storing data from the input/output device, an input buffer for temporarily storing data from a given input/output handler, a status register for storing given status data, and a port register for transmitting given data to an external means; an interrupt generating circuit for generating a first interrupt for a central control means; and an emulation handler which is activated by the first interrupt for executing a given emulation.

By providing the reception/transmission circuit, the reception/transmission of data from and to the input/output devices such as mouse, keyboard and the like can be performed. The output buffer can temporarily store the data from the input/output devices while the input buffer can temporarily store the data from the input/output handler such as BIOS or interrupt handler. The status register can transmit the given status data to the input/output handler and the port register can transmit various data to the external. When the emulation handler is activated by the first interrupt from the interrupt generating circuit, the emulation handler can execute various processes such as the mutual delivery of data between the reception/transmission circuit and the output buffer or between the input/output handler and the input buffer, the control of the reception/transmission circuit, the writing of data into the status register or port register and so on. Therefore, the input/output controller can be emulated without utilization of the hardware resource thereof. AS a result, the cost of manufacturing the information processing device can be reduced, and firmware languages required to operate the information processing device can be unified. In addition this information processing device can easily accommodate a new input/output device.

The interrupt generating circuit may generate the first interrupt when reception of data from the input/output device is completed by the reception/transmission circuit, and the emulation handler activated by this first interrupt may read data from the reception/transmission circuit and write the data or converted data into the output buffer. In this way, the emulation of data transfer from the input/output device to the output buffer can be accomplished while maintaining the compatibility with the case wherein the input/output controller is used.

The reception/transmission circuit may include a circuit for converting serial data send by the input/output device into parallel data, and the interrupt generating circuit may generate the first interrupt when conversion of serial data into parallel data is completed by the reception/transmission circuit. The reception of data from the input/output device is thus possible without monitoring transfer clocks which are used in the reception of data from the input/output device. This reduces a burden in processing.

The emulation handler may terminate emulation without writing data into the output buffer when the input/output handler has not read data in the output buffer. Any later received data can be thus prevented from not being delivered to the input/output handler. This can avoid any loss of received data.

After the reception/transmission circuit completes reception of data from the input/output device, the emulation handler may inhibit the input/output device from transmitting subsequent data until the emulation handler delivers received data to the input/output handler. In this way, the data from the input/output device can be prevented from being repeatedly received. This enables proper data reception.

The emulation handler may set an output buffer data presence flag in the status register after writing data into the output buffer, and then terminate emulation. The presence of data in the output buffer can be thus transmitted to the input/output handler. Therefore, the input/output handler ran read the output buffer after being enabled to start processing.

The output buffer data presence flag may be reset when the input/output handler reads the output buffer after confirming that the output buffer data presence flag has been set. The output buffer data presence flag can be reset by a given circuit when the output buffer is read by the input/output handler. Therefore, it is not required to activate the emulation handler only for resetting the output buffer data presence flag. This reduces a burden in processing. It is further desirable that the emulation handler is again activated if there is any other necessary processing such as cancel of inhibition of data transfer of the input/output device when the output buffer is read by the input/output handler.

The interrupt generating circuit may generate the first interrupt again when the input/output handler reads the output buffer after confirming that the output buffer data presence flag has been set, and the emulation handler activated again by the first interrupt may execute a given processing corresponding to a factor of the first interrupt. In this way, the emulation handler can be used to accomplish a given processing such as delivery of data from the output buffer to the input/output handler, reset of the output buffer data presence flag in the status register, cancel of inhibition of data transfer of the input/output device.

The interrupt generating circuit may generate the first interrupt when the input/output handler writes data into the input buffer, and the emulation handler activated by this first interrupt may receive data writter into the input buffer and reset an input buffer data presence flag in the status resister, the input buffer data presence flag having been previously set by the writing operation of the input/output handler. In this way, the emulation of receiving data from the input/output handler can be realized while maintaining the compatibility with the case where the input/output controller is used.

In this case, data written into the input buffer is intended to be data in a broad sense, including data in a narrow sense, commands or the like. In addition to data to be transmitted to the input/output device, various types of data such as data to be written into the port register can be send by the input/output handler. It is further desirable that a given circuit is used to set the input buffer data presence flag when the input/output handler writes into the input buffer.

The emulation handler may write received data into the reception/transmission circuit. The data can be transmitted to the input/output device without the input/output handler knowing the intervention of emulation.

The reception/transmission circuit may include a circuit for converting parallel data written by the emulation handler into serial data. In this way, data can be transmitted to the input/output device without monitoring transfer clocks which are used in the transmission of data to the input/output device. This reduces a burden in processing.

When data from the input/output handler is a command with a parameter, the emulation handler may transmit the command to the input/output device through the input buffer and the reception/transmission circuit, and then enable the input/output handler to start processing; when the input/output handler starts processing and writes the parameter into the input buffer, the interrupt generating circuit may generate the first interrupt again; and the emulation handler activated again by the first interrupt may transmit the parameter to the input/output device through the input and output buffers and the reception/transmission circuit. Even if data from the input/output handler is a command with a parameters the command or parameter can be transmitted to the input/output device while maintaining the compatibility with the case where the input/output controller is utilized.

The present invention further provides an emulation system for emulating an input/output controller which controls input/output devices. This emulation system comprises: an Universal Serial Bus (USB) controller for receiving and transmitting data from and to a plurality of input/output devices connected to USB; at least one of an output buffer for temporarily storing data from the input/output devices, an input buffer for temporarily storing data from a given input/output handler, a status register for storing given status data, and a port register for transmitting given data to an external means; an interrupt generating circuit for generating a first interrupt for a central control means; and an emulation handler which is activated by the first interrupt for executing a given emulation. The present invention further provides an emulation system for emulating an input/output controller which controls input/output devices. This emulation system comprises: an IEEE1394 controller for receiving and transmitting data from and to a plurality of input/output devices connected to a bus meeting the IEEE1394 standard; at least one of an output buffer for temporarily storing data from the input/output devices, an input buffer for temporarily storing data from a given input/output handler, a status register for storing given status data, and a port register for transmitting given data to an external means; an interrupt generating circuit for generating a first interrupt for a central control means; and an emulation handler which is activated by the first interrupt for executing a given emulation.

According to the present invention, USB or the IEEE1394 interface, which realizes a high-speed serial data transfer, Plag and Play, and connection with a number of input/output devices without modification of application program or operating system, can be utilized. Furthermore, the compatibility can highly be improved in comparison with the case where the emulation is performed by device drivers.

The USB controller may generate a second interrupt for the central control means when receiving data from the input/output devices, and an interrupt handler activated by the second interrupt may enable the emulation handler to start processing only when the received data is send by a particular input/output device. The IEEE1394 controller also may generate a second interrupt for the central control means when receiving data from the input/output devices; and an interrupt handler activated by the second interrupt may enable the emulation handler to start processing only when the received data is send by a particular input/output device. In this way, only when data is transmitted by a particular input/output device, that is a keyboard or mouse for example, the emulation can be performed. Therefore, the emulation system can appropriately accommodate even when various other input/output devices are connected to USB or the IEEE1394 bus.

The present invention further provides an emulation system for emulating an input/output controller which controls an input/output device without the hardware resource of the input/output controller. This emulation system comprises: at least one of an output buffer for temporarily storing data from the input/output device, an input buffer for temporarily storing data from a given input/output handler, a status register for storing given status data, and a port register for transmitting given data to an external means; an interrupt generating circuit for generating a first interrupt for a central control means; and an emulation handler which is activated by the first interrupt for executing a given emulation; wherein the emulation handler emulates processings of at least one of a processor in the input/output controller and a processor in the input/output device.

According to the present invention, processings of one of the processors in the input/output controller and input/output device can be emulated. The prior art required three processors, including a processor in the main unit of an information processing device, if both the input/output controller and input/output device have processors. However, the present invention can omit, for example, all the processors other than the main unit processor, resulting in reduction of the hardware scale. If the emulation handler emulates processings of the processor in the input/output device, the reception/transmission circuit is not necessarily required.

The emulation handler may write at least one of an output buffer data presence flag, an input buffer data presence flag and an input/output device identification flag into the status register instead of at least one of the processors. The output buffer data presence flag, input buffer data presence flag and input/output device identification flag can be set without using the processors of the input/output controller and input/output device. Therefore, an appropriate emulation can be executed while reducing the hardware scale.

The emulation handler may write data for generating a second interrupt for the central control means into the port register instead of at least one of the processors. The second interrupt can be generated without using the processors of the input/output controller and input/output device, and can be used to execute various interrupt processings.

By making a signal of the first interrupt active for a given time period after the central control means executes an input/output instruction, the central control means may shift surely to a management mode activated by the first interrupt before executing a subsequent instruction. When the central control means executes an input/output instruction, the executed input/output instruction can be trapped so that the system can surely be shifted to the emulation processing.

The first interrupt may be a System Management Interrupt (SMI). By using SMI and activating the SMI signal for a given time period after the central control means has executed an input/output instruction, the central control means can surely shift to the System Management Mode (SMM) for performing the emulation before executing the next instruction.

The present invention further provides an information processing device including any one of the aforementioned emulation systems, wherein circuitry of the emulation system is formed on one chip together with other circuits of the information processing device. Since the area on which the input/output controller IC is mounted can be saved, resulting in a compact information processing device.

The present invention further provides an information processing device including any one of the aforementioned emulation systems, wherein a keyboard which is the input/output device is formed integrally with a main unit including the central control means. Particularly when emulating processings of a processor in the keyboard, the number of processors required by the information processing device can be reduced. Therefore, the size and cost of the information processing device can be reduced.

The present invention further provides a card-sized information processing device including any one of the aforementioned emulation systems, wherein at least the central control means and a memory are mounted on a card-sized board. This card type information processing device can emulate the input/output controller without using the hardware resource thereof. This can provide a card type information processing device of more compacted size.

BRIEF DESCRIPTION OF THE DRAWINGS

FIGS. 5A, 5B, 5C and 5D are tables showing respective registers included in a reception/transmission circuit.

FIGS. 6A and 6B show waveforms of signals KBCLK and KBDATA.

FIG. 7 is a table showing the intention of each bit in a keyboard/mouse control register.

FIG. 8 is a table showing the intention of each bit in a keyboard/mouse status register.

FIG. 11 is a table showing the intention of each bit in a status register of the first embodiment.

FIG. 12 is a table showing the intention of each bit in a status register of the 8042.

FIGS. 13A and 13B are tables showing the intention of each bit in port registers of the first embodiment.

FIGS. 14A and 14B are tables showing the intention of each bit in port registers of the 8042.

FIG. 15 shows a structure of an I/O trap circuit.

FIG. 16 is a table showing the intention of each bit in an I/O trap control register.

FIG. 18 is a table showing the intention of each bit in an SMI status register.

FIG. 19 is a flowchart illustrating the process of transmitting data from a keyboard to BIOS by the first embodiment.

FIG. 20 is a flowchart illustrating the process of transmitting data from a keyboard to BIOS by the first embodiment.

FIG. 21 is a flowchart illustrating the process of transmitting data from a keyboard to BIOS by the 8042.

FIG. 22 is a flowchart illustrating the process of transmitting data from BIOS to a keyboard by the first embodiment.

FIG. 23 is a flowchart illustrating the process of confirming a reception completion code by the first embodiment.

FIG. 24 is a flowchart illustrating the process of transmitting data from BIOS to a keyboard by the first embodiment.

FIG. 25 is a flowchart illustrating the process of transmitting data from BIOS to a keyboard by the first embodiment.

FIG. 26 is a flowchart illustrating the process of transmitting data from BIOS to a keyboard by the 8042.

FIG. 27 is a flowchart illustrating the process of confirming a reception completion code by the 8042.

FIG. 28 is a block diagram of an emulation system applied to USB.

BEST MODE FOR CARRYING OUT THE INVENTION

Figure 1:
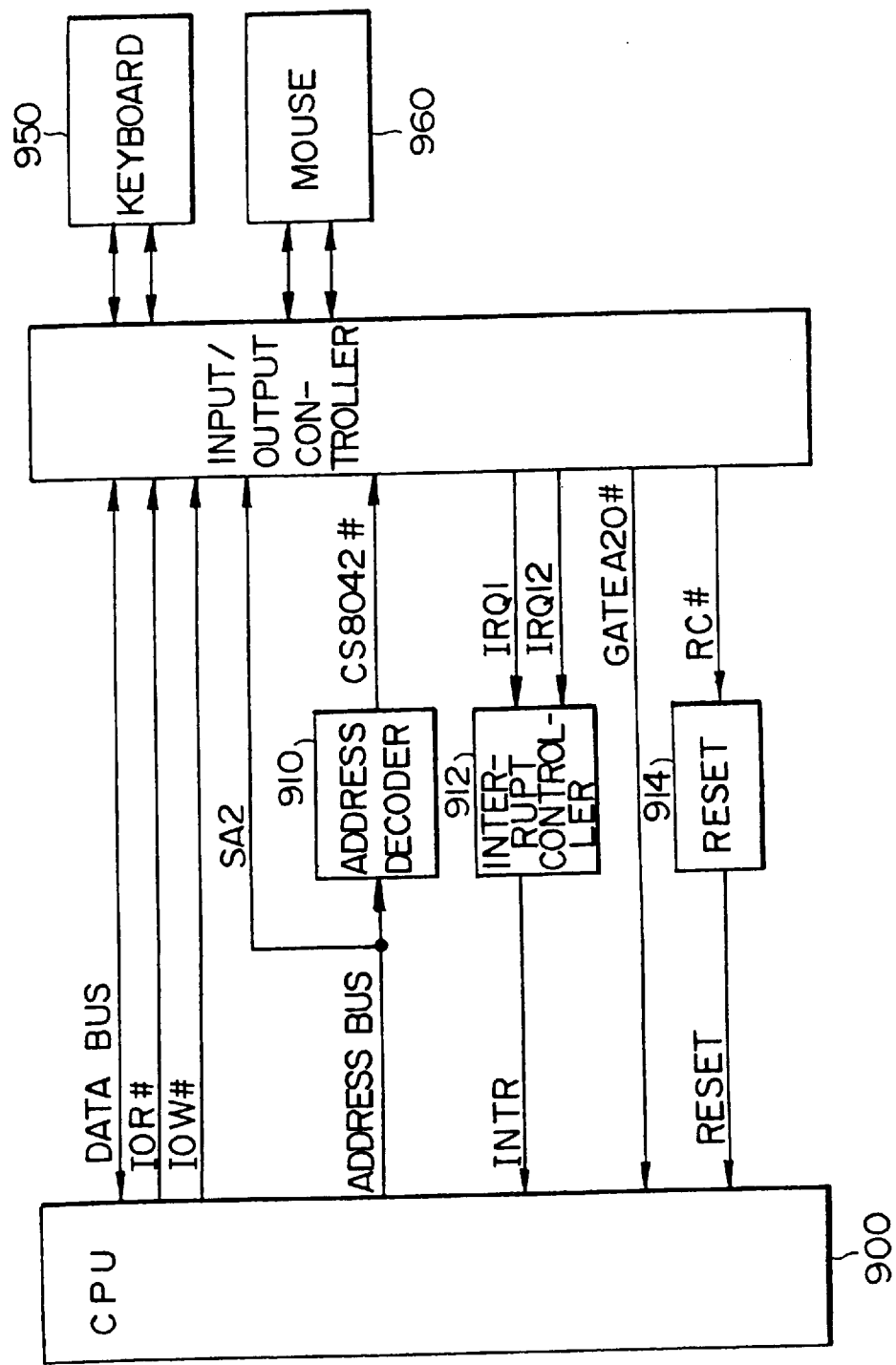
FIG. 1 is a block diagram illustrating an input/output controller containing the 8042.

Some forms of the present invention will now be described with reference to the drawings.

First Embodiment

1. Configuration 1.1 Overall Arrangement

The configuration of the first embodiment will first be described with reference to FIG. 3. An emulation system according to this embodiment comprises a reception/transmission circuit 20, an I/O register 40, an interrupt generating circuit 60 and an emulation handler 120.

The reception/transmission circuit 20 is designed to perform the reception/transmission of data between this circuit 20 and input/output devices including a keyboard 16, a mouse 18 and others.

The I/O register 40 comprises a output buffer 42, an input buffer 44, a status register 46 and port registers 48 and 50. The output buffer 42 can temporarily store data from the keyboard and mouse 16, 18 while the input buffer 44 can temporarily store data from input/output handlers such as BIOS 100, interrupt handler 110 and the like. The status register 46 stores status data (such as data representing the operational state of the 8042 to be emulated and so on). The port registers 48 and 50 are designed to transmit a given data to any external.

The interrupt generating circuit 60 comprises an I/O trap circuit 70 and an interrupt controller go and generates SMI# (first interrupt) to the central control means (CPU) 10. The System Management Interrupt (SMI) is an interrupt on transition to the System Management Mode (SMM) which is supported by the Intel CPU. SMI is a function incorporated into the advanced Intel CPU as a special interrupt means for controlling a source of power.

The emulation handler 120 is activated by the SMI# to perform a given emulation according to a given program under the environment of the aforementioned SMM. A reset circuit 12 is provided to output RESET signal toward CPU 10. The interrupt controller 14 outputs INTR (second interrupt) toward the CPU 10.

The first embodiment is characterized by that it can accomplish the same function as in the 8042 without utilization of the hardware resource thereof. For such a purpose, the first embodiment is provided with the reception/transmission circuit 20 capable of performing the reception/transmission of data with the keyboard 16 and the mouse 18. The first embodiment is also provided with the output buffer 42, input buffer 44 and status register 46, all of which can be accessed by the input/output handlers including the BIOS 100, interrupt handler 110. There are also provided port resistors 48 and 50 for generating GATEA20#, RC#, IRQ1 and IRQ12. The first embodiment further includes the interrupt generating circuit 60 for generating SMI# when the reception/transmission of data has completed or when the output buffer 42, input buffer 44 and status register 46 are accessed by the BIOS 100 or the like. The first embodiment further comprises the emulation handler 120 which is activated by SMI# and which has its content to be processed that is described by a given program. In such an arrangement, the first embodiment can realize the same function as in the 8042 without utilization of the hardware resource thereof. In this regard, the first embodiment is greatly distinguished from the prior art described in Japanese Patent Application Laid-Open No. Hei 7-334373 in which the function of the 8251A would be attained utilizing the hardware resource of the 8042.

The operation of the first embodiment will now be described in brief. For example, when the BIOS 100 accesses the output buffer 42, input buffer 44 and status register 46, SMI# occurs and the process transitions from the BIOS 100 to the emulation handler 120. If the access of the BIOS 100 is I/O Write at this time, data is held by the input buffer 44. The emulation handler 120 executes processing in the same manner as the 8042 according to the factor of SMI# or the value of the input buffer 44a, and then the emulation handler 120 enables the BIOS 100 to start processing.

When the reception/transmission circuit 20 receives data from the keyboard 16 or mouse 18, the interrupt generating circuit 60 generates SMI# based on KBSMI# and MSSMI# from the reception/transmission circuit 20, this SMI# activating the emulation handler 120. The activated emulation handler 120 reads data out of the reception/transmission circuit 20 and performs a given processing to write the data into the output buffer 42. The emulation handler 120 then accesses the port registers 48 to activate IRQ1 or IRQ12 and enables the BIOS 100 to start processing.

In such a manner, the first embodiment can perform the emulation of the 8042 without its use. In this connection, the aforementioned input/output handler also includes input/output drivers possessed by the operating system (OS) and applications, other than the interrupt handler 110.

The arrangement of this embodiment will now be described in detail.

1.2 Reception/Transmission Circuit

Figure 4:
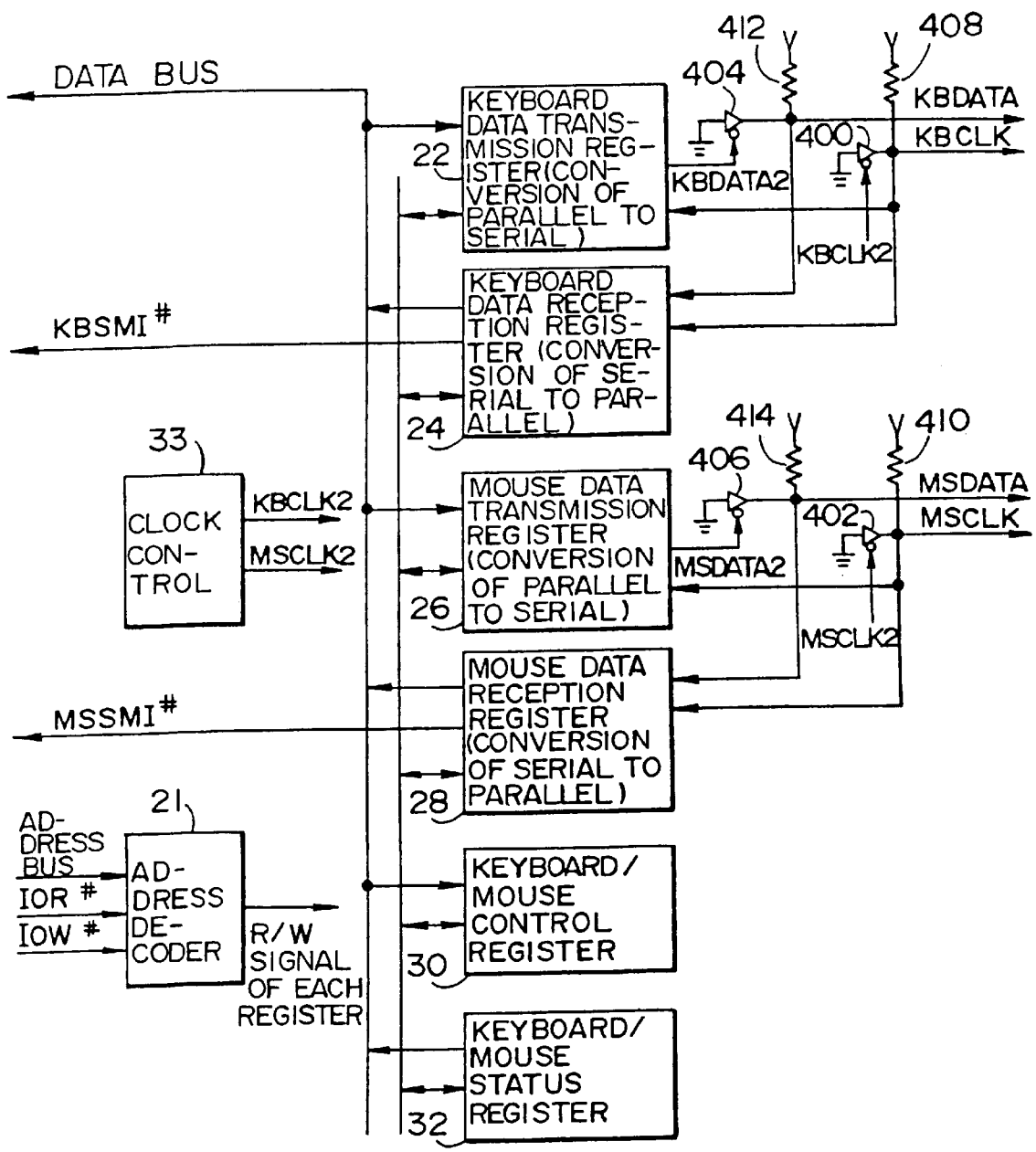
FIG. 4 shows a structure of a reception/transmission circuit.

FIG. 4 shows a structure of reception/transmission circuit 20. The reception/transmission circuit 20 comprises an address decoder 21, a keyboard data transmission register 22, a keyboard data reception register 24, a mouse data transmission register 26, a mouse data reception register 28, a keyboard/mouse control register 30, a keyboard/mouse status register 32 and a clock control circuit 33. In such an arrangement, the reception/transmission circuit 20 can accomplish the same function as in the 8042 without utilization of the hardware resource of the 8042.

The address decoder 21 generates Read/Write and other signals for each register based on the address from the address bus, IOR# (or I/O Read signal) and IOW# (or I/O Write signal). Thus, emulation handler can access to each register.

The clock control circuit 33 outputs KBCLK2 and MSCLK2 toward the tristate control terminals of tristate buffers 400 and 402. It KBCLK2 and MSCLK2 become low level, KBCLK and MSCLK also become low level. If KBCLK2 and MSCLK2 become high level, KBCLK and MSCLK also become high level under the influence of pull-up resistors 408 and 410. The lines of KBCLK and MSCLK are respectively connected to the external keyboard and mouse and also to the keyboard data transmission register 22, keyboard data reception register 24, mouse data transmission register 26 and mouse data reception register 28.

Each of the keyboard and mouse data transmission registers 22, 26 is an 8-bit register for storing data transmitted to the keyboard or mouse (see FIGS. 5A and 5C) and has a function of converting parallel data from the data bus into serial data KBDATA2 or MSDATA2 which is in turn outputted toward the tristate control terminal of a tristate buffer 404 or 406. If KBDATA2 and MSDATA2 become low level, KBDATA and MSDATA also become low level. If KBDATA2 and MSDATA2 become high level, KBDATA and MSDATA also become high level under the influence of pull-up resistors 412 and 414.

On the other hand, each of the keyboard and mouse data reception registers 24, 28 is an 8-bit register for storing data received from the keyboard or mouse (see FIGS. 5B and 5D) and has a function of converting serial data KBDATA or MSDATA from the keyboard or mouse into parallel data which is in turn outputted therefrom toward the data bus.

Furthermore, each of the keyboard and mouse data reception registers 24, 28 also has a function of generating KBSMI# or MSSMI# when it has received the data from the keyboard or mouse or when the serial/parallel conversion of the received data has completed. These interrupts KBSMI# and MSSMI# generates the interrupt SMI# which will in turn activate the emulation handler.

One feature of the first embodiment is that the reception/transmission circuit may include a circuit of performing the conversion between serial and parallel data. In the 8042, the bits were received or transmitted one at a time while always monitoring KBCLK. However, the usual monitoring of KBCLK in the emulation increases the burden in the processing and precludes the processing speed from being improved.

To overcome such a problem, the first embodiment is designed to generate KBSMI# at the same time when the conversion of serial data into parallel data has completed, the generated KBSMI# being adapted to activate the emulation handler to read the received data after such a conversion. The first embodiment is also designed so that the emulation handler writes the data received from the BIOS through the input buffer into the reception/transmission circuit and thereafter converts the written parallel data into serial data.

Thus, it is not required that the emulation handler always monitors KBCLK. Therefore, the speed of processing can be improved. Such an arrangement will further be described in detail.

Figure 2:
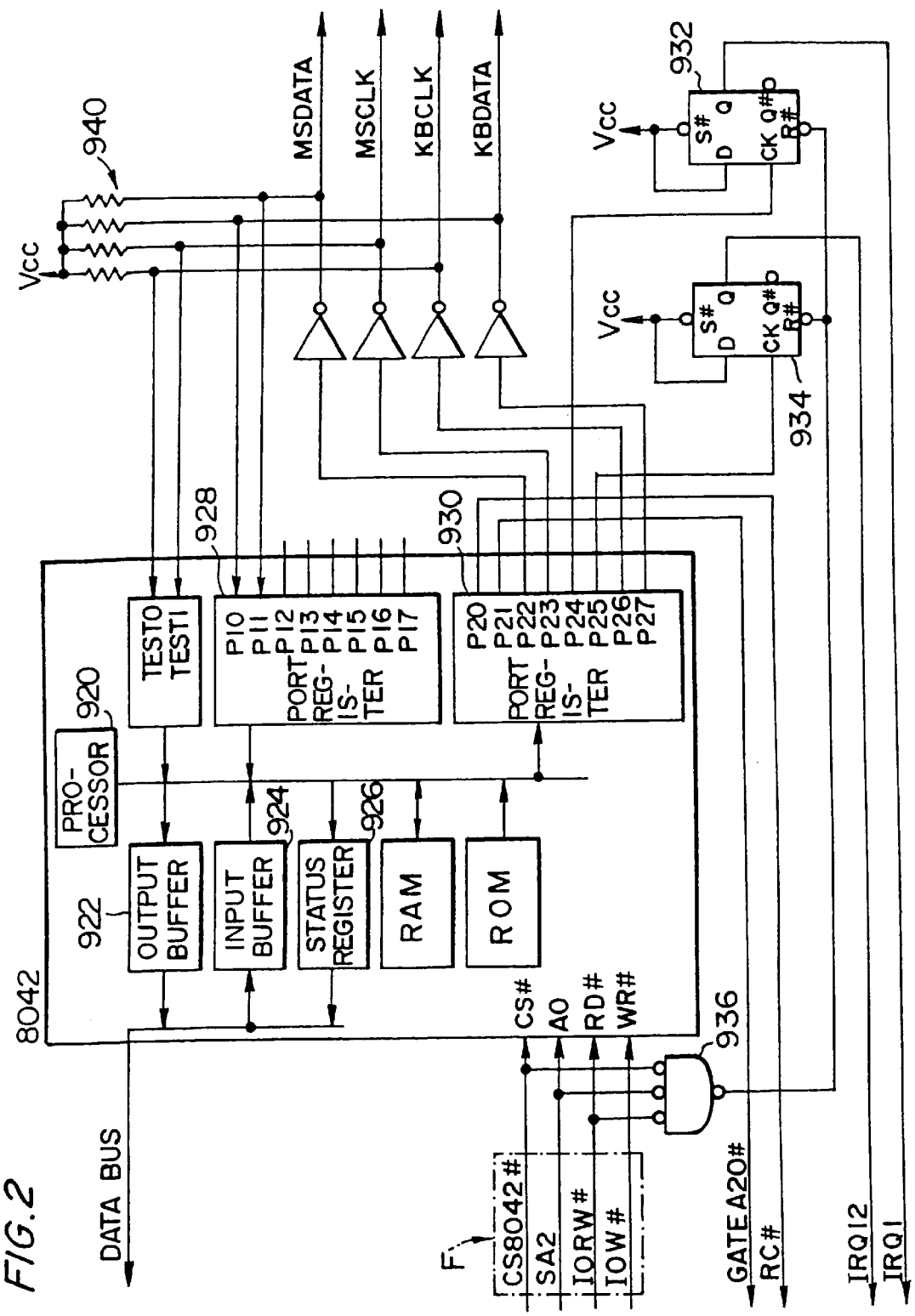
FIG. 2 is an internal block diagram showing the details of the input/output controller containing the 8042.

FIGS. 6A and 6B show waveforms of signals KBCLK and KBDATA shown in FIG. 2.

The 8042 and keyboard perform the reception/transmission of data therebetween using two signals KBCLK and KBDATA. When the keyboard transmits data to the chip 8042 (or when the 8042 receives data from the keyboard), the waveforms of the signals KBCLK and KBDATA are as shown in FIG. 6A. Although the signals KBCLK and KBDATA are bi-directional, the keyboard will drive substantially the overall on reception. Only a portion indicated by a thickened line in FIG. 6A is driven by the 8042. However, both the signals KBCLK and KBDATA are driven by an open collector, Therefore, the high-level parts in the signal of FIG. 6A are pulled up to high level by a pull-up resistor 940 of FIG. 2.

A processor 920 in the 8042 always monitors KBCLK (TEST0). As the KBCLK (TEST0) becomes low level, the state of KBDATA (at P10 of a port register 928) is repeatedly read to perform the reception of data. More particularly, the 8042 has no circuit of converting serial data into parallel data. Instead, the processor 920 of the 8042 reads KBDATA (P10) one bit at a time while confirming KBCLK (TEST0).

FIG. 6B shows waveforms of signals produced when data is transmitted from the 8042 to the keyboard. The 8042 informs the keyboard of the fact that the transmission of data has been ready by shifting KBCLK (or an inverted signal at P26 of a port register 930) to low level.

The 8042 always monitors KBCLK (TEST0). If KBCLK (TEST0) becomes low level, the 8042 repeatedly outputs and transmits data one bit at a time to KBDATA (P27). Therefore, the 8042 has no circuit of converting parallel data into serial data. Instead, the processor 920 of the 8042 outputs data to be transmitted one bit at a time to KBDATA (P27) while confirming KBCLK (TEST0).

In such a manner, the 8042 performs the reception/transmission of data one bit at a time. On the contrary, the first embodiment may only read/write 8-bit data from and to the reception/transmission circuit. In addition, it is not required to monitor KBCLK at all times. This highly reduces the burden in processing.

The keyboard/mouse control register 30 and keyboard/mouse status register 32 will now be described with reference to FIG. 4.

The content of each bit in the keyboard/mouse control register 30 is as shown in FIG. 7. For example, bits 0 and 4 are used to reset the interfaces to the keyboard and mouse, respectively. Bits 1 and 5 are used to shift KBCLK and MSCLK to low level for inhibiting the transmission of data by the keyboard and mouse (or the reception of data by the reception/transmission circuit). Bits 2 and 6 are used to set parity errors.

One feature of the first embodiment is that "KBCLK forced LOW#" and "MSCLK forced LOW#" of the bits 1 and 5 can be used to inhibit the transmission of data from the keyboard and mouse. More particularly, the emulation handler uses the "KBCLK forced LOW#" and "MSCLK forced LOW#" to inhibit the transmission of next data from the keyboard and mouse after the reception/transmission circuit has received data from the keyboard and mouse and until the received data is delivered to the BIOS and interrupt handler, as will be described in detail. Thus, the transmitted data can be prevented from being lost even though data is continuously transmitted from the keyboard or mouse.

The content of each bit in the keyboard/mouse status register 32 is as shown in FIG. 8. Bits 0 and 4 indicate whether or not data is being received from the keyboard or mouse; bits 1 and 5 indicate whether or not data is being transmitted; and bits 2 and 6 indicate whether or not the reception of data from the keyboard and mouse has completed.

As described, the emulation handler can effectively control the reception/transmission circuit to provide a proper reception/transmission of data from and to the keyboard and mouse by providing the keyboard/mouse control register 30 and keyboard/mouse status register 32. Particularly, as will be described later, the first embodiment is characterized by that the emulation handler emulates the process to be performed by the processor of the 8042 in place of the 8042. To emulate the process to be performed by the above processor with respect to the reception/transmission of data in an appropriate manner, the provision of the keyboard/mouse control register 30 and keyboard/mouse status register 32 is particularly effective.

2.2 I/O Register

Figure 9:
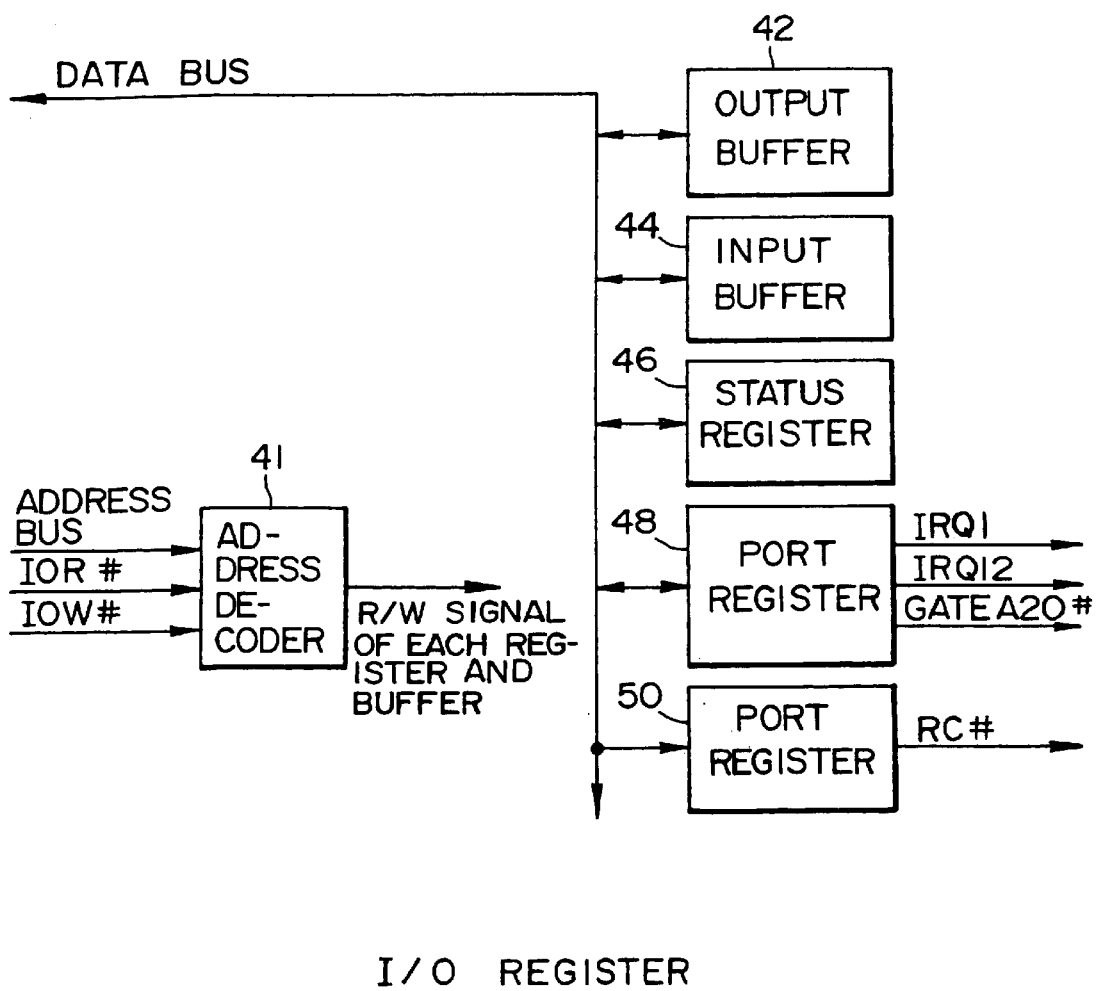
FIG. 9 shows a structure of an I/O register.

FIG. 9 shows a structure of I/O register 40. The I/O register comprises an address decoder 41, an output buffer 42, an input buffer 44, a status register 46 and port registers 48, 50. By providing the buffers and register similar to the output buffer, input buffer and status register included in the 8042, the 8042 can be emulated without utilization of the hardware resource thereof. It is also possible to make the intervention of the emulation invisible from the side of BIOS.

The address decoder 41 generates Read/Write signal for each of the bufters and register, based on IOR# or IOW#. Thus, the emulation handler or the like can access each of the buffers and register.

Figures 10A, 10B:
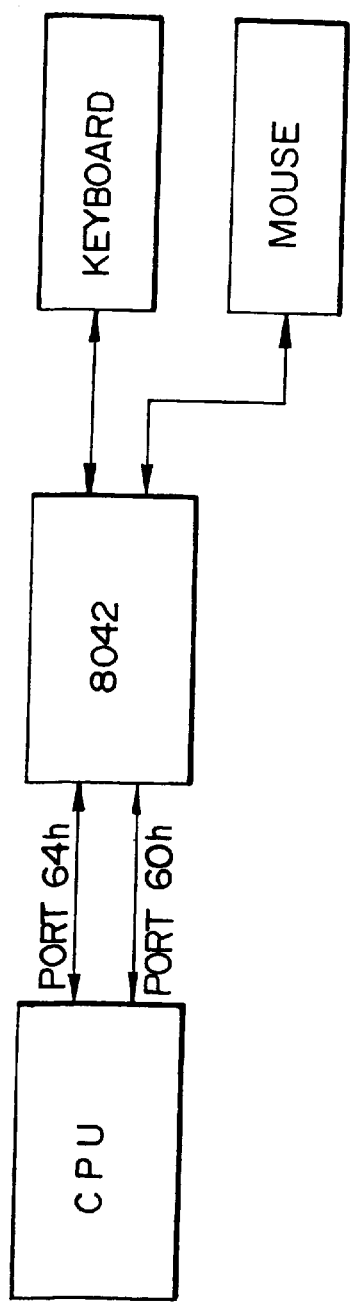
FIGS. 10A and 10B illustrate the access to ports 60h and 64h.

The interface between CPU and the 8042 will now be described in brief. AS shown in FIG. 10A, data is mutually delivered between CPU and the 8042 through the I/O ports 60*h* and 64*h*. The 8042 uses CS8042#, SA2, IOR# and IOW# (see F of FIG. 2) to discriminate the content of an instruction transmitted from CPU.

CS8042# is one having its decoded address and becomes low level (active) when CPU accesses the addresses 60*h* and 64*h*. SA2 is bit 2 in the address. Therefore, when CS8042# and SA2 are low in level, the address becomes 60*h*. When CS8042# is low in level and SA2 is high in level, the address becomes 64*h*. IOR3# is an I/O read signal while IOW# is an I/O write signal.

The 8042 discriminates an instruction from CPU in such a manner as shown in FIG. 10B. More particularly, the 8042 discriminates that the instruction is READ command for the output buffer when the instruction is READ command for the port 60*h*. The 8042 judges that the instruction is WRITE command for data (in the narrow sense) to the input buffer when the instruction is WRITE command for the port 60*h*. When the instruction is READ command for the port 64*h*, the 8042 judges that the instruction is READ command for the status register. When the instruction is WRITE command for the port 64*h*, the 8042 judges that the instruction is WRITE command for the status register.

Since the, 8042 has only one input buffer, the data and command are written into the input buffer at the same location. At the same time when data is written into the input buffer, the value of SA2 is written into a status register 926 (see FIG. 2) of the 8042 at its bit 2. The processor 920 reads this bit to judge whether the bit is data or command, that is, WRITE at port 60*h* or 64*h*.

The status register 46 of the first embodiment will now be described. The content of each bit in the status register 46 is as shown in FIG. 11.

For example, Output Buffer Full (output buffer data presence flag) at bit 0 indicates whether or not data is present in the output buffer. Output Buffer Full=0 indicates that the output buffer has no data. Output Buffer Full=1 indicates that BIOS does not still read data after the emulation handler has written that data into the output buffer.

Input Buffer Full (input buffer data presence flag) at bit 1 indicates whether or not data (data in the broad sense, including data and commands in the narrow sense) is present in the input buffer. Input Buffer Full=0 indicates that the input buffer has no data. Input Buffer Full=1 indicates that the emulation handler does not still read data after BIOS has written that data into the input buffer.

Bit 2 corresponds to bit 2 of Keyboard Controller's Command Byte. Bit 3 is used to distinguish whether the content of the input buffer is data (in the narrow sense) or command. Bit 4 relates to A6*h* command or password. Aux.Data.Flag (input/output device discrimination flag) of bit 5 is used to distinguish whether the data of the output buffer relates to the keyboard or mouse. Bits 6 and 7 relate to time-out and parity errors, respectively.

For comparison with the first embodiment, FIG. 12 shows the content of each bit in the status register of the 8042. As will be apparent from comparison of FIG. 11 with FIG. 12, it is important to note that the first embodiment uses the emulation handler for setting or resetting many bits. For example, Output Buffer Full (output buffer data presence flag) and Input Buffer Full (input buffer data presence flag) may be set or reset by the writing step of the emulation handler.

The first embodiment has an object to emulate the 8042 without utilization of the hardware resource thereof. However, the fact that the hardware resource of the 8042 is not utilized means that the processor included in the 8042 cannot be utilized. This raises a great problem with respect to how the process executed by the processor is emulated. Thus, the inventors noted the presence of CPU that was inherently included in PC (personal computer). The first embodiment overcomes the above problem by causing the emulation handler operating on CPU to emulate the process to be executed by the processor. Although the processor of the 8042 mainly executes the setting of each bit in the status register, the first embodiment causes the emulation handler to perform these bit settings in place of the processor.

The port registers (I/O ports) 48 and 50 according to the first embodiment will now be described. The content of each bit in the port registers 48 and 50 is as shown in FIGS. 13A and 13B.

Bits 0 and 1 at the port register 48 are respectively used to make IRQ1 and IRQ12 active and inactive. Although the setting of IRQ1 and IRQ12 is performed by the processor in the 8042, the first embodiment causes the emulation handler to execute these settings. Bit 2 is used to set GATEA20# to low or high level. Bit 0 of the port register 50 is used to generate pulses in RC#.

For reference, FIGS. 14A and 14B show the content of each bit in the port registers (I/O ports) 928 and 930 of the 8042.

As shown in FIG. 2, the signal outputted from P24 of the port register 930 in the 8042 becomes IRQ1 through a D flip-flop 932. When the 8042 is to deliver data to CPU, the processor 920 of the 8042 may output a high-level pulse, for example, toward P24 after it has written data into the output buffer. Thus, IRQ1, which is the output of the D flip-flop 832, will be made high level. The IR01 remains high level until the D flip-flop 932 is reset.

After received an interrupt, CPU reads data out of the output buffer (port 60*h*). Thus, the output of NAND 936 becomes low level to reset the D flip-flop 932. This returns IRQ1 to low level.

Similarly, IRQ12 becomes high level by outputting high-level pulse toward P25 and low level when CPU reads the output buffer.

Similarly, the first embodiment makes IRQ1 high level by setting the bit 0 of the port register 48 to a high level. In the first embodiment, however, the emulation handler sets the bit 0 of the port register 48 in place of the processor of the 8042. As in the 8042, the bit 0 of the port register 48 is reset by reading the output buffer (port 60*h*), thereby setting IRQ1 to a low level. IRQ12 is set to a high or low level in the same manner as in IRQ1.

As shown in FIG. 2, the 8042 makes a signal outputted from P20 of the port register 930 RC#. If RC# becomes low level, CPU is reset. Since CPU remains reset when RC# is held at low level, CPU will remain stopped. In the 8042, therefore, the processor 920 will output high level toward P20 at any point of time after it has outputted low level toward P20.

Similarly, the first embodiment makes RC# low level by the emulation handler performing the writing to the bit 0 of the port register 50. In the first embodiment, however, low pulse is generated when the writing is performed to the bit 0. Therefore, it is not required that RC# returns to high level after the writing has executed to the bit 0. As a result, the burden in the processing of the emulation handler can be reduced to improve the processing speed thereof.

In such a manner, the first embodiment can reduce the burden in the processing of the emulation handler by causing it to emulate the processing of the processor in the 8042 while carrying out various techniques such as omitting any unnecessary processing and so on.

2.3 I/O Trap Circuit

FIG. 15 shows a structure of I/O trap circuit 70. The I/O trap circuit 70 comprises an address decoder 71, a 60*h* address comparison circuit 72, a 64*h* address comparison circuit 74, an I/O trap control register 76 and NAND's 78, 80, 82 and 84. By providing such an I/O trap circuit, any access can be trapped to activate the emulation handler when CPU accesses the port 60*h* or 64*h* for write or read, that is, when the output buffer, input buffer and status register are read or written (see FIG. 10B). When the emulation handler is activated, a proper emulation for each access can be carried out.

The address decoder 71 generates a read/write signal of the I/O trap control register 76 based on address from the address bus, IOR# and IOW#. Thus, the emulation handler or the like can access the I/O trap control register 76.

The 60*h* address comparison circuit 72 judges whether or not the access address of CPU is 60*h*. If the access address is 60*h*, the output Q4 of 60*h* address comparison circuit 72 is made high level. The 64*h* address comparison circuit 74 judges whether or not the access address of CPU is 64*h*. If the access address is 64*h*, the output Q5 of the 64*h* address comparison circuit 74 is made high level.

The I/O trap control register 76 is designed to disable or enable a trap to the access to the ports 60*h* and 64*h*. The meaning and content of each bit in the I/O trap control register 76 is as shown in FIG. 16. For example, bit 0 can be used to disable or enable a trap to the reading from the port 60*h*. Similarly, bit 1 can be used to disable or enable a trap to the writing to the port 60h; bit 2 can be used to disable or enable a trap to the reading from the port 64*h*; and bit 3 can be used to disable or enable a trap to the writing to the port 64*h*.

For example, if the bit 0 is set to 0 and disables a trap to the reading from the port 60*h*, Q6 of the I/O trap control register 76 shown in FIG. 15 becomes low level. Thus, 60RSMI#, which is the output of NAND 78, is held at high level to disable the generation of 60RSMI#. In other words, SMI# occurs when the port 60*h* is read. This inhibits the activation of the emulation handler. Similarly, when bits 1, 2 and 3 are set to 0, Q1, Q2 and Q3 are made low level As a result, the outputs 60WSMI#, 64RSMI# and 64WSMI# of the NAND's 80, 82 and 84 are fixed at high level.

On the other hand, the following matters are provided when the bits 0, 1, 2 and 3 of the I/O trap control register 76 are set to 1 to make Q0, Q1, Q2 and Q3 high level. When the port 60*h* is accessed for read, Q4, IOR# and 60RSMI# are made high, low and low levels, respectively. When the port 60*h* is accessed for write, Q4, IOW# and 60WSMI# are made high, low and low levels, respectively. When the port 64*h* is accessed for read, Q5, IOR# and 64RSMI# are made high, low and low levels, respectively. When the port 60*h* is accessed for write, Q5, IOW# and 64WSMI# are made high, low and low levels, respectively. As either of 60RSMI#, 60WSMI#, 64RSMI# or 64WSMI# is made low level, SMI# also becomes low level. This activates the emulation handler.

2.4 Interrupt Controller

Figure 17:
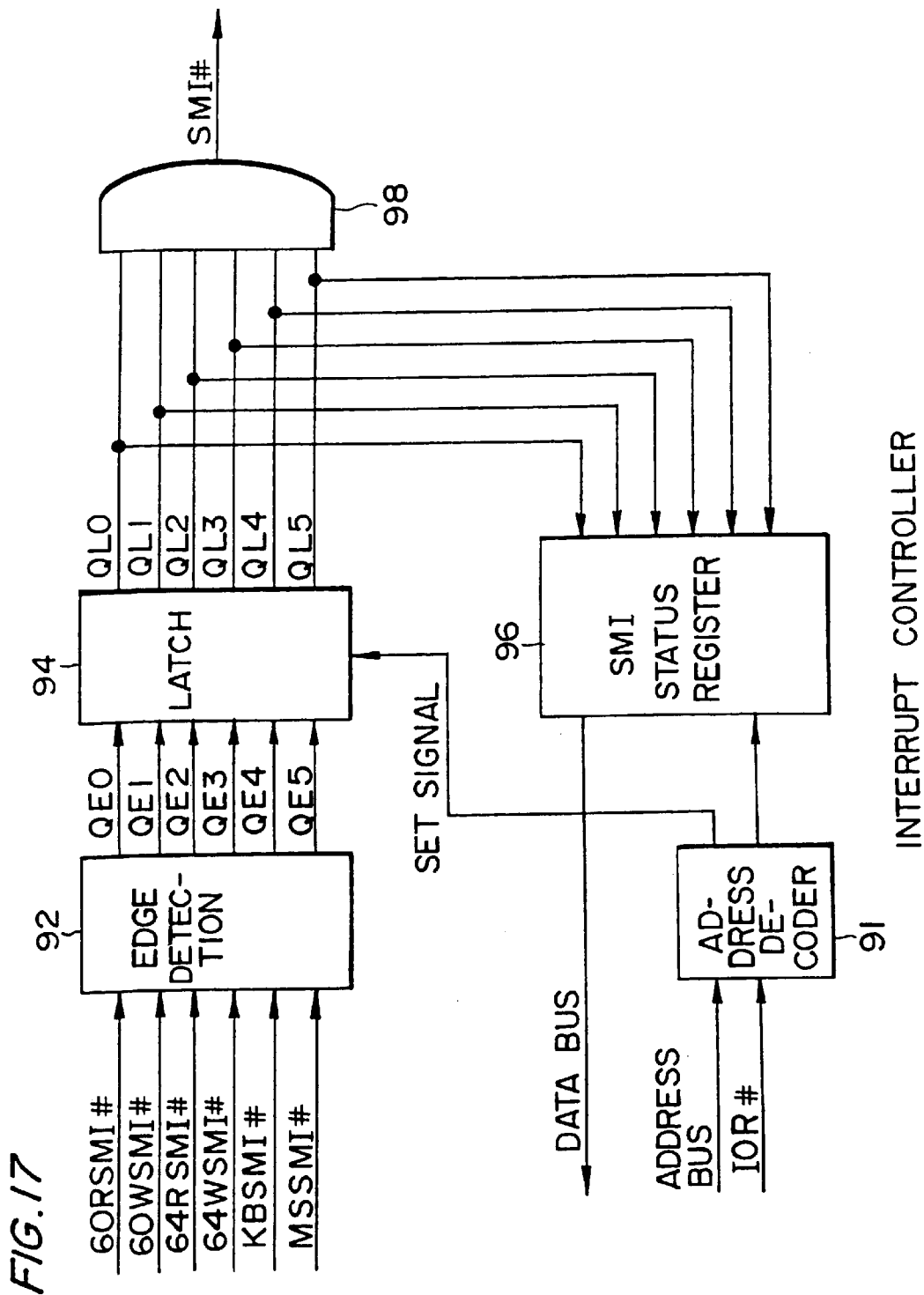
FIG. 17 shows a structure of an interrupt controller.

FIG. 17 shows a structure of interrupt controller 90. The interrupt controller 90 comprises an address decoder 91, an edge detection circuit 92, a latch 94, an SMI status register 96 and AND 98. By providing such an interrupt controller, SMI# becomes low level when either of 60RSMI#, 60WSMI#, 64RSMI# or 64WSMI# becomes low level. This can activate the emulation handler. The emulation handler thus activated can know the factor of generating SMI on which an appropriate emulation can be carried out.

The address decoder 91 generates a read signal for the SMI status register 96 or a set signal for the latch 94. Thus, the emulation handler can read the SMI status register 96 to search the factor of SMI or CPU can return SMI# to high level and receive SMI based on the next factor.

The edge detection circuit 92 is a circuit of detecting an edge when 60RSM#, 60WSMI#, 64RSMI#, 64WSMI#, KBSMI# and MSSMI# change from high to low level. For example, when 60RSMI# changes from high to low level, the output QL0 of the latch 94 changes to low level based on the output QE0 of the edge detection circuit 92. The output QL0 is held at low level. Thus, SMI# becomes low level to activate the emulation handler. Similar event will be carried out when each of 60WSMI#–MSSMI# changes from high to low level.

When SMI# becomes low level to activate the emulation handler which in turn reads the status register 96 for searching the factor of SMI, the set signal, which is the output of the address decoder 91, becomes active. Thus, the output of the latch 94 becomes high level to return SMI# to high level. As a result, CPU can receive SMI based on the next factor.

The SMI status register 96 is for causing the emulation handler to search the factor of SMI. By searching the factor of SMI, the emulation handler can perform an appropriate emulation depending on the factor. FIG. 18 shows the meaning and content of each bit in the SMI status register 96. For example, bit 0 is used to indicate that SMI results from a trap in writing the port 60*h*. This bit 0 is set when 60RSMI# changes to low level to make QL0 low level and reset when SMI status register 96 is read. Similarly, each bit 1, 2, 3, 4 or 5 indicates that SMI results from a trap in writing the port 60*h*, a trap in reading the port 64*h*, a trap in writing the port 64*h*, completion of the reception of data from the keyboard or completion of the reception of data from the mouse. These bit 1–5 are set when 60WSMI#–MSSMI# change to low level and reset when the SMI status register 96 is read.

3. Operation of the First Embodiment

The operation of the first embodiment will now be described in detail.

3.1 Transmission of Data from Keyboard to BIOS

Transmission of data from the keyboard to BICS will be described with reference to the flowcharts shown in FIGS. 19 and 20.

(1) When the keyboard 16 (see FIG. 3) detects the depression or release of a key or the continuous depression of a key, it transmits the code of that key to the reception/transmission circuit 20 (step S1 in FIG. 19).

(2) When the reception/transmission circuit 20 has received the code from the keyboard 16, it generates KBSMI# for causing the interrupt generating circuit 60 to generate SMI# which in turn activates an emulation handler 120 (steps S2 and S3).

The activated emulation handler 120 uses Output Buffer Full of the status register 46 (see FIG. 11) to confirm whether or not data is present in the output buffer 42 (step S4). If data is present in the output buffer 42 (or Output Buffer Full=1), the emulation handler (SMM) terminates as it is (step S5). If data is present in the output buffer 42, it means that the previous data received from the keyboard or mouse remains without delivery to the BIOS 100. If the reception/transmission circuit 20 performs a double reception, the lately received data will not be delivered to BIOS. If such an event occurs, 60SMI# is generated at a point of time when the BIOS 100 reads out the previous data. Thus, the activated emulation handler 120 repeatedly performs the above process (2).

(3) The emulation handler 120 inhibits the transmission of data from the keyboard 16 (or the reception of data at the reception/transmission circuit 20) so that the reception/transmission circuit 20 will not superfluously receive the next data (step S6). As described, this can be accomplished by making the bit 1 of the keyboard/mouse control register in the reception/transmission circuit 20 zero (see FIG. 7).

The emulation handler 120 applies a conversion corresponding to a scan code set to the received code which is in turn written into the output buffer 42 (step S7). Output Buffer Full of the status register 46 is set to 1 (step S8). It is then judged whether or not the interrupt of the keyboard is set to "enable" (step S9). If this interrupt is set to "enable" the bit 0 of the port register 48 (see FIG. 13A) is made 1 to generate the interrupt IRQ1 (step S10). The emulation handler then terminates (step S11). If the interrupt is not set to "enable" the emulation handler terminates without execution of any work (step S22).

(4) If the interrupt is not set to "enable", the interrupt IRQ1 is generated. As a result, the process is delivered from the BIOS 100 to the interrupt handler 110 (step S12 in FIG. 20).

(5) The interrupt handler 110 of IRQ1 reads the output buffer 42 to return Output Buffer Full zero (step 13 and bit 0 of FIG. 12).

(6) Thus, the I/O trap circuit 70 traps such a read access to generate 60RSMI# which in turn activates the emulation handler 120 (step S14). The transmission of data from the keyboard 16 is then released so that the reception/transmission circuit 20 can receive the next data (step S17). Namely, the bit 1 of the keyboard/mouse control register (see FIG. 7) is made one. The emulation handler 120 then terminates (step S18).

The emulation handler may deliver data from the output buffer 32 to the interrupt handler 110 (wherein the interrupt handler 110 only reads the output buffer 32 with the mutual delivery of data being carried out on the software) or may return Output Buffer Full to 0 (steps S15 and S16).

(7) The interrupt handler 110 again converts the read data which is in turn stored in the memory at the keyboard data storage area thereof (step S19). The interrupt handler 110 then informs the interrupt controller 14 of the termination of interrupt (step S20), and then enables the BIOS 100 to start processing.

(8) The BIOS 100 reads a code from the aforementioned keyboard data storage area (step S21) at a point of time when the code is requested by an application program. The read code is then delivered to the application program. The reception of data from the keyboard 16 terminates in the case where the interrupt is set to "enable".

(9) Where the interrupt was set to "disable", the BIOS 100 reads the output buffer 42 after it has confirmed that Output Buffer Full in the status register 46 became 1. This returns Output Buffer Full to 0 (steps S23 and S24).

(10) At this time, 60RSMI# occurs and activates the emulation handler 120 (step S25). The emulation handler 120 cancels the inhibition of the transmission of data in the keyboard 16 so that the reception/transmission circuit 20 can receive the next data (step S28). The emulation handler then terminates (step S29).

In such a case, the emulation handler may perform the delivery of the data of the output buffer 32 to the BIOS 100 or the returning of Output Buffer Full to 0 (steps S26 and S27).

(11) The BIOS 100 internally processes the received scan code. Thus, the reception of data from the keyboard 16 terminates in the case where the interrupt was set to "disable".

For reference, a flowchart illustrating the transmission of data from the keyboard to BIOS in the 8042.

Major features of the first embodiment when data is transmitted from the keyboard (or mouse) to BIOS will be described below.

(A) When the reception/transmission circuit 20 has received data from the keyboard 16, SMI# (KBSMI#) occurs and activates the emulation handler 120 which in turn reads the received data from the reception/transmission circuit 20 and writes the read data into the output buffer 42 after subjected to a given conversion (steps S2, S3 and S7 in FIG. 19). Thus, the 8042 can be emulated without utilization of the hardware resource thereof and with BIOS not knowing the intervention of emulation.

In this case, SMI# (KBSMI#) occurs when the reception/transmission circuit 20 completes the conversion of serial data into parallel data. This eliminates the need of always monitoring KBCLK and reduces the burden in processing.

As shown in FIG. 21, the 8042 (or processor) writes the received data into the output buffer after execution of a given conversion (steps T2 and T3).

(B) When data is not read from the output buffer 42 by the input/output handlers such as the BIOS 100, interrupt handler 110 and other handlers, the emulation is terminated without writing of data into the output buffer 42 (steps S4 and S5 in FIG. 19). Thus, it can be avoided that the lately received data will not be delivered to the BIOS.

(C) After the reception/transmission circuit 20 has received data from the keyboard 16 and until the received data is delivered to the input/output handler such as the BIOS 100 or any other handlers, it is inhibited that the keyboard 16 transmits the next data (steps S6, S17 and S28). Thus, it can be prevented that the data from the keyboard is repeatedly received by the reception/transmission circuit 20.

(D) The emulation handler 120 sets Output Buffer Full in the status register 46 to 1 and terminates the emulation after data has been written into the output buffer 42 (step 38 and S11). Thus, the fact that the output buffer 42 is readable can be informed to the input/output handlers with the intervention of emulation being not known.

For the 8042, the processor 920 sets Output Buffer Full to 1 (step T3 in FIG. 21).

(E) When the input/output handler reads the output buffer 42 after confirmed "Output Buffer Fuller", a given circuit is used to provide "Output Buffer Full=0" (steps S13, S24 and bit 0 in FIG. 12) Thus, it is not required that the emulation handler is activated only for returning Output Buffer Full to 0. This reduces the burden in processing.

When the input/output handler reads the output buffer 42, the interrupt generating circuit 60 generates SMI# which in turn re-activates the emulation handler. Therefore, the emulation handler can execute, in a software manner, the delivery of data to the input/output handler, the return of Output Buffer Full to 0, cancel of inhibition of data transmission in the keyboard and so on (steps S15, S16, S17, S26, S27 and S28).

3.2 Transmission of Data from BIOS to Keyboard

Transmission of data from BIOS to the keyboard will now be described with reference to the flowcharts of FIGS. 22, 23, 24 and 25.

(1) The BIOS 100 waits until Input Buffer Full becomes 0 in the status register 46 (step V1). The emulation handler 120 sets Input Buffer Full to 0 as it is placed in its command receivable state.

(2) The BIOS 100 writes a command to be transmitted to the keyboard 16 into the input buffer 44 (port 60*h*) after it has confirmed that Input Buffer Full is 0, thereby making Input Buffer Full one (step V2).

(3) This generates 60WSMI# which in turn activates the emulation handler 120 for executing the process (step V3). The emulation handler 120 receives a command, returns Input Buffer Full to 0 and uses the reception/transmission circuit 20 to transmit a command to the keyboard 16 (step V4). The emulation handler then terminates (step V5).

(4) A step of confirming a code indicating the completion of reception is executed as shown in FIG. 23 in detail (step V6). As the keyboard 16 receives that code, it transmits a code indicating the completed reception "FAh" to the reception/transmission circuit 20 (step V7).

(5) As the reception/transmission circuit 20 has received the code indicating the completion of reception from the keyboard 16, KBSMI# occurs and activates the emulation handler 120 (steps V8 and V9). The emulation handler 120 writes this code into the output buffer 42 to set Output Buffer Full to 1 (step V10). The emulation handler then terminates (step V11).

(6) The BIOS 100 reads the output buffer 42 after it has confirmed that output Buffer Full became 1. This returns Output Buffer Full to 0 (steps V12 and V13).

Note that in this case, the emulation handler may perform some processings such as delivering data of the output buffer 42 or returning Output Buffer Full to 0 (step V14, V15 and V16).

(7) The BIOS 100 confirms whether or not a correct command is received by the output buffer 42, in accordance with the value thereof (step V17).

(8) Where a parameter is attached to the command, the BIOS 100 again confirms that Input Buffer Full is 0 (steps V18 and V19 in FIG. 24). The BIOS 100 writes a parameter to be sent to the keyboard 16 into the input buffer 44, thereby making Input Buffer Full 1 (step V20).

(9) This generates 60WSMI# which in turn activates the emulation handler 120 (step V21). The emulation handler 120 uses the received parameter to return Input Buffer Full to zero and utilizes the reception/transmission circuit 20 to transmit the parameter to the keyboard 16 (step V22). The emulation handler 120 then terminates (step V23). Thereafter, a step of confirming a code indicating the completion of reception is executed (step V24), as shown in FIG. 23 in detail.

(10) If the sent command is one requiring the return of data, the keyboard 16 transmits data to be returned to the reception/transmission circuit 20 (steps V25 and V26 in FIG. 25). The process terminates if the return of data is not required.

(11) As the reception/transmission circuit 20 completes the reception of the return data from the keyboard 16, KBSMI# occurs and activates the emulation handler 120 (steps V27 and V28). The emulation handler 120 writes the return data into the output buffer 42 to set Output Buffer Full to 1 (step V29). The emulation handler 120 then terminates (step V30).

(12) The BIOS 100 reads the output buffer 42 after confirmed that Output Buffer Full became 1, thereby returning Output Buffer Full to 0 (steps V31 and V32).

In such a case, the emulation handler may execute the delivery of the return data of the output buffer 42 or the return of Output Buffer Full to 0 (steps V33, V34 and V35).

(14) The process is completed when the BIOS 100 has received the return data from the keyboard 16.

For reference, a flowchart illustrating various steps for transmitting a command from BIOS to the keyboard in the 8042 is shown in FIGS. 26 and 27.

Major features of the first embodiment in the process of transmitting data from BIOS to the keyboard (or mouse) are as follows;

(A) As the input/output handler such as BIOS or any other handler writes data into the input buffer 44, SMI# occurs and activates the emulation handler 120 which in turn receives the data (data in the narrow sense and command) written into the input buffer 44 and also returns Input Buffer Full (input buffer data presence flag) which has become 1 by the writing into the input buffer to 0 (steps V2, V3 and V4 in FIG. 22). Thus, the reception of data from the input/output handler can be performed with the intervention of emulation being not known.

Data transmitted from the input/output handler may include data for controlling port registers 48 and 50 (such as RC#, GATEA20# or the like), in addition to the data transmitted to the keyboard 16. The data transmitted to the keyboard 16 will be written into the reception/transmission circuit 20 by the emulation handler.

As described, the reception/transmission circuit 20 includes a circuit for converting the parallel data written by the emulation handler 120 into serial data. Thus, the data transmitted from the input/output handler can be transferred to the input/output device without very increase of the burden in processing of the emulation handler.

As shown in FIG. 26, the processor of the 8042 carries out processings such as returning Input Buffer Full to 0 (steps W2 and W3).

(B) If data received from the input/output handler is a command with a parameter, the emulation handler 120 sends the command to the keyboard 16 through the input buffer 44 and reception/transmission circuit 20 and then enables the input/output handler to start processing (step V4 in FIG. 22). Thereafter, the input buffer writes the parameter into the input buffer 44 to generate SMI# which in turn activates the emulation handler (step V21 in FIG. 24). Thus, the parameter is sent to the keyboard 16 through the input/output buffer 44 and reception/transmission circuit 20 (steps V22 and V33). Even if a command with a parameter is issued from the input/output handler, the command and parameter can be sent to the keyboard with the intervention of emulation being not known.

Although the input/output device has been described as to the keyboard, the transmission/reception of data can be realized substantially in the same manner when the input/output device is the mouse.

On power-on, resetting or the like, there is required an initialization for properly operating an information processing device. The first embodiment takes a process of enabling 60RSMI#, 60WSMI#, 64RSMI#, 64WSMI#, KBSMI# and MSSMI# on initialization (see FIG. 16). In the initialization, BIOS will issue various commands such as Self Test Command, Read Test Command, Write Command Byte Command. In place of the processor of the 8042, the emulation handler will perform the transfer of these commands, the execution of these commands, the transfer of the result from the execution of a command and so on.

4 Application to Universal Serial Bus (USB)

FIG. 28 is a block diagram when the first embodiment is applied to USB.

Figure 3:
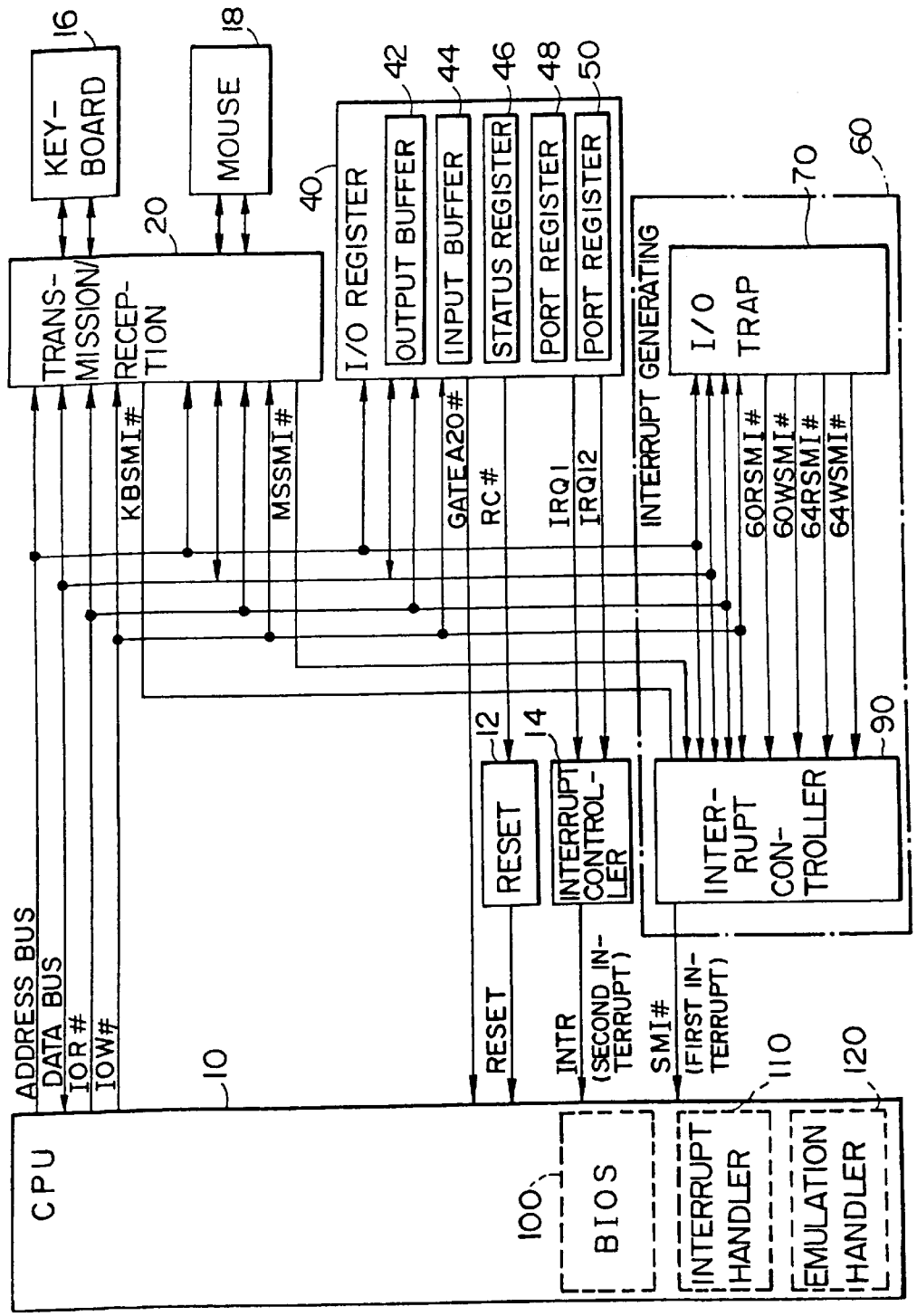
FIG. 3 is a block diagram illustrating an emulation system according to the first embodiment of the present invention.

A great difference between FIG. 28 and FIG. 3 is that the reception/transmission circuit 20 is replaced by an USB controller 100. More particularly, the USB controller 100 performs the same function as in the reception/transmission circuit to accomplish the transmission/reception of data between the system and the keyboard 16 or mouse 18 which is connected to USB.

Although the interrupts KBSMI# and MSSMI# from the reception/transmission circuit 20 are inputted into the interrupt controller 90 in FIG. 3, the arrangement of FIG. 28 inputs the interrupt USBIRO from the USB controller 100 into the interrupt controller 14. More particularly, as the USB controller 100 completes the reception of data, the normal interrupt INTR will be inputted into CPU 10, rather than SMI#.

In FIG. 28, the USB controller 100, I/O register 40 and interrupt generating circuit 60 are connected to PCI bus which is in turn connected to CPU 10 through a host-PCI bridge 102. However, the USB controller 100 may only be connected to PCI bus, but the I/O register 40, interrupt generating circuit 60 and the like may be connected to ISA bus. Even in FIG. 3, the reception/transmission circuit 20, I/O register 40, interrupt generating circuit 60 and others may be connected to PCI bus.

The operation of the emulation system shown in FIG. 28 will be described in brief. As the BIOS 100 accesses the output buffer 42, input buffer 44 and status register 46, SMI# resulting from I/O trap is generated. The BIOS 100 then enables the emulation handler 120 to start processing. If the access of BIOS 100 is for I/O write at this time, data is held by the input buffer 44. The emulation handler 120 executes processings in accordance with the factor of SMI and the value of the input buffer 44, and then enables the BIOS 100 to start processing. During the processing, the transmission of data is made through the USB controller 100 if data should be transferred to the keyboard 16 or mouse 18. When data is received from the keyboard 16 or mouse 18, the interrupt USBIRQ is generated by USB controller 100, and then an interrupt handler 110 for USB is enabled to start processing.

It is expected that any other device such as a printer or the like is connected to USB. The interrupt USBIRQ from the USB controller 100 is not necessarily due to the reception of data from the keyboard 16 or mouse 18. Therefore, the interrupt handler 110 for USB enables the emulation handler to start processing if that interrupt is due to the reception of data from the keyboard 16 or mouse 18. The emulation handler 120 transforms and writes the received data into the output buffer 42 to make IRQ1 or IRQ12 active and then enables the BIOS 100 to start processing. Thus, data will be delivered from the keyboard 16 or mouse 18 to the BIOS 100.

The feature of the emulation system shown in FIG. 28 is that when the USB controller 100 receives data from an input/output device such as the keyboard 16 or mouse 18, the USB controller 100 generates USBIRQ (INTR) to CPU 10 which in turn activates the interrupt handler 110. This interrupt handler 110 enables the emulation handler 120 to start processing only when the input/output device which transmits the received data is a keyboard or mouse, for example. Thus, the emulation handler 120 may be activated to perform the emulation only when data is transmitted from the keyboard or mouse.

By use of USB, a personal computer may easily and simply be connected to any peripheral instrument. USB may be in future utilized in the multimedia applications. USB makes the connection of maximum 127 peripheral instruments such as keyboard, mouse or others possible and also can realize the speed of data transfer equal to 12 Mbps. During operation, the peripheral instruments may be connected or disconnected to the personal computer which is known as plug-and-play. In USB, the personal computer, which is a host computer, controls the protocol and transfers data by hand-shake. Transfer of data is executed by frame division. The necessary cables are totally four for two signal lines, power line and ground line. Topology is based on a star-type connection. Transfer is carried out by four forms, isochronous transfer, interrupt transfer, bulk transfer and control transfer.

The first embodiment may be applied to any high-speed serial bus interface other than USB, such as IEEE1394. In such a case, the USB controller 100 of FIG. 28 is replaced by an IEEE1394 controller.

IEEE1394 is particularly suitable for multimedia applications. IEEE1394 can easily connect between a personal computer and an electric home appliance such as video cameras, TV, VCR, audio products and so on). IEEE1394 can transfer data at 100 Mbps, 200 Mbps and 400 Mbps. The appliance can be connected or disconnected to the computer in the plug-and-play manner under such a condition that the appliance is powered on. Nodes are connected to each other in the daisy chain and branching modes. In the data transfer of IEEE1394, synchronous data (isochronous packet) required to be periodically transmitted is present together with asynchronous data (asynchronous packet) permitted to make the transmission/reception of data at any timing. On the transfer of data, IEEE1394 performs an arbitration that requests a right of using the bus to obtain a permission to use the bus prior to the data transfer. The data transfer may be carried out both in the asynchronous and isochronous forms.

5. Emulation of Processor

As previously described, one of the features of the first embodiment is that the emulation handler also emulates the processing of the processor included in the 8042. For example, the emulation handler of the first embodiment sets each bit, which may be Input Buffer Full or Output Buffer Full, in the status register, in place of the processor.

In the information processing device such as personal computer or the like, however, any input/output device such as keyboard may have its own processor, in addition to the processor included in the 8042. The emulation system of the first embodiment can also emulate such a processor as included in the input/output device. This will be described below.

Figure 29A:
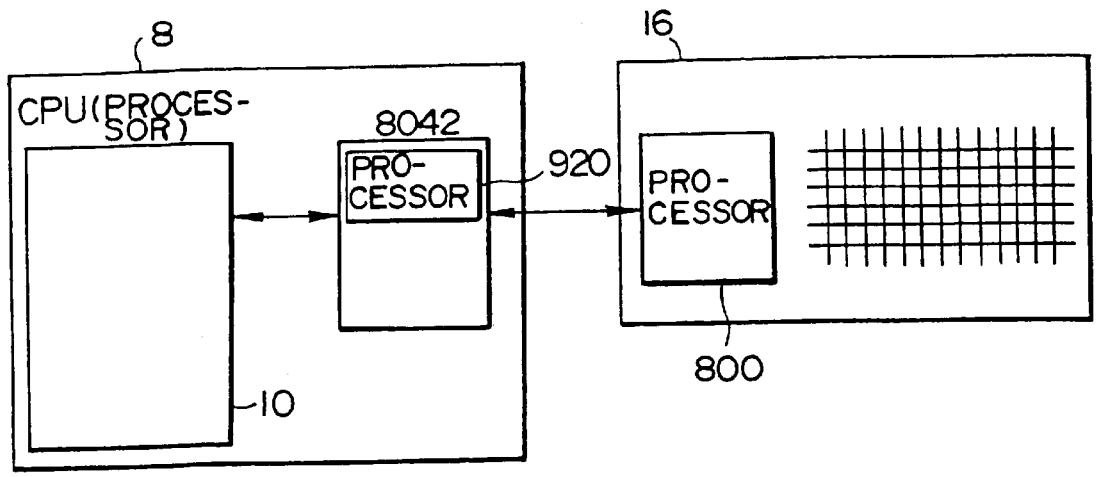
FIGS. 29A, 29B and 29C are views illustrating emulation of a processor in a keyboard.

As shown in FIG. 29A, PC mainframe B includes a main CPU (processor) 10 and the 8042 which includes a processor 920. A keyboard 16 includes a processor (CPU) 800.

The processor 800 in the keyboard 16 is designed to sense a key which is actually depressed. As one key is depressed, the processor in the keyboard initially checks which key is depressed. The processor 800 in the keyboard 16 sends the result of discrimination to the 8042 which in turn delivers data to the main CPU 10. Thus, the PC has three processors relating to the keyboard.

Figure 29B:
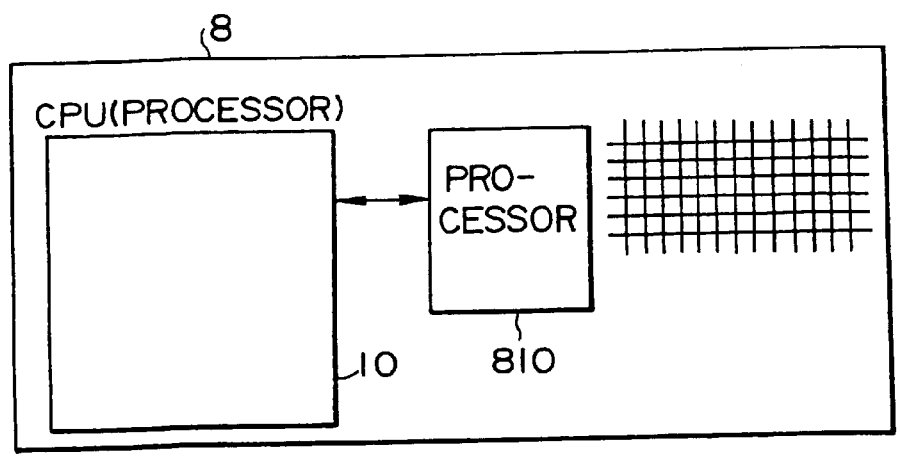

On the other hand, note type personal computers may be of such a structure as shown in FIG. 29B since it is not required that the PC mainframe 8 is separated from the keyboard 16. As shown in FIG. 29B, the PC mainframe 8 may include a single processor (CPU) 810 that can perform the functions of both the processors 920 and 800 in the 8042 and keyboard 16. The processor 810 checks which key is depressed and delivers the checking result to the main CPU 10. Delivery of data between the main CPU 10 and the processor 810 will be carried out in the same manner as in the processor 920 of the 8042.

Figure 29C:
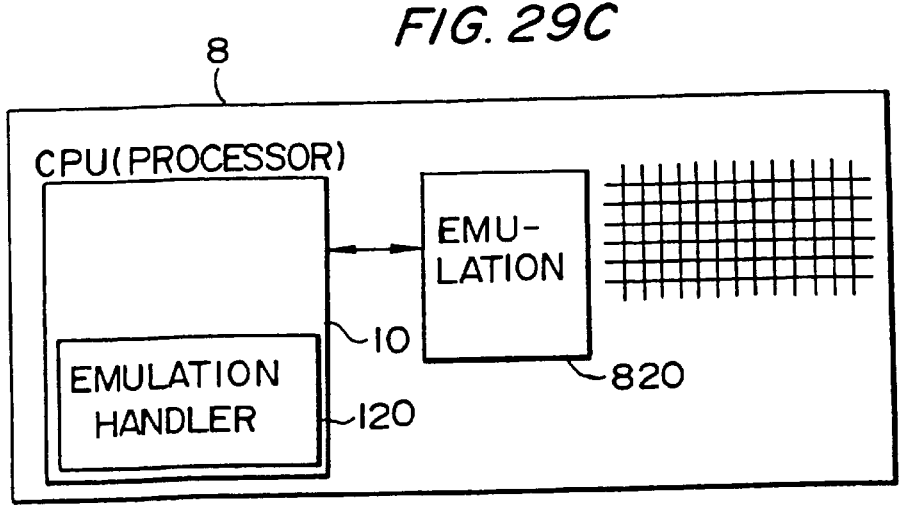

As shown in FIG. 29C, the first embodiment causes the emulation handler 120 to emulate the processing in the processor 810 of FIG. 29B. In other words, the emulation handler 120 emulates both the processing by the processor 920 of the 8042 and the processing by the processor 800 of the keyboard. To make such an emulation, there is provided such an emulation circuit 820 as shown in FIG. 29C. The emulation circuit 820 is one corresponding to the reception/transmission circuit 20, I/O register 40 or interrupt generating circuit 60 as shown in FIG. 3. For example, the emulation circuit 820 may comprise a circuit for generating SMI to the main CPU 10 when one key on the keyboard is depressed, a circuit for causing the main CPU 10 to discriminate which key is depressed and other circuit. The process of generating SMI to the main CPU 10 when a key is depressed corresponds to the process by the reception/transmission circuit 20 in FIG. 3 which generates KBSMI# on completion of the data reception. In other words, the reception/transmission circuit 20 having such a structure as shown in FIG. 3 may not necessarily be provided for the arrangement of FIG. 29C.

AS SMI occurs, the main CPU 10 discriminates which key is depressed and then performs the same processing as in the 8042 and keyboard processors 920, 800. The main CPU 10 then delivers data to BIOS in the manner substantially similar to those described in connection with FIGS. 19 and 20. At this time, it is important that the compatibility is maintained so that a software in the main CPU 10 properly operates. In other words, it is required that the software is caused to see as if the 8042 exists.

If it is not required that the 8042 processor 920 is emulated (e.g., when input/output controller having no processor is to be emulated), only the keyboard processor 800 is emulated.

6. Details of Keyboard Data Transmission Register

Figure 30:
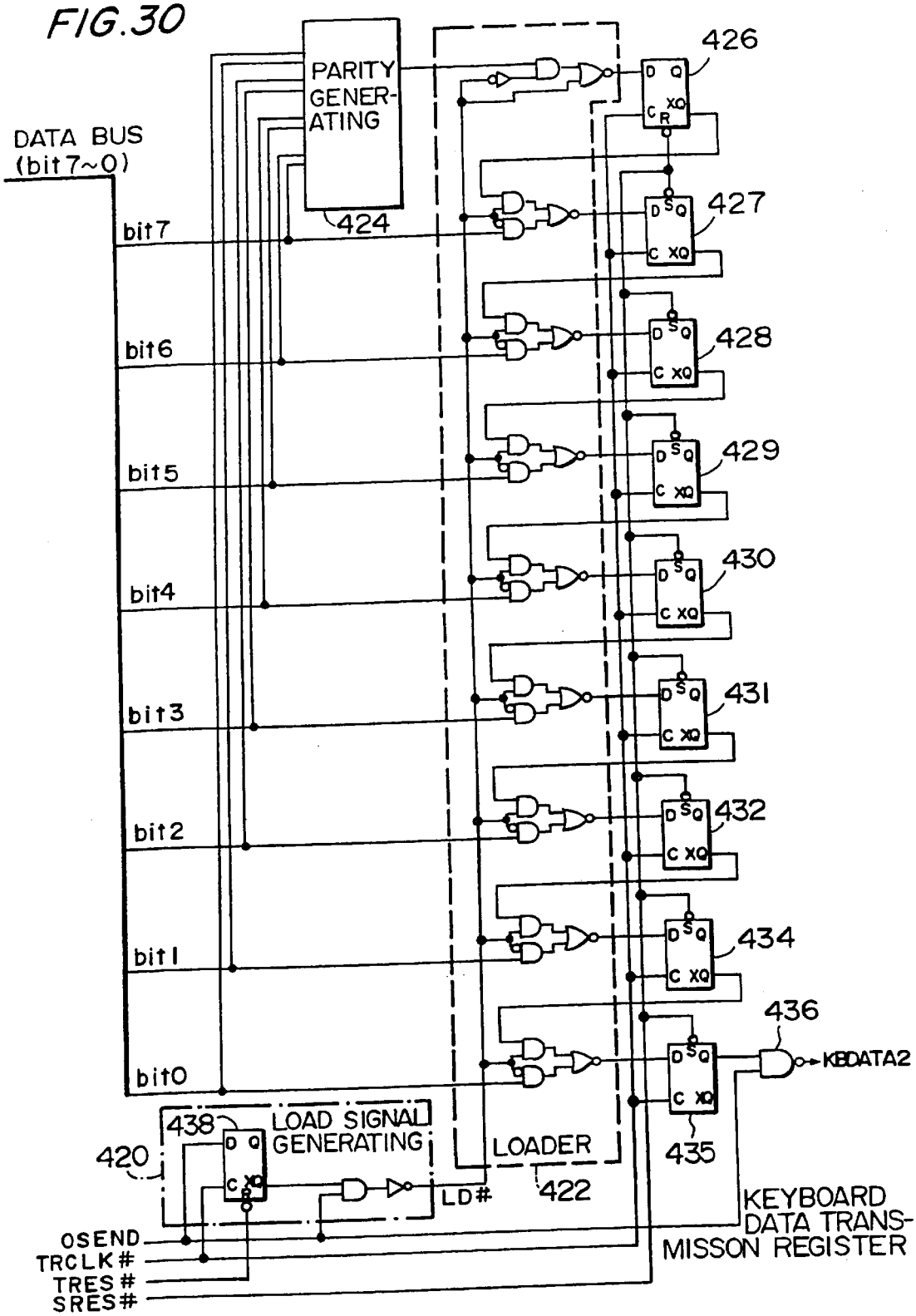
FIG. 30 shows the details of a keyboard data transmission register.

FIG. 30 shows the details of the keyboard data transmission register 22 shown in FIG. 4. In this figure, DSEND is a transmission request signal; TRCLK# a transmission/reception clock (which is generated by a reception/transmission clock generating circuit 440 of FIG. 31); TRES# a signal used to reset a D flip-flop 438 in a load signal generating circuit 420; and SRES# a signal used to reset or set D flip-flops 426–435.

As DSEND becomes high level, load signal generating circuit 420 outputs low-level pulses toward LD# line. Parity data generated by a parity generating circuit 424 and data from the data bus are loaded in the D flip-flops 426–436 by a loader circuit 422. The D flip-flops 426–435 are designed to shift the loaded parallel data. KBDATA2 is then outputted toward the tristate control terminal of a tristate buffer 404 shown in FIG. 4 through NAND 436.

In such a manner, the function of the keyboard data transmission register 22 for converting the parallel data from the data bus into serial KBDATA2 can be accomplished. The arrangement of the mouse data transmission register 26 will not be described since it has substantially the same arrangement as in FIG. 30.

7. Details of Keyboard Data Reception Register

Figure 31:
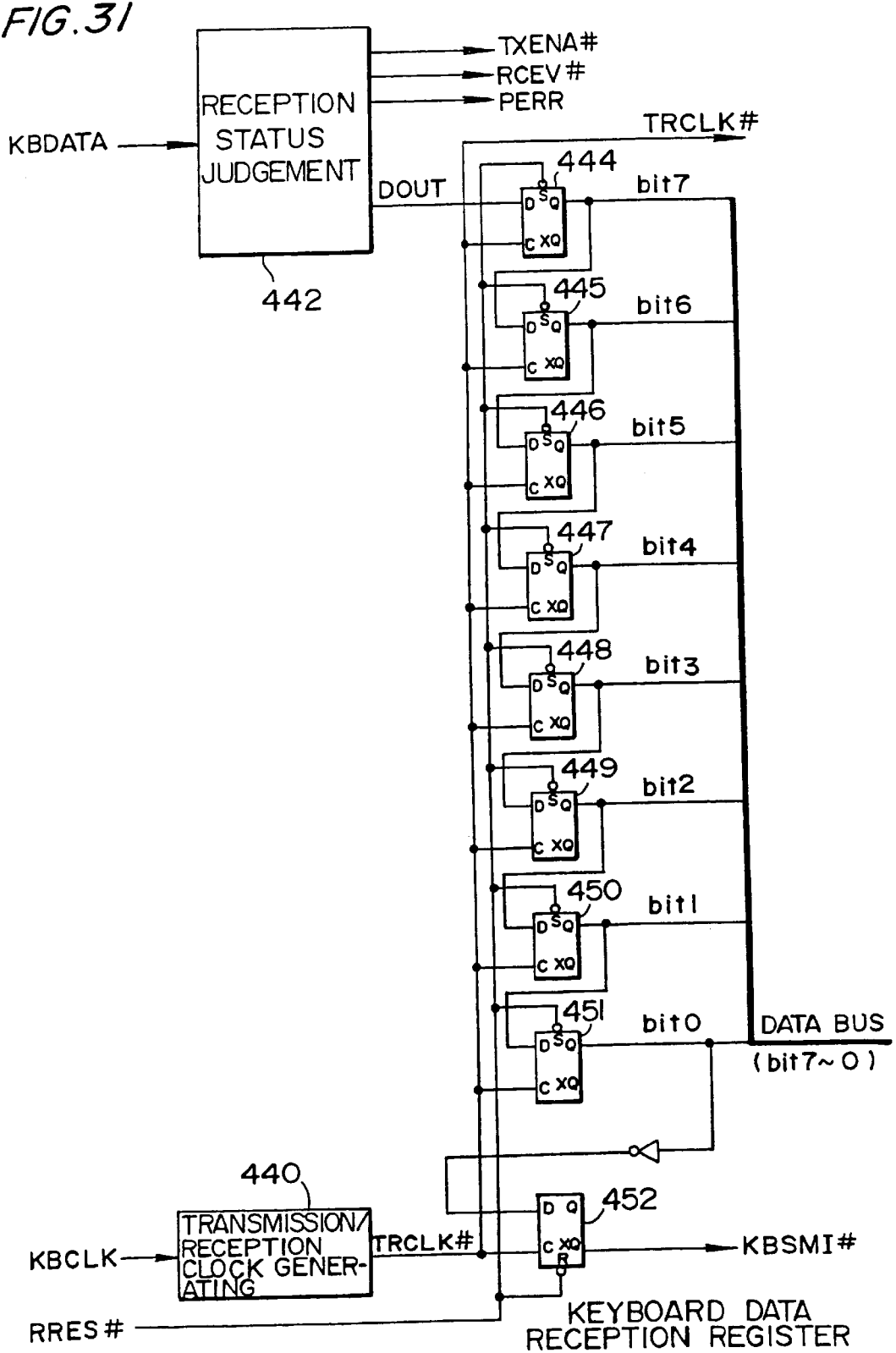
FIG. 31 shows the details of a keyboard data reception register.

FIG. 31 shows the details of a keyboard data reception register 24.

KBCLK is inputted into the reception/transmission clock generating circuit 440 to generate a reception/transmission clock TRCLK# which is in turn outputted toward the clock terminals of D flip-flops 444–452 and also toward the keyboard data transmission register 22 (see FIG. 30). RRES# is a signal used to set or reset the D flip-flops 444–452.

KBDATA from the keyboard is inputted into a reception state judgement circuit 442 which is in turn responsive to KBDATA for outputting TXENA# representing the inhibition of transmission, RCEV# representing the presence of data being received and PERR representing the parity. DOUT which is a serial output data from the reception state judgement circuit 442 is inputted into the D flip-flop 444. Then, the D flip-flops 444–451 perform their shifting operations, after which data is outputted toward the data bus. The D flip-flop 452 receives data from the D flip-flop 451 to output KBSMI#. As the conversion of serial data into parallel data completes, SMI# occurs and activates the emulation handler.

In such a manner, the function of the keyboard data reception register 24 for converting serial data KBDATA into parallel data which is in turn outputted toward the data bus can be accomplished. The arrangement of a mouse data reception register 28 will not be described since it is substantially similar to that of FIG. 31.

8. Details of Output Buffer

Figure 32:
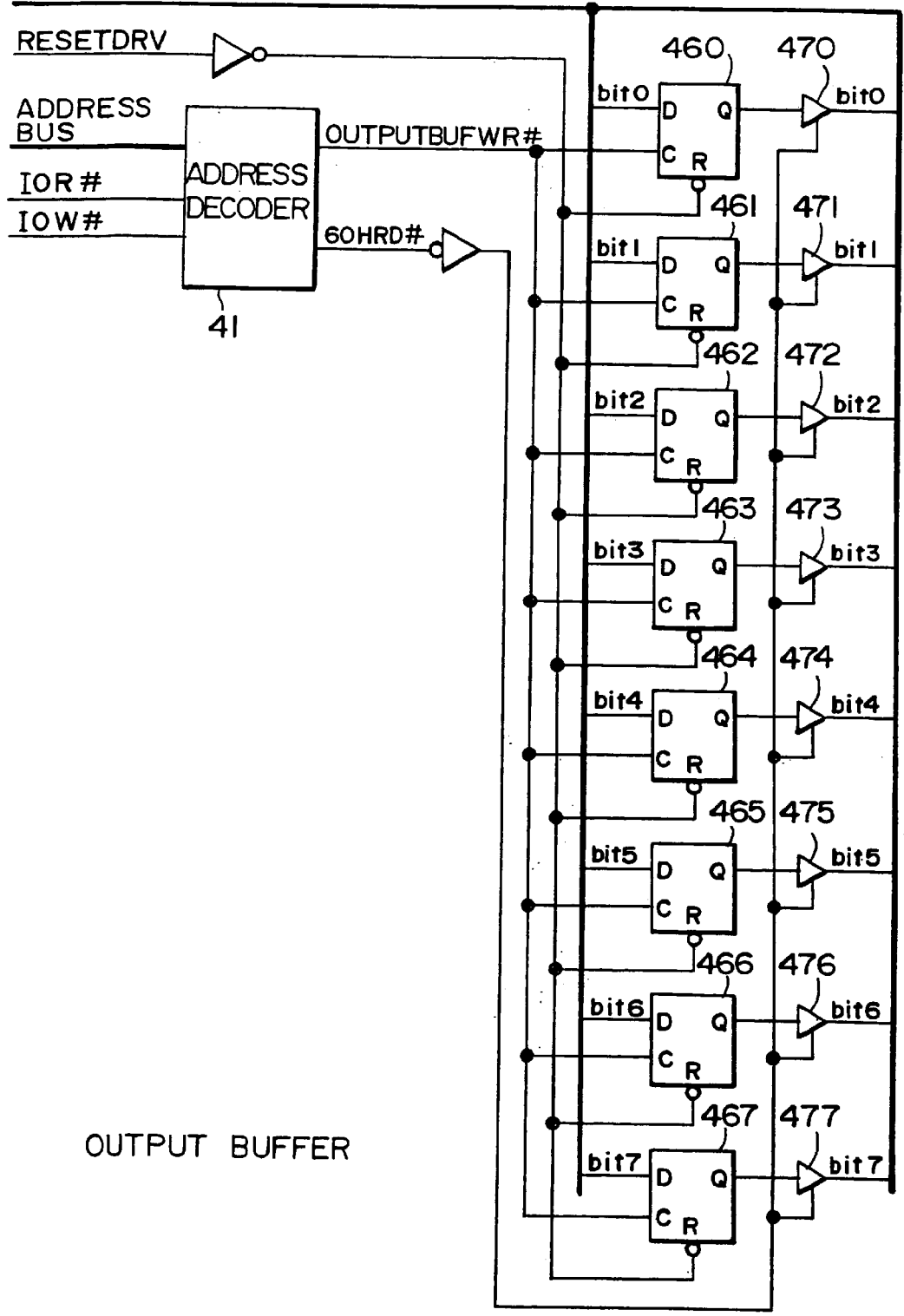
FIG. 32 shows the details of an output buffer.

FIG. 32 shows the details of the output buffer 42 shown in FIG. 9.

The address decoder 41 outputs OUTPUTBUFWR# and 60HRD# in response to the address from the address bus, IOR# which is an I/O read signal and IOW# which is an I/O write signal.

OUTPUTBUFWR# is a signal which becomes active when the emulation handler writes data into the output buffer 42. As a result, data from the data bus are written into D flip-flops 460–467.

60HRD# is a signal which becomes active when BIOS reads the output buffer 42 (see FIG. 10). As a result, data in the D flip-flops 460–467 is outputted toward the data bus through tristate buffers 470–477.

RESETDRV is a signal used to reset the D flip-flops 460–467.

9. Details of Input Buffer

Figure 33:
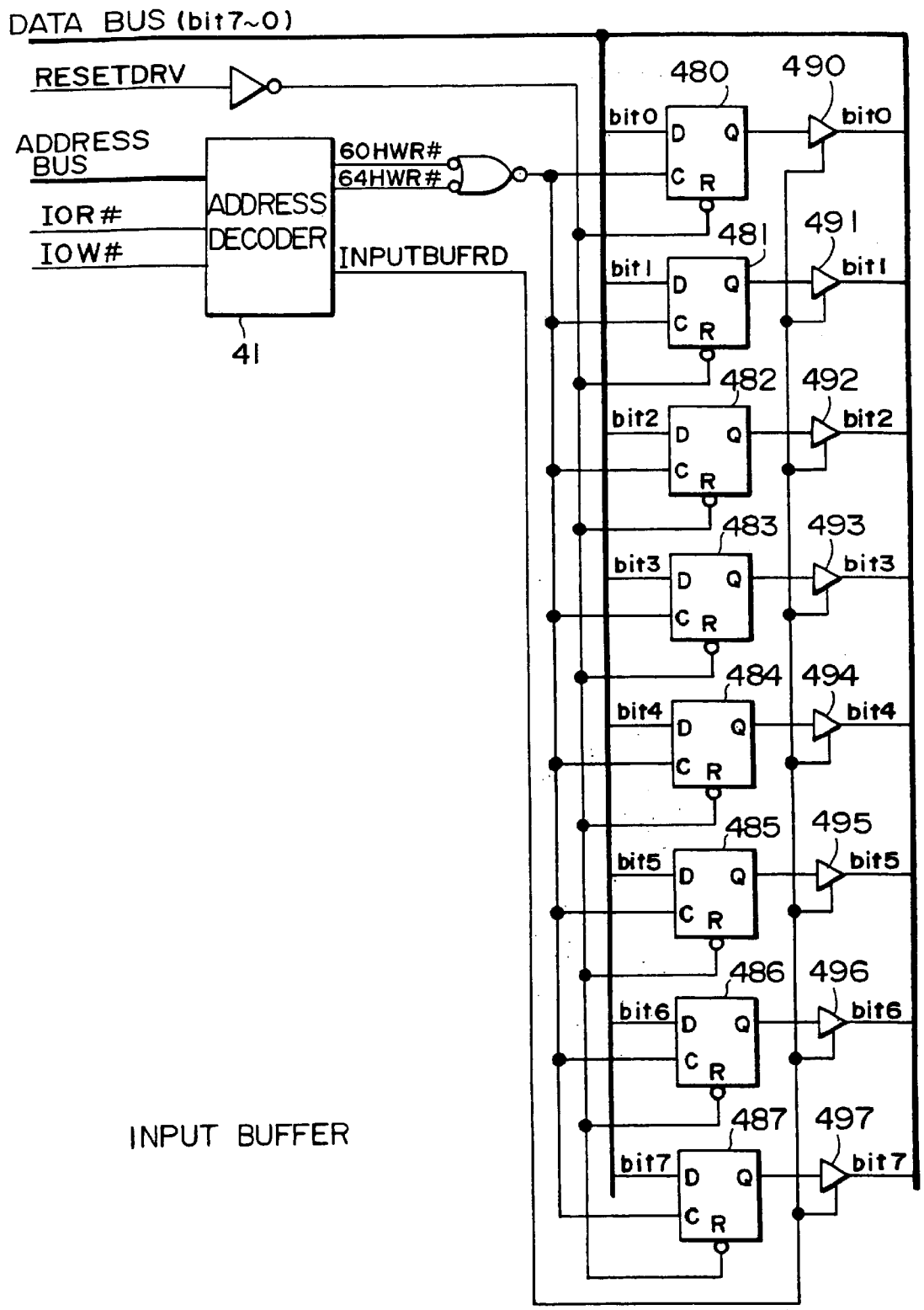
FIG. 33 shows the details of an input buffer.

FIG. 33 shows the details of the input buffer 44 shown in FIG. 9.

The address decoder 41 outputs 60HWR#, 64HWR# and INPUTBUFRD# in response to the address from the address bus, IOR# and IOW#.

60HWR# is a signal which becomes active when BIOS writes data into the input buffer 44 (see FIG. 10B). As a result, data from the data bus is written into D flip-flops 480–487.

64HWR# is a signal which becomes active when BIOS writes a command into the input buffer 44 (see FIG. 10B). As a result, a command from the data bus is written into the D flip-flops 480–487.

INPUTBUFRD# is a signal which becomes active when the emulation handler reads the input buffer 44. As a result, the data or commands from the D flip-flops 480–487 are outputted toward the data bus through tristate buffers 490–497.

RESTDRV is a signal used to reset the D flip-flops 480–487.

10. Details of Status Register

Figure 34:
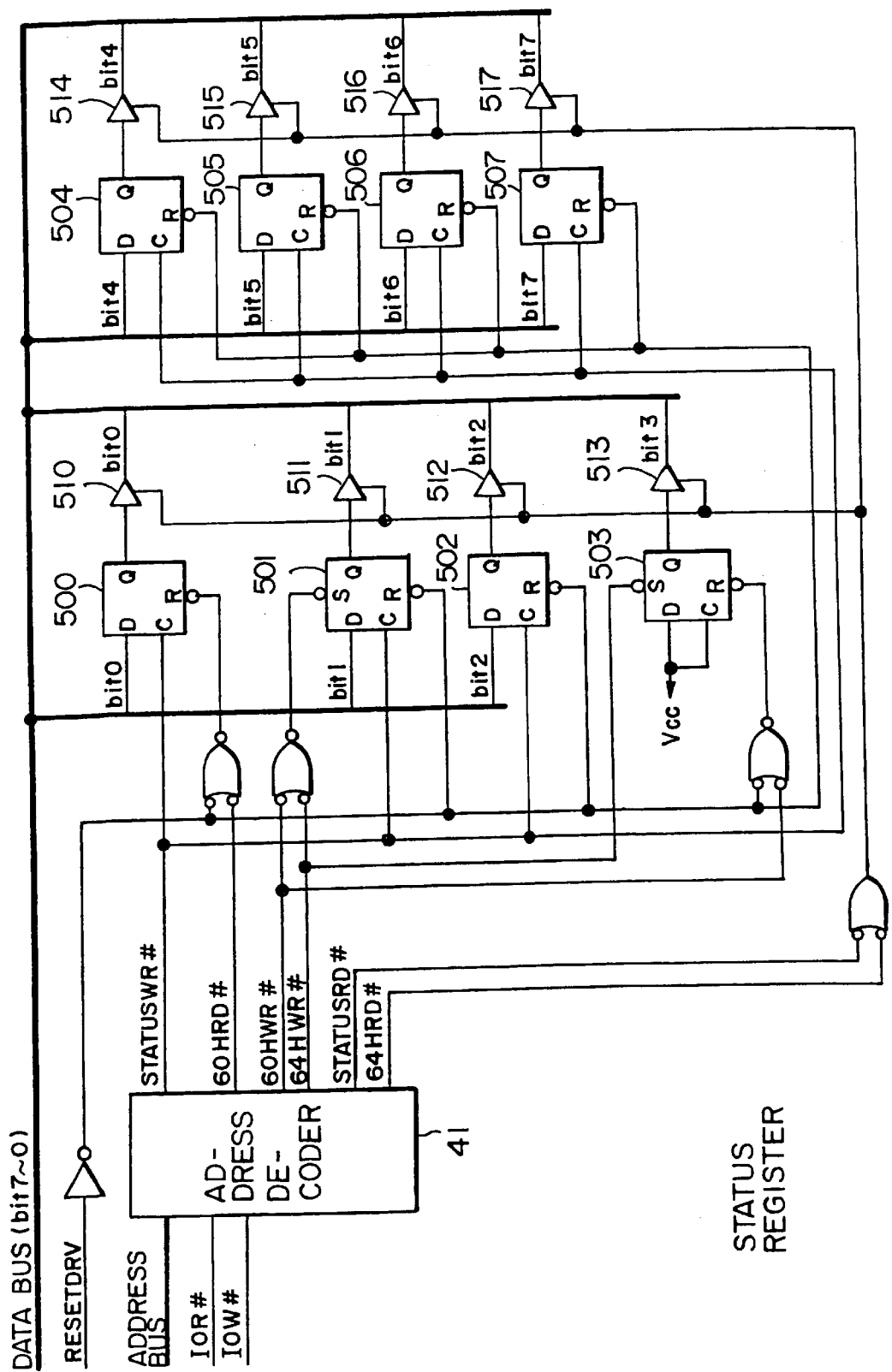
FIG. 34 shows the details of a status register.

FIG. 34 shows the details of the status register 46 shown in FIG. 9.

The address decoder 41 outputs STATUSWR#, 60HRD#, 60HWR#, 64HWR#, STATUSSRD# and 64HRD# in response to the address from the address bus, IOR# and IOW#.

STATUSWR# is a signal which becomes active when the emulation handler writes data into the status register 46. As a result, data from the data bus is written into D flip-flops 500–507.

60HRD# is a signal which becomes active when BIOS reads data out of the output buffer 42 (see FIG. 10B). As 60HRD# becomes active, the D flip-flop 500 corresponding to the bit 0 of the status register 46 is reset to accomplish the function of the bit 0 of FIG. 11 (which is reset when the port 60$h$ is read). Since BIOS has already read the output buffer 42, thus, it can be known that the output buffer 42 has no longer data.

60HWR# is a signal which becomes active when BIOS writes data into the input buffer 44. 64HWR# is a signal which becomes active when BIOS writes data into the input buffer 44 (see FIG. 10B). As 60HWR# or 64HWR# becomes active, the D flip-flops 501 and 503 respectively corresponding to the bits 1 and 3 of the status register 46 are set or reset. Thus, the functions of the bits 1 and 3 shown in FIG. 11 (for which the bit 1 is set when the port 60$h$ or 64$h$ is written; the bit 3 is reset when the port 60$h$ is written; and the bit 3 is set when the port 64$h$ is written) can be accomplished. Therefore, it may be known that BIOS writes data into the input buffer 44 but the emulation handler does not still read that data, for example.

STATUSRD# is a signal which becomes active when the emulation handler reads data out of the status register 46. Thus, the data in the D flip-flops 500–507 are outputted toward the data bus through tristate buffers 510–517.

64HRD# is a signal which becomes active when BIOS reads data from the status register 46 (see FIG. 10B). Thus, the data in the D flip-flops 500–507 are outputted toward the data bus through the tristate buffers 510–517.

When the status register 46 is of such a hardware arrangement as described above, the function of each bit in FIG. 1 can be accomplished.

RESETDRV is a signal used to reset the D flip-flops 500–507.

11. Details of Port Registers

Figure 35A:
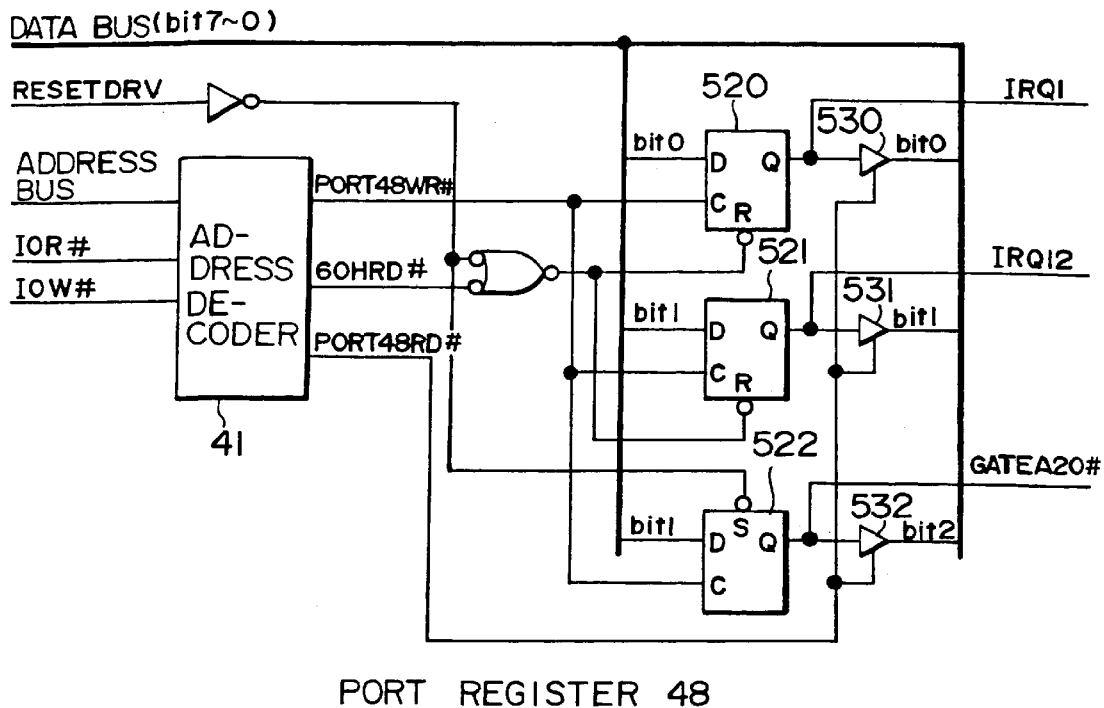
FIGS. 35A and 35B show the details of port registers.

FIG. 35A shows the details of the port register 48 shown in FIG. 9.

The address decoder 41 outputs PORT48WR#$_1$ 60HRD# and PORT48RD# in response to the address from the address bus, IOR# and IOW#.

PORT48WR# is a signal which becomes active when the emulation handler writes data into the port register 48. Thus, data from the data bus is written into D flip-flops 520, 521 and 522. As a result, IRQ1, IRQ12 (interrupt signals) and the like can be made active under control of the emulation handler.

60HRD# is a signal which becomes active when BIOS reads data out of the output buffer 42 (see FIG. 10B). As 60HRD# becomes active, the D flip-flops 520 and 521 respectively corresponding to the bits 0 and 1 in the port register 48 are reset. As a result, the functions of the bits 0 and 1 shown in FIG. 13A can be attained.

PORT48RD# is a signal which becomes active when the emulation handler reads data from the port register 48. As a result, the data in the D flip-flops 520, 521 and 522 are outputted toward the data bus through tristate buffers 530, 531 and 532.

RESETDRV is a signal used to reset the D flip-flops 520, 521 and 522.

Figure 35B:
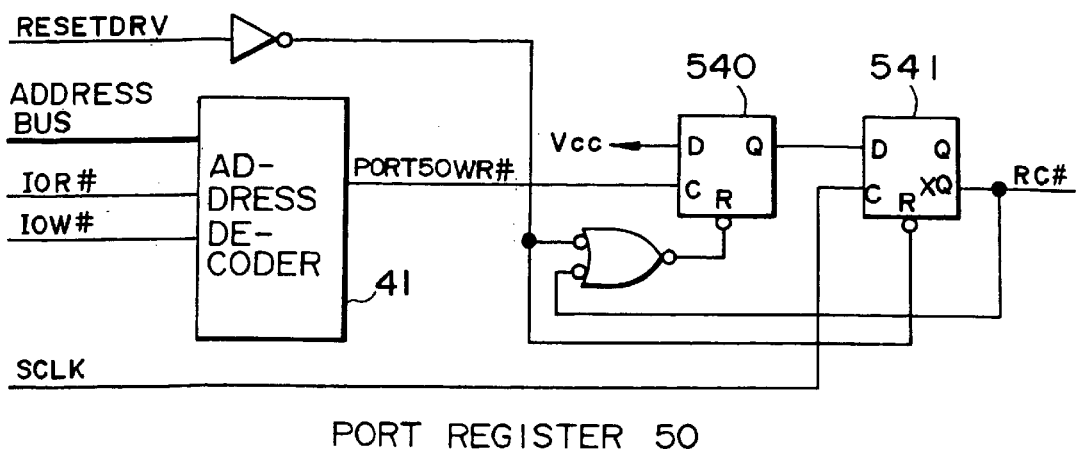

FIG. 35B shows the details of the port register 50 shown in FIG. 9.

The address decoder 41 outputs PORT50WR# in response to the address from the address bus, IOR# and IOW#.

PORT50WR# is a signal which becomes active when the emulation handler writes data into the port register 50. SCLK is a clock used to output low-level pulses toward RC# line. As PORT50WR# becomes active, the output of a D flip-flop 540 becomes high level while RC# which is the output of a D flip-flop 541 changes from high to low level in synchronism with SCLK. As RC# becomes low level, the D flip-flop 540 is reset while the output of the D flip-flop 540 is made low level. In addition, RC#, which is the output of the D flip-flop 541, changes from low to high level in synchronism with SCLK. Thus, low-level pulses can be outputted toward RC# (see FIG. 13B).

RESETDRV is a signal used to reset the D flip-flops 540 and 541.

12. Timing of I/O Trap

Figure 36:
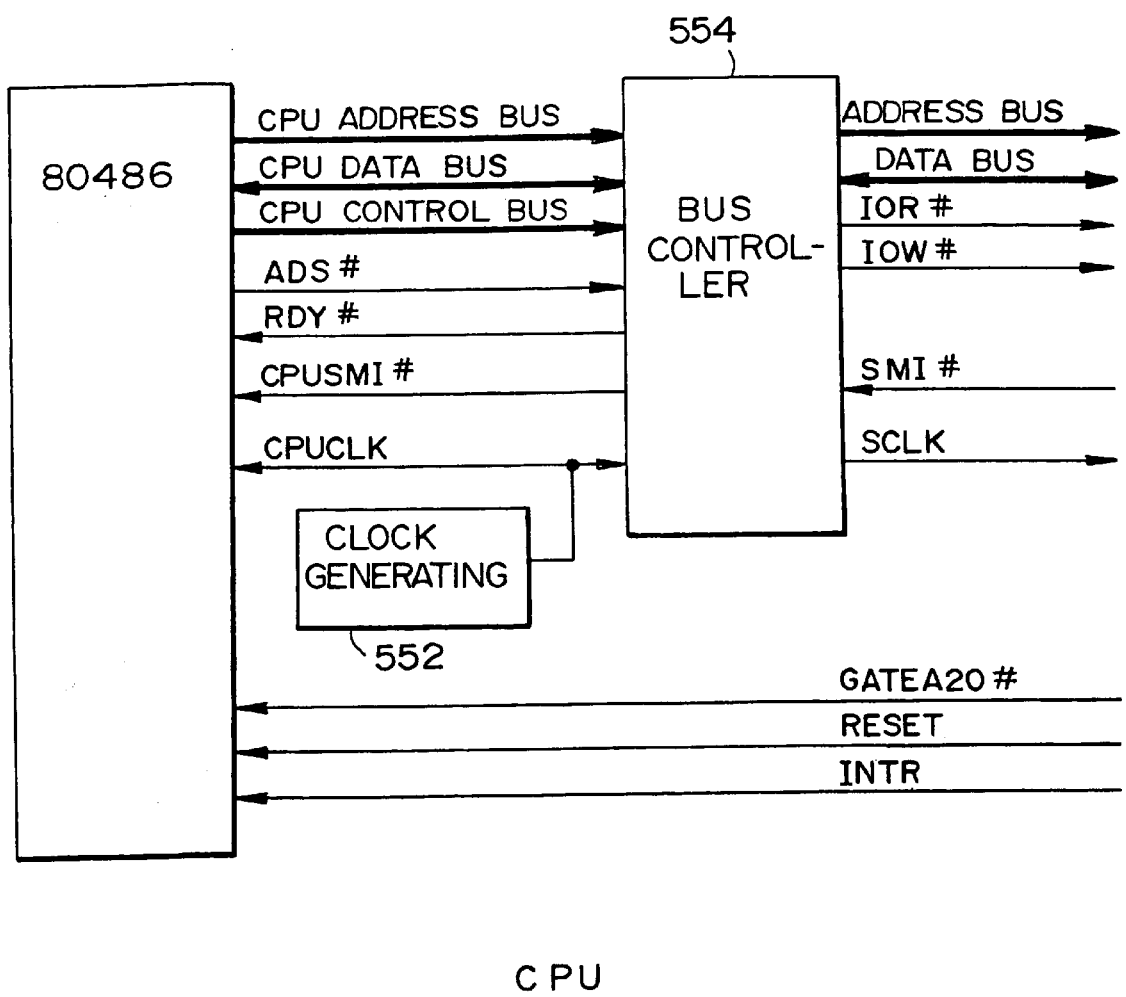
FIG. 36 shows a structure of a CPU.
Figure 37:
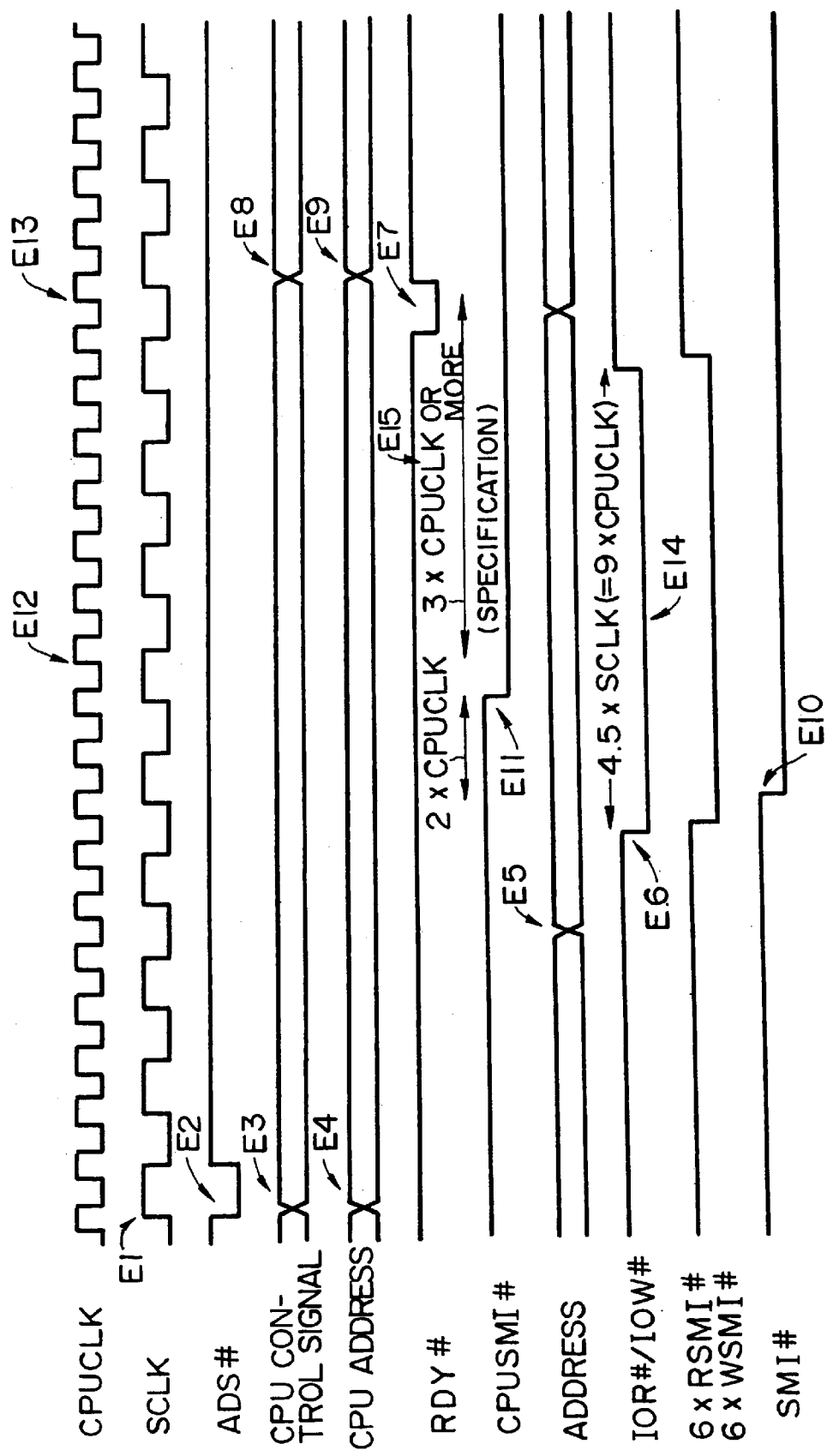
FIG. 37 shows waveforms illustrating the timing of an I/O trap.

FIG. 36 shows the details of the CPU 10 shown in FIG. 3 while FIG. 37 shows waveforms illustrating the timing in the I/O trap.

CPU 10 comprises the Intel 80486, a clock generating circuit 552 and a bus controller 554.

The clock generating circuit 552 generates CPUCLK which is a basic clock for operating the 80486. The bus controller 554 generates SCLK by dividing CPUCLK into two (or three or four) (see E1 of FIG. 37).

The bus controller 554 converts a signal from the 80486 into a signal which suits to ISA bus. The basic clock in ISA bus (which may be address bus or data bus in FIG. 3) is SCLK. The reception/transmission circuit 20, I/O register 40, interrupt generating circuit 60 and others are connected to this ISA bus.

The 80486 makes ADS# active to start the cycle and also outputs CPU address and CPU control signal toward the bus controller 554 (see E2, E3 and E4 of FIG. 37). The bus controller 554 converts the CPU address into an address which suits to ISA (see E5). The CPU control signal makes IOR# active for I/O read and IOW# active for I/O write (see E6).

At this time, the bus controller 554 holds IOR# or IOW# active for 4.5 clocks of SCLK. Therefore, RDY# is held active for one clock of CPUCLK (see E7). As RDY# is active, the 80486 terminates its cycle (see E8 and E9).

SMI# for I/O trap is not inputted directly into the 80486, but through the bus controller 554. Although SMI# is a signal synchronous with SCLK (see E10), the bus controller 554 converts this SMI# into CPUSMI# which is a signal synchronous with SCLK. More particularly, CPUSMI# is a signal delayed from SMIT# by two clocks of CPUCLK (see E11).

The 80486 samples the CPUSMI# with CPUCLK (see E12). To recognize CPUSMI# (SMI#) prior to execution of an instruction subsequent to I/O instruction in the specification of the 80486, the period from the point of E12 (at which the 80486 samples CPUSMI# with CPUCLK) to the point of E13 (at which the 80486 samples RDY# with CPUCLK) is required to be equal to or larger than three clocks of CPUCLK. In the first embodiment, as shown at E14, IOR# or IOW# can meet 3×CPUCLK in the specification (see E15) since it is held active by 4.5×SCLK (=9×CPUCLK) (which is 7×CPUCLK as shown by E15 in FIG. 37).

Therefore, the 80486 can recognize CPUSMI# before the instruction following the I/O instruction is executed. As a result, the 80486 can shift to SMM without execution of the next instruction, so that an appropriate emulation can be accomplished.

On the other hand, an interrupt other than SMI (e.g., NMI) cannot ensure the 80486 shifting to an interrupt management mode after an I/O instruction has been executed and before the next instruction is executed. In other words, even if an interrupt signal is active after execution of an I/O instruction, a time when the 80486 shifts to the interrupt management mode is not ensured in the specification On the contrary by using SMI, the 80486 can surely shift to SMM after an I/O instruction has been executed and before the next instruction is executed, by ensuring that an interrupt signal is maintained active only for a period required by the specification (or that CPUSMI# is maintained active for a period equal to or longer than 3×CPUCLK as shown at E15). As a result, an appropriate emulation corresponding to the I/O instruction can be accomplished.

Even if CPUCLK is divided into three or four SCLK clocks, the arrangement of FIG. 37 may meet the specification of 3×CPUCLK (see E15).

The emulation system according to the first embodiment mentioned above provides the following advantages:

(A) The information processing device can inexpensively be manufactured since it does not require the 8042.

(B) The emulation handler is prepared with any suitable language operating in CPU. This means that the emulation handler may not understand the language on the 8042. It is thus expected that the number of manufacturing steps can be reduced while shortening time required to manufacture the system.

(C) Any new ROM is not required since the emulation handler can be stored in BIOS ROM.

(D) The addition and modification of function can easily be carried out by changing the emulation handler.

(E) Any new input device can actuate BIOS by changing the reception/transmission circuit and emulation handler.

(F) The information processing device can be compatible with a system using the 8042.

(G) The necessary circuits may only include the reception/transmission circuit, I/O register and interrupt generating circuit.

(H) The reception/transmission circuit, I/O register and interrupt generating circuit can be incorporated into ASIC together with the other circuits (chip set) defining the personal computer.

Second Embodiment

The second embodiment relates to an information processing device including the emulation system as described in connection with the first embodiment. Such an information processing device may be of any one of various forms including personal computers (desk-top, notebook, palm-top or other types), handy terminals, portable electronic instruments, intelligent home appliances, card type PC's, NC machines and information processing devices applied to POS and FA.

Figure 38A:
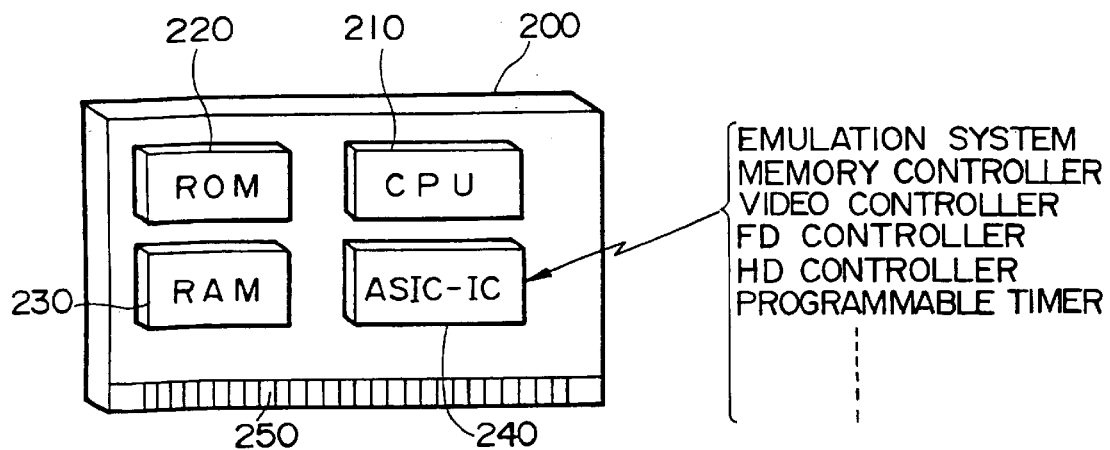
FIGS. 38A and 38B show examples of the information processing device according to the second embodiment of the present invention.

FIG. 38A exemplifies a card type PC which is one of the information processing devices. The card type PC comprises ASIC-IC 240 including CPU 210, ROM 220, RAM 230 and an emulation system according to the first embodiment, which is mounted on a card-sized circuit board 200. If the card type PC is mounted on an extension board, it may be connected to a memory card, LAN card or SCSI card through a terminal 250. This card type PC may be used to process information effectively in NC machines, POS or FA.

One feature of the information processing device according to the second embodiment is that the circuit section of the emulation system (e.g., reception/transmission circuit, register or interrupt generating circuit) is provided on a single ASIC-IC 240 chip together with the other circuits defining the information processing device. The other circuits may include a memory controller, video controller, FD controller, HD controller, programmable timer or the like. The prior art requires the IC chip 8042 since it must utilize the hardware resource thereof. If the prior art is applied to such a card type PC as shown in FIG. 38A, there is required any area in which the 8042 should be placed. This precludes the system from being compacted. On the other hand, as described, the emulation system according to the first embodiment can emulate the 8042 without utilization of the hardware resource thereof. If this emulation system is applied to such a card type PC as shown in FIG. 38A, therefore, it does not require the 8042 which the circuit section of the emulation system being mounted on a single chip together with the other circuit defining the information processing device. Consequently, the system may further be compacted.

The single chip on which the circuit section of the emulation system is mounted together with the other circuits defining the information processing device may be applied to any one of various information processing devices other than such a card type PC as shown in FIG. 38A. For example, it may be applied to a personal computer or handy terminal or portable electronic instrument to reduce the size of a circuit board which can be used for these information processing devices. ASIC-IC 240 as shown in FIG. 38A may be combined with a firmware controlling a given other IC and the overall system to form a chip set.

Figure 38B:
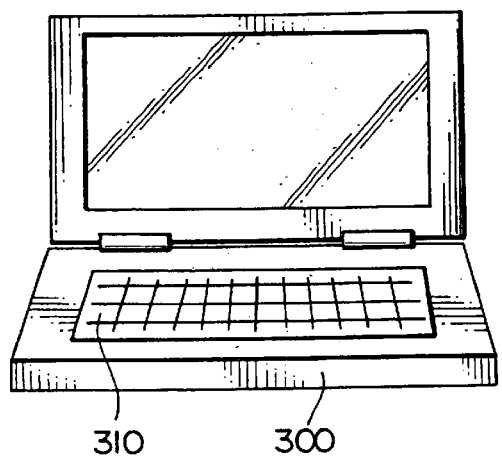

It is particularly desirable that an information processing device of such a type as shown in FIG. 38B in which a keyboard 310 is integrally formed on a PC mainframe 300 containing CPU and others (e.g., notebook type PC, palm-top type PC, handy terminal or portable electronic instrument) takes a technique of emulating a processor included in the keyboard as described in connection with FIG. 29C.

The present invention is not limited to the details of the first and second embodiments, but may be applied to any one of various other forms within the spirit and scope of the invention.

Although the structures of the I/O register, interrupt generating circuit and USB controller are preferably as described in connection with FIGS. 3, 4, 9, 15, 17, 28 and 30–35, other modified forms may also be used by the present invention.

Although the processing by the emulation handler is most preferably as described in connection with FIGS. 19, 20 and 22–25, other modified processing may also be used by the present invention.

The first and second embodiments have mainly been described as to the emulation of the 8042. However, the present invention may be applied to the emulation of any other input/output controller, although the present invention is particularly effective for the emulation of the 8042.

The first and second embodiments have mainly been described as to the emulation of the reception/transmission of data between the system and the keyboard or mouse. However, the present invention may similarly be applied to the reception/transmission of data between the system and any other input/output device, although the present invention is particularly effective for the emulation of the reception/transmission of data between the system and the keyboard or mouse.

What is claimed is:

1. An emulation system for emulating an input/output controller which controls an input/output device without the hardware resource of said input/output controller, said emulation system comprising:

a reception/transmission circuit for receiving data from and transmitting data to said input/output device;

at least one of an output buffer for temporarily storing data from said input/output device, an input buffer for temporarily storing data from a given input/output handler, a status register for storing given status data, and a port register for transmitting given data to an external means;

an interrupt generating circuit for generating a first interrupt for a central control means; and an emulation handler which is activated by said first interrupt for executing a given emulation;

said interrupt generating circuit generating said first interrupt when reception of data from said input/output device is completed by said reception/transmission circuit; and said emulation handler activated by said first interrupt reading data from said reception/transmission circuit, and writing either of the data and converted data into said output buffer;

said reception/transmission circuit including a circuit for converting serial data sent by said input/output device into parallel data, and said interrupt generating circuit generating said first interrupt when conversion of serial data into parallel data is completed by said reception/transmission circuit.

2. An information processing device including the emulation system as defined in claim 1, wherein circuitry of said emulation system is formed on one chip together with other circuits of said information processing device.

3. An information processing device including the emulation system as defined in claim 1, wherein a keyboard which is said input/output device is formed integrally with a main unit including said central control means.

4. A card-sized information processing device including the emulation system as defined in claim 1.

5. An emulation system for emulating an input/output controller which controls an input/output device without the hardware resource of said input/output controller, said emulation system comprising:

a reception/transmission circuit for receiving data from and transmitting data to said input/output device;

at least one of an output buffer for temporarily storing data from said input/output device, an input buffer for temporarily storing data from a given input/output handler, a status register for storing given status data, and a port register for transmitting given data to an external means;

an interrupt generating circuit for generating a first interrupt for a central control means; and an emulation handler which is activated by said first interrupt for executing a given emulation, said interrupt generating circuit generating said first interrupt when reception of data from said input/output device is completed by said reception/transmission circuit; and said emulation handler activated by said first interrupt reading data from said reception/transmission circuit, and writing either of the data and converted data into said output buffer;

said emulation handler terminating emulation without writing data into said output buffer when said input/output handler has not read data in said output buffer.

6. An emulation system for emulating an input/output controller which controls an input/output device without the hardware resource of said input/output controller, said emulation system comprising:

a reception/transmission circuit for receiving data from and transmitting data to said input/output device;

at least one of an output buffer for temporarily storing data from said input/output device, an input buffer for temporarily storing data from a given input/output handler, a status register for storing given status data, and a port register for transmitting given data to an external means;

an interrupt generating circuit for generating a first interrupt for a central control means; and an emulation handler which is activated by said first interrupt for executing a given emulation, said interrupt generating circuit generating said first interrupt when reception of data from said input/output device is completed by said reception/transmission circuit; and said emulation handler activated by said first interrupt reading data from said reception/transmission circuit, and writing either of the data and converted data into said output buffer, and after said reception/transmission circuit completes reception of data from said input/output device, said emulation handler inhibiting said input/output device from transmitting subsequent data until said emulation handler delivers received data to said input/output handler.

7. An emulation system for emulating an input/output controller which controls an input/output device without the hardware resource of said input/output controller, said emulation system comprising:

a reception/transmission circuit for receiving data from and transmitting data to said input/output device;

at least one of an output buffer for temporarily storing data from said input/output device, an input buffer for temporarily storing data from a given input/output handler, a status register for storing given status data, and a port register for transmitting given data to an external means;

an interrupt generating circuit for generating a first interrupt for a central control means; and an emulation handler which is activated by said first interrupt for executing a given emulation;

said interrupt generating circuit generating said first interrupt when reception of data from said input/output device is completed by said reception/transmission circuit; and said emulation handler activated by said first interrupt reading data from said reception/transmission circuit, and writing either of the data and converted data into said output buffer; and said emulation handler setting an output buffer data presence flag in said status register after writing data into said output buffer, and then terminating emulation.

8. The emulation system as defined in claim 7, wherein said output buffer data presence flag is reset when said input/output handler reads said output buffer after confirming that said output buffer data presence flag has been set.

9. The emulation system as defined in claim 7, wherein said interrupt generating circuit generates said first interrupt again when said input/output handler reads said output buffer after confirming that said output buffer data presence flag has been set; and wherein said emulation handler activated again by said first interrupt executes a given processing corresponding to a factor of said first interrupt.

10. An emulation system for emulating an input/output controller which controls an input/output device without the hardware resource of said input/output controller, said emulation system comprising:

a reception/transmission circuit for receiving data from and transmitting data to said input/output device;

at least one of an output buffer for temporarily storing data from said input/output device, an input buffer for temporarily storing data from a given input/output handler, a status register for storing given status data, and a port register for transmitting given data to an external means;

an interrupt generating circuit for generating a first interrupt for a central control means; and an emulation handler which is activated by said first interrupt for executing a given emulation;

said interrupt generating circuit generating said first interrupt when said input/output handler writes data into said input buffer; and said emulation handler activated by said first interrupt receiving data written into said input buffer and resetting an input buffer data presence flag in said status register, said input buffer data presence flag having been previously set by the writing operation of said input/output handler.

11. An information processing device including the emulation system as defined in claim 10, wherein circuitry of said emulation system is formed on one chip together with other circuits of said information processing device.

12. An information processing device including the emulation system as defined in claim 10, wherein circuitry of said emulation system is formed on one chip together with other circuits of said information processing device.

13. A card-sized information processing device including the emulation system as defined in claim 10.

14. An emulation system for emulating an input/output controller which controls an input/output device without the hardware resource of said input/output controller, said emulation system comprising:

a reception/transmission circuit for receiving data from and transmitting data to said input/output device;

at least one of an output buffer for temporarily storing data from said input/output device, an input buffer for temporarily storing data from a given iniput/output handler, a status register for storing given status data, and a port register for transmitting given data to an external means;

an interrupt generating circuit for generating a first interrupt for a central control means; and an emulation handler which is activated by said first interrupt for executing a given emulation;

wherein said interrupt generating circuit generates said first interrupt when said input/output handler writes data into said input buffer;

said emulation handler activated by said first interrupt receiving data written into said input buffer and resetting an input buffer data presence flag in said status register, said input buffer data presence flag having been previously set by the writing operation of said input/output handler; and said emulation handler writing received data into said reception/transmission circuit.

15. An emulation system for emulating an input/output controller which controls an input/output device without the hardware resource of said input/output controller, said emulation system comprising:
- a reception/transmission circuit for receiving data from and transmitting data to said input/output device;
- at least one of an output buffer for temporarily storing data from said input/output device, an input buffer for temporarily storing data from a given input/output handler, a status register for storing given status data, and a port register for transmitting given data to an external means;
- an interrupt generating circuit for generating a first interrupt for a central control means; and
- an emulation handler which is activated by said first interrupt for executing a given emulation;
- said interrupt generating circuit generating said first interrupt when said input/output handler writes data into said input buffer;
- said emulation handler activated by said first interrupt receiving data written into said input buffer and resetting an input buffer data presence flag in said status register, said input buffer data presence flag having been previously set by the writing operation of said input/output handler; and
- said reception/transmission circuit including a circuit for converting parallel data written by said emulation handler into serial data.

16. An emulation system for emulating an input/output controller which controls an input/output device without the hardware resource of said input/output controller, said emulation system comprising:
- a reception/transmission circuit for receiving data from and transmitting data to said input/output device;
- at least one of an output buffer for temporarily storing data from said input/output device, an input buffer for temporarily storing data from a given input/output handler, a status register for storing given status data, and a port register for transmitting given data to an external means;
- an interrupt generating circuit for generating a first interrupt for a central control means; and
- an emulation handler which is activated by said first interrupt for executing a given emulation;
- said interrupt generating circuit generating said first interrupt when said input/output handler writes data into said input buffer;
- said emulation handler activated by said first interrupt receiving data written into said input buffer and resetting an input buffer data presence flag in said status register, said input buffer data presence flag having been previously set by the writing operation of said input/output handler; and
- when data from said input/output handler is a command with a parameter, said emulation handler transmitting the command to said input/output device through said input buffer and said reception/transmission circuit, and then enabling said input/output handler to start processing;
- said interrupt generating circuit generating said first interrupt again when said input/output handler starts processing and writes the parameter into said input buffer; and
- said emulation handler activated again by said first interrupt transmitting the parameter to said input/output device through said input and output buffers and said reception/transmission circuit.

17. An emulation system for emulating an input/output controller which controls input/output devices, said emulation system comprising:
- an Universal Serial Bus (USB) controller for receiving and transmitting data from and to a plurality of input/output devices connected to USB;
- at least one of an output buffer for temporarily storing data from said input/output devices, an input buffer for temporarily storing data from a given input/output handler, a status register for storing given status data, and a port register for transmitting given data to an external means;
- an interrupt generating circuit for generating a first interrupt for a central control means; and
- an emulation handler which is activated by said first interrupt for executing a given emulation.

18. The emulation system as defined in claim 17,
- wherein said USB controller generates a second interrupt for said central control means when receiving data from said input/output devices; and
- wherein an interrupt handler activated by said second interrupt enables said emulation handler to start processing only when the received data is send by a particular input/output device.

19. The emulation system as defined in claim 17,
- wherein by making a signal of said first interrupt active for a given time period after said central control means executes an input/output instruction, said central control means shift surely to a management mode activated by said first interrupt before executing a subsequent instruction.

20. The emulation system as defined in claim 17,
- wherein said first interrupt is a System Management Interrupt (SMI).

21. An information processing device including the emulation system as defined in claim 17,
- wherein circuitry of said emulation system is formed on one chip together with other circuits of said information processing device.

22. An information processing device including the emulation system as defined in claim 17,
- wherein a keyboard which is said input/output device is formed integrally with a main unit including said central control means.

23. A card-sized information processing device including the emulation system as defined in claim 17.

24. An emulation system for emulating an input/output controller which controls input/output devices, said emulation system comprising:
- an IEEE1394 controller for receiving and transmitting data from and to a plurality of input/output devices connected to a bus meeting the IEEE1394 standard;
- at least one of an output buffer for temporarily storing data from said input/output devices, an input buffer for temporarily storing data from a given input/output handler, a status register for storing given status data, and a port register for transmitting given data to an external means;
- an interrupt generating circuit for generating a first interrupt for a central control means; and
- an emulation handler which is activated by said first interrupt for executing a given emulation.

25. The emulation system as defined in claim 24,
wherein said IEEE1394 controller generates a second interrupt for said central control means when receiving data from said input/output devices; and
wherein an interrupt handler activated by said second interrupt enables said emulation handler to start processing only when the received data is send by a particular input/output device.

26. An emulation system for emulating an input/output controller which controls an input/output device without the hardware resource of said input/output controller, said emulation system comprising:
   at least one of an output buffer for temporarily storing data from said input/output device, an input buffer for temporarily storing data from a given input/output handler, a status register for storing given status data, and a port register for transmitting given data to an external means; and
   an interrupt generating circuit for generating a first interrupt for a central control means; and
   an emulation handler which is activated by said first interrupt for executing a given emulation;
   said emulation handler emulating processings of at least one of a processor in said input/outout controller and a processor in said input/output device;
   said emulation handler writing at least one of an output buffer data presence flag, an input buffer data presence flag and an input/output device identification flag into said status register instead of at least one of said processors.

27. An emulation system for emulating an input/output controller which controls an input/output device without the hardware resource of said input/output controller, said emulation system comprising:
   at least one of an outout buffer for temporarily storing data from said input/output device, an input buffer for temporarily storing data from a given input/output handler, a status register for storing given status data, and a port register for transmitting given data to an external means; and
   an interrupt generating circuit for generating a first interrupt for a central control means; and
   an emulation handler which is activated by said first interrupt for executing a given emulation;
   said emulation handler emulating processings of at least one of a processor in said input/output controller and a processor in said input/output device;
   said emulation handler writing data for generating a second interrupt for said central control means into said port register instead of at least one of said processors.

28. An emulation system for emulating an input/output controller which controls an input/output device without the hardware resource of said input/output controller, said emulation system comprising:
   at least one of an output buffer for temporarily storing data from said input/output device, an input buffer for temporarily storing data from a given input/output handler, a status register for storing given status data, and a port register for transmitting given data to an external means;
   an interrupt generating circuit for generating a first interrupt for a central control means;
   an emulation handler which is activated by said first interrupt for executing a given emulation;
   said emulation handler emulating processings of at least one of a processor in said input/output controller and a processor in said input/output device; and
   wherein circuitry of said emulation system is formed on one chip together with other circuits of an information processing device.

29. An emulation system as defined in claim 28, wherein a keyboard which is said input/output device is formed integrally with a main unit including said central control means.

30. A card-sized information processing device including an emulation system for emulating an input/output controller which controls an input/output device without the hardware resource of said input/output controller, said emulation system comprising:
   at least one of an output buffer for temporarily storing data from said input/output device, an input buffer for temporarily storing data from a given input/output handler, a status register for storing given status data, and a port register for transmitting given data to an external means;
   an interrupt generating circuit for generating a first interrupt for a central control means;
   an emulation handler which is activated by said first interrupt for executing a given emulation;
   said emulation handler emulating processings of at least one of a processor in said input/output controller and a processor in said input/output device; and
   wherein at least said central control means and a memory are mounted on a card-sized board.

31. An emulation system for emulating an input/output controller which controls an input/output device without the hardware resource of said input/output controller, said emulation system comprising:
   at least one of an output buffer for temporarily storing data from said input/output device, an input buffer for temporarily storing data from a given input/output handler, a status register for storing given status data, and a port register for transmitting given data to an external means;
   an interrupt generating circuit for generating a first interrupt for a central control means; and
   an emulation handler which is activated by said first interrupt for executing a given emulation;
   wherein said emulation handler emulates processings of a processor in said input/output controller and a processor in said input/output device.

32. An information processing device including the emulation system as defined in claim 31,
   wherein a keyboard which is said input/output device is formed integrally with a main unit including said central control means.

* * * * *